US007201320B2

(12) United States Patent
Csulits et al.

(10) Patent No.: US 7,201,320 B2
(45) **Date of Patent: *Apr. 10, 2007**

(54) SYSTEM AND METHOD FOR PROCESSING CURRENCY BILLS AND DOCUMENTS BEARING BARCODES IN A DOCUMENT PROCESSING DEVICE

(75) Inventors: Frank M. Csulits, Gurnee, IL (US); Curtis W. Hallowell, Palatine, IL (US); William J. Jones, Barrington, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 268 days.

This patent is subject to a terminal disclaimer.

(21) Appl. No.: 10/953,635

(22) Filed: Sep. 29, 2004

(65) Prior Publication Data

US 2005/0040225 A1 Feb. 24, 2005

Related U.S. Application Data

(63) Continuation-in-part of application No. 10/205,144, filed on Jul. 23, 2002, now Pat. No. 6,843,418, and a continuation-in-part of application No. 09/967,232, filed on Sep. 28, 2001, which is a continuation-in-part of application No. 09/502,666, filed on Feb. 11, 2000, now Pat. No. 6,398,000.

(51) Int. Cl.
*G06K 7/10* (2006.01)

(52) U.S. Cl. ............................ 235/462.01; 235/472.01

(58) Field of Classification Search ..............................
235/462.01–462.45, 375, 379, 472.01, 472.02, 235/472.03, 380, 381; 194/206, 207; 209/534
See application file for complete search history.

(56) References Cited

U.S. PATENT DOCUMENTS

| | | | | |
|---|---|---|---|---|
| 5,163,672 | A | 11/1992 | Mennie | 271/187 |
| 5,207,788 | A | 5/1993 | Geib | 271/122 |
| 5,295,196 | A | 3/1994 | Raterman et al. | 382/7 |
| 5,467,405 | A | 11/1995 | Raterman et al. | 382/135 |
| 5,467,406 | A | 11/1995 | Graves et al. | 382/135 |
| D369,984 | S | 5/1996 | Larsen | D10/97 |

(Continued)

FOREIGN PATENT DOCUMENTS

WO WO 91/11778 8/1991

(Continued)

*Primary Examiner*—Thien M. Le
(74) *Attorney, Agent, or Firm*—Jenkens & Gilchrist, PC

(57) ABSTRACT

A document processing device having an evaluation region disposed along a transport path between an input and output receptacle capable of processing both currency bills and substitute currency media having at least one indicia. The evaluation region includes at least one of a currency detector, a media detector, and an imager for detecting predetermined characteristics of currency bills and substitute currency media. A controller coupled to the evaluation region controls the operation of the document processing device and receives input from and provides information to a user via a control unit. In some embodiments, the document processing device may have any number of output receptacles, and the control unit allows the user to specify which output receptacle receives which type of document. An optional coin sorter may be coupled to the document processing device to allow document and coin processing. The document processing device may be coupled to a network to communicate information to devices linked to the network.

52 Claims, 31 Drawing Sheets

U.S. PATENT DOCUMENTS

| | | | | |
|---|---|---|---|---|
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,940,623 | A | 8/1999 | Watts et al. | 395/712 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,039,645 | A | 3/2000 | Mazur | 453/10 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 | 12/2002 | Mennie et al. | 382/135 |
| 6,539,104 | B1 | 3/2003 | Raterman et al. | 382/135 |
| 6,560,355 | B2 | 5/2003 | Graves et al. | 382/135 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Munro et al. | 382/136 |
| 6,798,899 | B2 | 9/2004 | Mennie et al. | 271/10.09 |
| 6,810,137 | B2 | 10/2004 | Jones et al. | 382/137 |
| 6,843,418 | B2 * | 1/2005 | Jones et al. | 235/462.01 |
| 6,860,375 | B2 * | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |
| 6,915,893 | B2 | 7/2005 | Mennie | 271/265.04 |
| 6,929,109 | B1 | 8/2005 | Klein et al. | 194/206 |
| 6,962,247 | B2 * | 11/2005 | Maier et al. | 194/207 |
| 2001/0006557 | A1 | 7/2001 | Mennie et al. | 382/135 |
| 2001/0015311 | A1 | 8/2001 | Mennie | 194/207 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/135 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 382/135 |
| 2002/0085745 | A1 | 7/2002 | Jones et al. | 382/135 |
| 2002/0103757 | A1 | 8/2002 | Jones et al. | 382/135 |
| 2002/0104785 | A1 | 8/2002 | Klein et al. | 209/534 |
| 2002/0107801 | A1 | 8/2002 | Jones et al. | 382/137 |
| 2002/0118871 | A1 | 8/2002 | Jones et al. | 382/135 |
| 2002/0122580 | A1 | 9/2002 | Jones et al. | 382/135 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/135 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2003/0202690 | A1 | 10/2003 | Jones et al. | 382/139 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 * | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al | 705/43 |
| 2004/0154964 | A1 | 8/2004 | Jones | 209/534 |
| 2004/0251110 | A1 | 12/2004 | Jenrick et al. | |
| 2005/0029168 | A1 | 2/2005 | Jones et al. | 209/534 |
| 2005/0035034 | A1 | 2/2005 | Long | |
| 2005/0040225 | A1 | 2/2005 | Csulits et al. | 235/379 |
| 2005/0047642 | A1 | 3/2005 | Jones et al. | |

| | | | | |
|---|---|---|---|---|
| 2005/0060055 | A1 | 3/2005 | Hallowell | 700/213 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1* | 4/2005 | Jones et al. | 707/200 |
| 2005/0087422 | A1 | 4/2005 | Maier et al. | 194/207 |
| 2005/0117791 | A2 | 6/2005 | Raterman et al. | 382/135 |
| 2005/0117792 | A2 | 6/2005 | Raterman et al. | 382/135 |
| 2005/0150738 | A1* | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1* | 8/2005 | Jones | 382/135 |
| 2005/0173221 | A1* | 8/2005 | Maier et al. | 194/207 |

FOREIGN PATENT DOCUMENTS

| | | |
|---|---|---|
| WO | WO 92/17394 | 10/1992 |
| WO | WO 93/23824 | 11/1993 |
| WO | WO 95/24691 | 9/1995 |
| WO | WO 96/10800 | 4/1996 |
| WO | WO 96/36933 | 11/1996 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24052 | 6/1998 |
| WO | WO 98/24067 | 6/1998 |
| WO | WO 98/35323 | 8/1998 |
| WO | WO 98/40839 | 9/1998 |
| WO | WO 98/47100 | 10/1998 |
| WO | WO 98/50892 | 11/1998 |
| WO | WO 98/59323 | 12/1998 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 00/24572 | 5/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 04/010367 | 1/2004 |
| WO | WO 04/027717 | 4/2004 |
| WO | WO 04/036508 | 4/2004 |
| WO | WO 04/038631 | 5/2004 |
| WO | WO 04/068422 | 8/2004 |
| WO | WO 05/013209 A2 | 2/2005 |
| WO | WO 05/017842 A1 | 2/2005 |
| WO | WO 05/029240 A2 | 3/2005 |
| WO | WO 05/036445 A1 | 4/2005 |
| WO | WO 04/041134 A2 | 5/2005 |

* cited by examiner

SYSTEM AND METHOD FOR PROCESSING CURRENCY BILLS AND DOCUMENTS BEARING BARCODES IN A DOCUMENT PROCESSING DEVICE

CROSS REFERENCES TO RELATED APPLICATIONS

This application is a continuation-in-part of U.S. patent application Ser. No. 10/205,144 filed on Jul. 23, 2002 now U.S. Pat. No. 6,843,418 and U.S. patent application Ser. No. 09/967,232 filed on Sep. 28, 2001 which is a continuation-in-part of Application Ser. No. 09/502,666 filed on Feb. 11, 2000 now U.S. Pat. No. 6,398,000.

FIELD OF THE INVENTION

The present invention relates generally to the field of document processing systems and, more particularly, to systems and methods for processing currency bills and documents bearing barcodes in a document processing device.

BACKGROUND OF THE INVENTION

Manufacturers of slot machines used in casinos and other gaming establishments are developing coinless redemption slot machines. Lucky winners using these machines receive their payout in the form of a cashout ticket instead of coins or currency bills. The cashout ticket is encoded, typically in the form of a barcode, with a number that is associated with the payout amount. This type of barcoded cashout ticket is assigned a ticket number when it is dispensed to the game player, and this ticket number is printed as a barcode on the face of the ticket. The payout amount is not encoded on the ticket, but rather is stored, typically in a remote database, along with the ticket number. Another form of a cashout ticket includes two barcodes. One of the barcodes represents a ticket number, and another barcode represents the payout amount.

To redeem the payout, the winner may insert the cashout ticket into a validator or acceptor of a slot machine or casino redemption machine which validates the ticket and either dispenses the payout amount in cash or awards the winner a number of credits commensurate with the payout amount. The validator also accepts currency bills. When the casino operators empty the validators, the cartridges may contain a combination of currency bills and cashout tickets.

Most casinos are equipped with currency processing devices which rapidly sort, count, and authenticate currency bills. However, these machines cannot handle or recognize cashout tickets, so the operator must manually hand-sort the currency bills from the cashout tickets so that they can be processed separately. The hand-sorting and manual-entry steps are both time and labor intensive.

Other markets besides the gaming market would benefit from a device that could process both currency and currency substitutes. For example, some retailers are placing self-checkout stations at the point-of-sale. A customer gathers the products to be purchased and self-scans the products at the self-checkout station without the assistance of a cashier. The customer may pay by credit or debit card or by cash, for example. If paying by cash, the customer typically inserts the currency bills into a bill acceptor or bill validator at the self-checkout station. However, the customer may also desire to redeem store coupons, for example, at the point-of-sale. To do so, the customer would deposit store coupons into a receptacle at the self-checkout station. The cartridges in the self-checkout station would thus contain both currency bills and store coupons.

When the store operators empty the cartridges, they must hand-sort the store coupons from the currency bills and process the store coupons separately. Again, this hand sorting and separate processing is tedious and requires multiple counting machines. A single machine that could process both currency bills and store coupons would save time, lower costs, and increase the overall desirability of using self-checkout stations.

Banking institutions may also benefit from a device capable of reading both currency bills and substitute currency media such as checks, deposit slips, etc.

SUMMARY OF THE INVENTION

According to one embodiment of the present invention, there is provided an evaluation system for evaluating documents. The evaluation system comprises at least one media detector for determining whether substitute currency media are valid based on at least one barcoded indicia of the substitute currency media, at least one currency detector for determining whether currency bills are valid based on at least one characteristic of the currency bills, and at least one imager for capturing an image of at least a portion of the substitute currency media and the currency bills. The imager creates an image file from the captured image. The evaluation region also includes a controller for controlling the at least one media detector, currency detector and imager, wherein the controller further receives the image file and processes the image file for storage.

In another embodiment, the present invention relates to an evaluation system comprising at least one media detector for determining whether substitute currency media are valid based on at least one barcoded indicia of the substitute currency media, at least one imager for determining whether currency bills are valid and for capturing an image of at least a portion of the currency bills, wherein the imager creates an image file from the captured image, and a controller for controlling the at least one media detector and the at least one imager, wherein the controller further receives the image file and processes the image file for storage.

In another embodiment, the present invention relates to an evaluation system comprising at least one currency detector for determining whether currency bills are valid based on at least one characteristic of the currency bill and at least one imager for determining whether substitute currency media are valid based on at least one barcoded indicia of the substitute currency media. The imager captures an image of at least a portion of the substitute currency media and creates an image file from the captured image. The evaluation region also includes a controller for controlling the at least one currency detector and the at least one imager, wherein the controller further receives the image file and processes the image file for storage.

In another embodiment, the present invention relates to an evaluation system comprising at least one imager for determining whether substitute currency media and currency bills are valid based on at least one barcoded indicia of the substitute currency media and based on at least one characteristic of the currency bills, wherein the imager captures an image of at least a portion of the substitute currency media and creates an image file from the captured image, and a controller for controlling the at least one imager, wherein the controller further receives the image file and processes the image file for storage.

In another embodiment, the present invention relates to a method for processing documents. The method comprises transporting substitute currency media and currency bills past an evaluation region in order to determine if the substitute currency media and currency bills are valid, capturing an image of at least a portion of the substitute currency media and the currency bills as they pass through the evaluation region, determining whether a valid currency bill is detected based on at least one characteristic of the currency bills, and determining whether a valid substitute currency medium is detected based on a barcoded indicia of the substitute currency medium.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other features of the invention will become apparent upon reading the following detailed description in conjunction with the drawings in which:

FIGS. 1*e*–1*j* are functional block diagrams of an evaluation region of a document processing device according to various embodiments of the present invention;

DETAILED DESCRIPTION OF THE ILLUSTRATED EMBODIMENTS

Figure 1A:
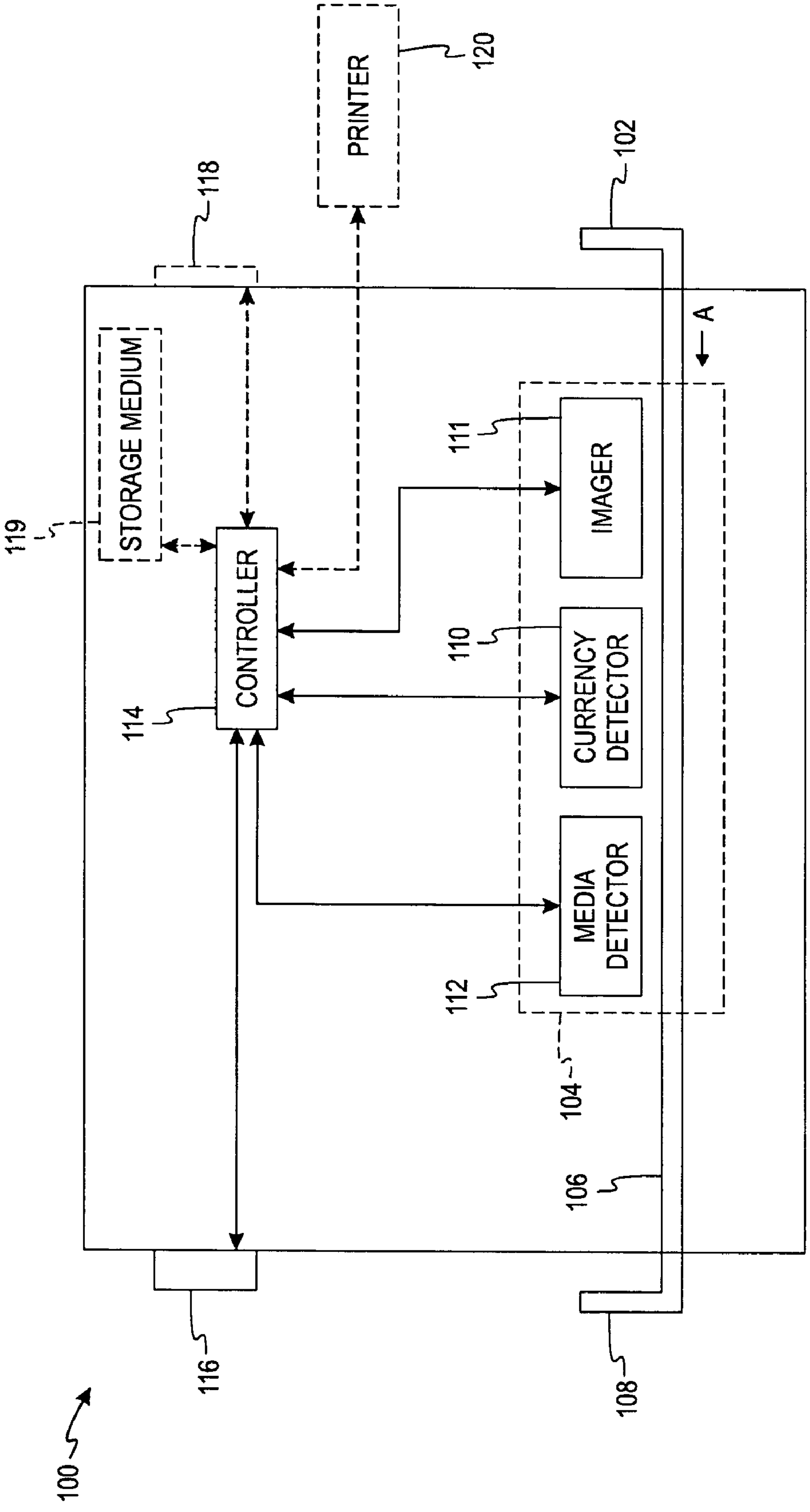
FIGS. 1*a*–1*d* are functional block diagrams of a document processing device according to various embodiments of the present invention.

FIG. 1*a* is a functional block diagram of a document processing device 100 according to one embodiment of the present invention. The document processing device 100 generally includes an input receptacle 102, an evaluation region 104, a transport mechanism 106, and an output receptacle 108. As explained below, in alternate embodiments, the device 100 includes more than one output receptacle 108. The output receptacle 108 may also be variously referred to as a reject or offsort pocket or receptacle. Disposed along the transport path 106, within the evaluation region 104, is a currency detector 110, a media detector 112, and an imager 111. Although the imager 111, currency detector 110, and media detector 112 are illustrated in a specific order along the transport mechanism 106, it will be understood by one skilled in the art that the imager 111, currency detector 110, and media detector 112 may be in any order. The currency detector 110, imager 111, media detector 112, and a control unit 116 are connected to a controller 114, which is adapted to control the operation of the device 100 and to communicate information to and from the control unit 116. For example, the controller 114 may send display information to and receive operator input from the control unit 116. Optionally, the control unit 116 may comprise a touch screen which is coupled to the device 100, or it may comprise a combination of a desktop computer or laptop, display, and/or keyboard which are coupled to the device 100. An optional printer 120 is shown coupled to the device 100. In an alternate embodiment, the device 100 is not coupled to a printer 120.

In the illustrated embodiment, the device 100 optionally includes a communications port 118 which is coupled to the controller 114. The controller 114 may comprise one or more processors which are adapted to control specific components in the device 100 and to process information associated with specific components in the device 100, such as the control unit 116, or the communications port 118. The communications port 118 may optionally be a serial port, a parallel port, a USB port, a wireless port adapted for wireless communication with a remote device, or any other suitable I/O port. In an alternate embodiment, the device 100 does not include the communications port 118. The controller 114 may further comprise memory, such as random access memory or any other suitable memory.

Although the currency detector 110 is shown to be disposed on one side of the transport mechanism 106, it is understood that the currency detector 110 may instead be disposed on the opposite side of the transport mechanism 106 only or on both sides of the transport mechanism 106. In the same manner, the media detector 112 and/or the imager 111 may be disposed on the opposite side of the transport mechanism 106 only or on both sides of the transport mechanism 106. These alternate embodiments are described in more detail in connection with FIG. 1*e*–1*j* below.

In the illustrated embodiment of FIG. 1*a*, a stack of currency bills and substitute currency media is provided to the input receptacle 102 in any order or in a predetermined order. In one embodiment, the operator provides a mixed combination of currency bills and substitute currency media to the input receptacle 102, which are processed and delivered to one or more output receptacles. In another embodiment, the operator provides a stack of currency bills only to the input receptacle 102, which are processed and delivered to one or more output receptacles, and then a stack of substitute media only to the input receptacle 102, which are processed and delivered to one or more output receptacles, or vice versa. In this embodiment, the operator may further indicate via the control unit 116 which type of document is to be processed, and the controller 114 may "deactivate" one or more detectors in the evaluation region 104 based on the document being processed. For example, if the operator indicates that the type of documents to be processed is currency bills, the controller 114 may instruct the media detector 112 to ignore the document as it passes along the transport mechanism 106. Alternatively, if the operator indicates that the type of documents to be processed is substitute currency media, the controller 114 may instruct the currency detector 110 to ignore the document as it passes along the transport mechanism 106. Alternatively, the currency detector 110, imager 111, and the substitute currency media 112 detect characteristics of the document passing along the transport path, and the control unit 116 may alert the operator of an error condition, such as a substitute currency medium was detected in a stack of currency bills, or a currency bill was detected in a stack of substitute currency media. The operator may set aside the detected document for later processing.

As used herein, a U.S. currency bill refers to U.S. legal tender, such as a $1, $2, $5, $10, $20, $50, or $100 note, and a foreign currency bill refers to any bank note issued by a non-U.S. governmental agency as legal tender, such as a Euro, Japanese Yen, or British Pound note. A "currency bill" can be either a U.S. or foreign currency bill. The terms "currency note" and "bank note," are synonymous with the term "currency bill."

The term "substitute currency media" refers to documents including at least one indicia such as a barcode, a magnetic ink character recognition (MICR) pattern, characters readable by optical character recognition (OCR), including information printed according to the OCR-A and OCR-B fonts, a magnetic pattern, an optical variable device (OVD) pattern such as a hologram, a magnetic or electrically conductive thread, conductive ink, magnetic ink, an electrically conductive polymer, perforations, a coded watermark, or other encoded information. One type of substitute currency media may be a redeemable document that can be (a) redeemed for cash or (b) exchanged for goods or services or (c) both. Examples of substitute currency media include without limitation: casino cashout tickets (also variously called cashout vouchers or coupons) such as "EZ Pay" tickets issued by International Gaming Technology, "Quicket" tickets issued by Casino Data Systems, or Cash-Free™ slot-machine tickets issued by Slot-Tickets.com. Substitute currency media may also include casino script, which is regularly issued by casinos in pre-set denominations such as $5 casino script and $20 casino script. Promotional media such as Disney Dollars or Toys 'R Us "Geoffrey Dollars" or McDonald's Gift Certificates are also issued in pre-set denominations (e.g., a $1 Disney Dollar). While some types of "substitute currency media" are regularly issued in pre-set denominations such as the above-mentioned Disney Dollars, other types of "substitute currency media" include manufacturer or retailer coupons, gift certificates, gift cards, or food stamps. In addition, another type of substitute currency media may be financial institution media such as deposit slips and checks.

As used herein, a "document" includes a currency bill or a substitute currency medium. Likewise, the term "documents" includes currency bills and/or substitute currency media.

The term "substitute funds" includes casino script, paper tokens, and barcoded tickets. The term substitute currency media encompasses substitute funds, such that the term substitute funds defines a subset of documents encompassed by the term substitute currency media.

As is known, the dimensions of a U.S. currency bill are about 2.5 inches×6 inches (6.5 cm×15.5 cm). All U.S. currency bills have the same dimensions, but in many foreign countries, the dimensions from one denomination to another varies. In addition, certain types of substitute currency media such as "EZ Pay" tickets have approximately the same dimensions of U.S. currency, however, it is understood that the dimensions of substitute currency media may vary from type to type. The device 100 of the present invention according to any embodiment described herein is adapted to process documents having the same dimension or documents having varied dimensions.

Still referring to FIG. 1*a*, the transport mechanism 106 is adapted to transport the documents, one at a time, through the device 100 in the direction of arrow A, past the currency detector 110, imager 111, and the media detector 112, and to the output receptacle 108. The currency detector 110 is adapted to detect one or more predetermined characteristics on a currency bill or on a particular kind of substitute currency medium, such as a Disney Dollar, and the media detector 112 is adapted to detect one or more predetermined characteristics on a particular kind of substitute currency medium, such as a barcode on a barcoded ticket, as explained in more detail in connection with FIG. 1*b*. The imager 111 captures an image of at least a portion of the currency bill, the substitute currency medium, or both. The imager 111 may also include an image quality unit to monitor the image quality generated by the imager 111. Various other aspects of an imager 111 that may be utilized by the present invention are described in detail in U.S. Pat. Nos. 6,731,786 and 6,363,164, which are hereby incorporated by reference.

The currency detector 110 comprises one or more sensors depending on a number of variables. The variables relate to whether the device 100 is authenticating, counting, or discriminating denominations of currency bills, and what distinguishing characteristics of the currency bills are being examined, for example, size, thickness, color, magnetism, reflectivity, absorbability, transmissivity, electrical conductivity, serial number, and so forth. The currency detector 110 may also employ a variety of detection means including, but not limited to, any combination of the following: a size detector, a density sensor, an upper optical scan head, a lower optical scan head, a single or plurality of magnetic sensors, a thread sensor, an infrared sensor, an ultraviolet/fluorescent light scan head, or an image scanner. These detection means and a host of others are disclosed in commonly assigned U.S. Pat. No. 6,278,795, entitled "Multi-Pocket Currency Discriminator," which is herein incorporated by reference in its entirety, and co-pending U.S. patent application Ser. No. 09/965,428, entitled "A Document Processing System Using Full Image Scanning," filed on Sep. 27, 2001, which is herein incorporated by reference in its entirety. Examples of discriminating denomination information from a currency bill are shown and disclosed in commonly assigned U.S. Pat. No. 5,815,592, which is herein incorporated by reference in its entirety.

In the specific case of substitute currency media, the variables may also relate to what distinguishing characteristics of the substitute currency media are being examined. The detection of these distinguishing characteristics may be carried out by the media detector 112, which, in alternate embodiments, may employ a variety of detection means including, but not limited to, any combination of the following: a barcode reader, an optical scan head, a magnetic sensor, a thread sensor, an infrared sensor, an ultraviolet/fluorescent light scan head, an image scanner, or an imaging camera. These detection means and a host of others are disclosed in commonly assigned U.S. Pat. No. 6,278,795, entitled "Multi-Pocket Currency Discriminator," previously incorporated by reference, and co-pending U.S. patent application Ser. No. 09/965,428, entitled "A Document Processing System Using Full Image Scanning," filed on Sep. 27, 2001, also previously incorporated by reference, and may be modified in accordance with the present invention to detect distinguishing characteristics associated with substitute currency media or to capture an electronic image of one or both sides of a medium.

Some environments, such as a casino environment, may desire to retain copies of processed substitute currency media for record-keeping or other purposes, such as compliance with gaming regulations. In such environments, the media detector 112 may be utilized in conjunction with or replaced with the imager 111. The imager 111 captures, via an imaging camera and/or scanner, an electronic image of one or both sides of a passing substitute currency medium and/or a currency bill. The imager 111 may provide either raw image data or an image file to the controller 114. Processing of the raw image data may be performed by the controller 114 or at another location.

The electronic image may be analyzed by software for a type of indicia, and the indicia may be decoded by software. The use of software to analyze and decode the indicia eliminates the need to include a reader, such as a barcode reader, in the imager 111. After processing, the processed substitute currency medium can be discarded, and the electronic image may be stored on one or more storage media, such as the storage medium 119, hard drives, CD-ROMs, or DVDs, all of which may be co-located with the device 100, remote from the device 100, or pluggable/portable. Accordingly, this embodiment eliminates the need for large physical storage space to house the processed substitute currency media.

The use of software to analyze and decode the indicia eliminates the need to include the media detector 112 in some embodiments. For example, if speed is not a concern, then the imager 111 may replace the media detector 112, the currency detector 110, or both as described with reference to FIGS. 1*b*–1*d*. Moreover, the substitute currency media may also be electronically indexed or cross-referenced, simplifying future retrieval and archiving. Once the image is captured, data may be extracted from the image and appended to the image file to aid in retrieval or searching of image files at the storage medium 119. For example, MICR data may be retrieved from the image file rather than read from the media detector 112 in some embodiments of the present invention. In other embodiments, data such as transaction data, location data, time stamp data, employee ID data, currency bill serial numbers, amount written for a check or deposit slip, etc. may be appended to the image file for indexing and searching purposes. In addition, the extracted data or additional data may be maintained separate from the image file and utilized by other portions of systems utilized in conjunction with the document processing device 100.

Figure 1B:
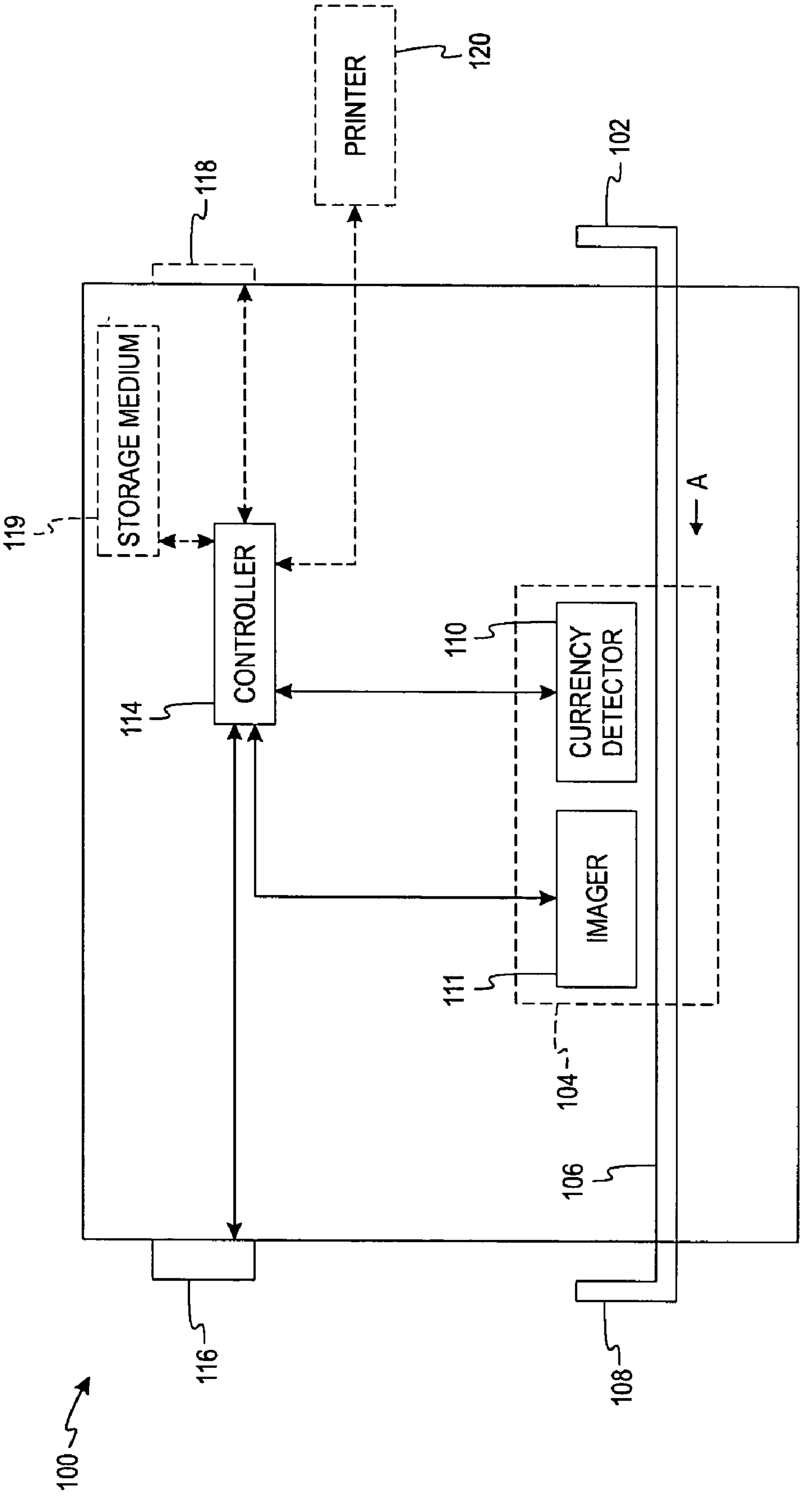

FIG. 1*b* shows a functional block diagram of a document processing device 100 according to an alternate embodiment of the present invention. As set forth above, the imager 111, may replace one or more components of the evaluation region 104. In this embodiment, the imager 111 replaces the media detector 112 and therefore the imager 111 captures images of at least a portion of the substitute currency media in order to validate the substitute currency media. The imager 111 may capture, for example, a barcode of the substitute currency media and transmit the image to the controller 114. The controller 114 may then compare the captured image to data that is stored in the storage medium 119 to determine whether the substitute currency media is valid. In other embodiments, the comparison may be carried out at other portions of the device 100 or at an alternate location, such as a control unit (not shown).

The imager 111 may also capture images of at least a portion of currency bills. The imager 111 may capture more than one image for each document. For example, the imager 111, may capture an image of the entire top or bottom surface of substitute currency media and another image may be captured of the indicia region. Similarly, the imager 111, may capture an image of the entire top or bottom surface of a currency bill and a second image may be captured of a predetermined characteristic such as a watermark or serial number. The imager 111 may capture images of currency bills before or after the currency bills are analyzed by the currency detector 110. In alternate embodiments, the imager 111 may not capture images of the currency bills or may only capture images if a discrepancy is detected by the currency detector 110. For example, the currency detector 110 may note a possible error when analyzing a currency bill and, in response, send an image check signal to the controller 114. The controller 114 then alerts the imager 111 to capture an image of the currency bill in question.

When the device 100 is utilized by a financial institution, a user may place a deposit slip and a number of checks and/or currency bills at the input receptacle 102. When the currency detector 110 does not recognize a document, i.e., when a deposit slip or check passes through the transport mechanism 106, then the imager 111 may be alerted via the image check signal and the controller 114 to capture an image of the document. In addition, a business may utilize the device 100 to scan documents at the business's location and receive immediate credit electronically through an outside accounting system located at the financial institution. The financial institution may also use the device 100 as an automated teller machine, or throughout branches of the financial institution. Financial institutions may utilize the imager 111 to scan unrecognizable documents for an employee to later discern an amount written or shown on the document. In this case, the image file may be flagged for later follow up.

Figure 1C:
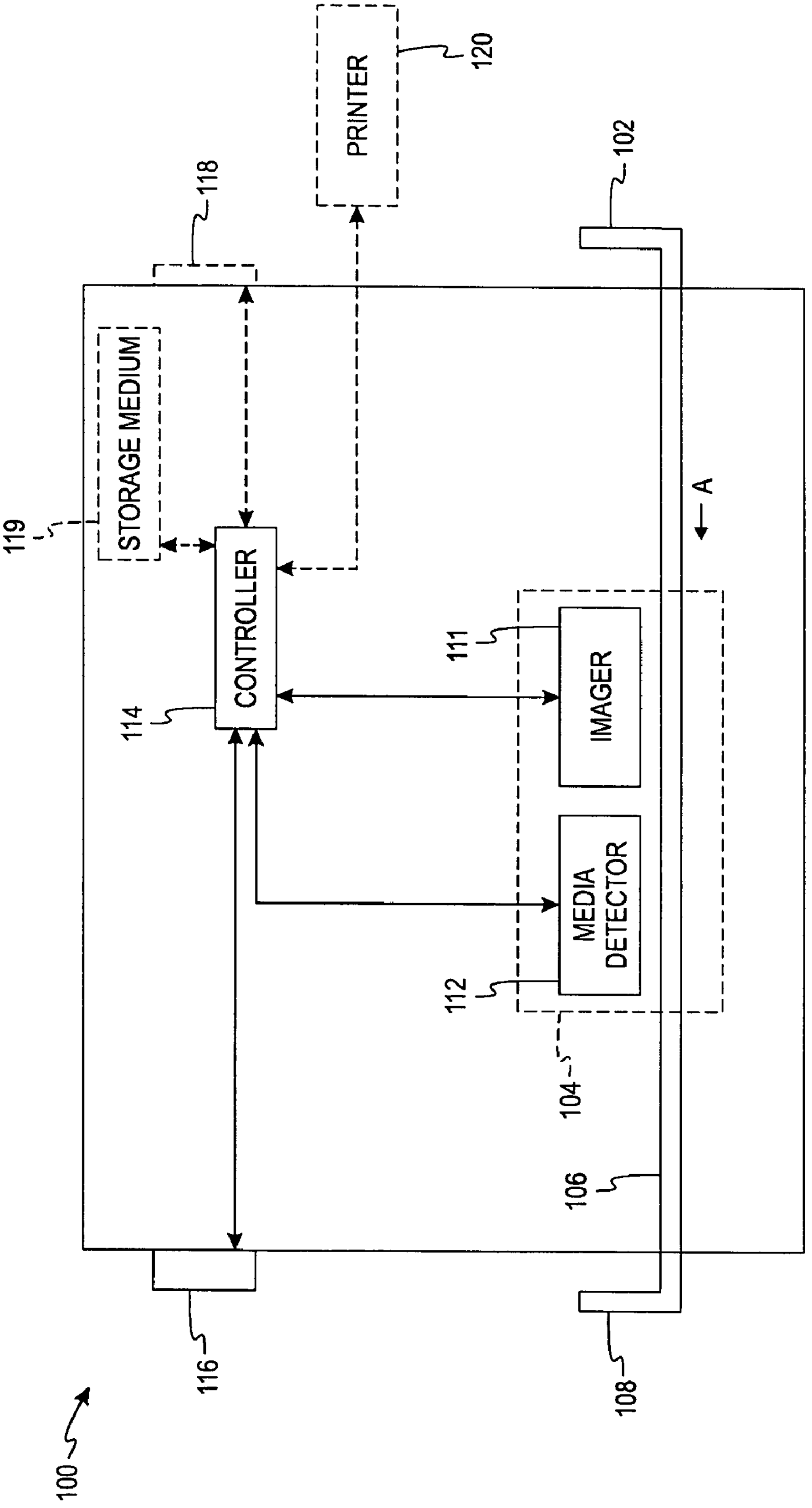

FIG. 1*c* shows a functional block diagram of a document processing device 100 according to an alternate embodiment of the present invention. In this embodiment, the imager 111 may be utilized to replace the currency detector 110. Here the imager 111 captures images of at least a portion of the currency bills. The imager 111 transmits the captured image to the controller 114 for evaluation. The controller 114 may then compare the captured image to data stored at the storage medium 119 to determine authenticity, denomination, etc. In alternate embodiments, other portions of the device 100 or a separate control unit (not shown) may perform the comparison to determine whether the currency bills are valid.

The media detector 112 functions in a manner similar to that noted in FIG. 1*a*. The media detector 112 may also work in conjunction with the imager 111 to analyze substitute currency media. For example, the media detector 112 may detect an error or not recognize a substitute currency medium and send the image check signal to the controller 114. In response, the controller 114 instructs the imager 111 to capture an image of the substitute currency medium. In other embodiments, the imager 111 may not capture images of the substitute currency media, or may capture images of the substitute currency media in specific instances, or in all instances.

In a financial institution scenario, the media detector 110 may analyze substitute currency media such as deposit slips and checks. The imager 111 may then be utilized to analyze currency bills. The imager 111 may further capture images from a check or deposit slip that are typically hand-written (e.g., total deposit amount or the amount for which a check is written).

Figure 1D:
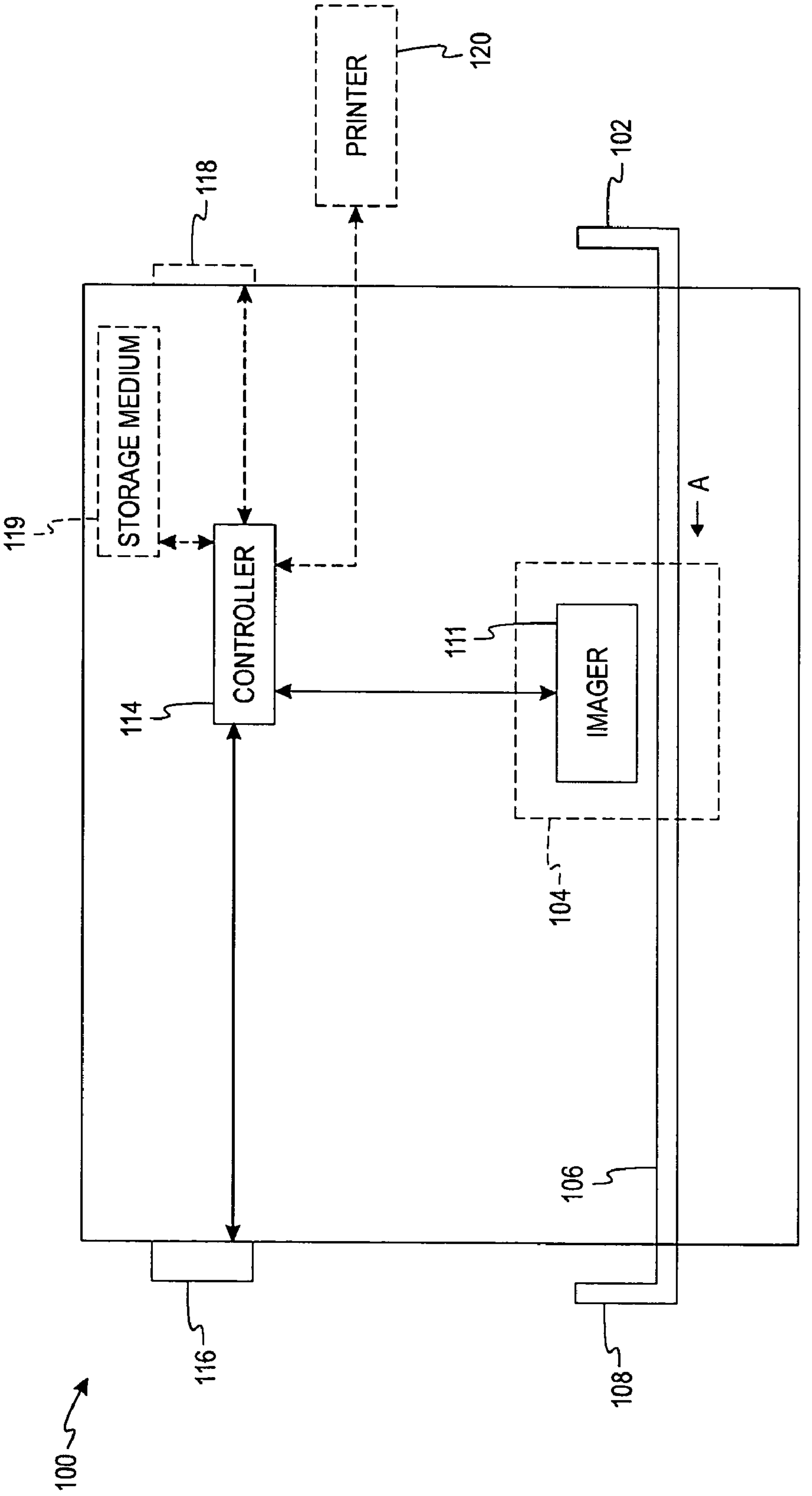

FIG. 1*d* shows a functional block diagram of a document processing device 100 according to an alternate embodiment of the present invention. In this embodiment, the imager 111 replaces both the currency detector 110 and the media detector 112. The imager 111 captures images of at least a portion of both substitute currency media and currency bills. The imager 111 then forwards the captured images to the controller 114 for evaluation. The controller 114 compares the captured images to data stored at the storage medium 119 to determine if the substitute currency media and/or currency bills are authentic. As noted above, the comparison may instead be performed at other portions of the device 100 or at a separate control unit (not shown). As noted above, the imager 111 may also capture further images, such as images of indicia and serial numbers. The images are stored as image files at the storage medium 119 as noted above with respect to FIG. 1*a*.

Figure 1E:
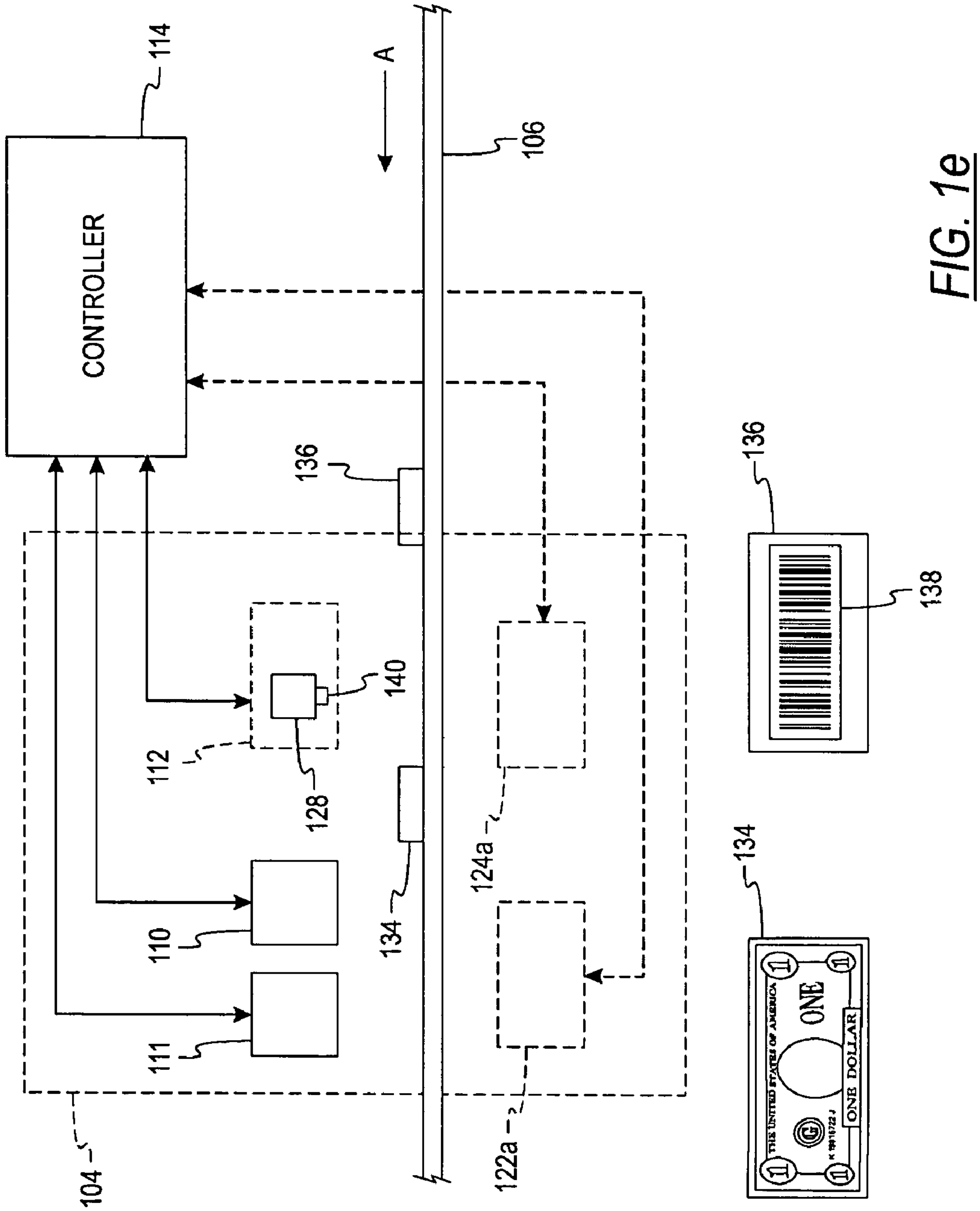

FIG. 1*e* shows a functional block diagram of a portion of an evaluation region 104 according to one embodiment of the present invention. As in the embodiment illustrated in FIG. 1*a*, the evaluation region 104 generally includes a currency detector 110, an imager 111, and a media detector 112. The evaluation region 104 includes various connections to the controller 114. The evaluation region 104 may optionally include a second currency detector 122*a*, a second media detector 124*a*, a second imager (not shown), or a combination of one or more detectors 122*a*, 124*a*, 111*a* which may be disposed on the opposite side of a transport mechanism 106. The currency detector 110 may include any combination of the detection means identified above. In the illustrated embodiment, the media detector 112 may comprise a barcode reader 128 and a mirror (not shown) although other means of detecting indicia may be utilized. Barcode readers are well known in the art, and will not be described in detail herein. Generally, barcode readers typically use a light beam generated by a laser diode or LED light source 140 to illuminate a barcode label. The laser beam or LED beam is deflected in a certain pattern across the barcode label. The reflected light representing the light and dark bars on a barcode label are processed and then converted into a digital signal representing the barcode pattern. The digital signal is analyzed by a controller where the signal is decoded into characters (e.g., alphanumerics and/or punctuation).

In one embodiment, the barcode reader 128 is an MS-911 barcode reader manufactured by Microscan. In alternate embodiments, other barcode readers may be employed, such as, for example, the LM 520, LazerData 8000, LazerData 9000E, or LD12000 barcode readers manufactured by PSC, Inc., the MS-880, MS-7100 or MS-7180 barcode readers manufactured by Microscan, the Maxiscan 2100 or Maxiscan 3300 barcode readers manufactured by Intermec, or an LED barcode reader manufactured by Welch Allyn. It is understood that the present invention is not limited to any particular barcode reader. The selection of a particular barcode reader depends on a number of factors, including size constraints in the evaluation region 104 of the document processing device, the particular barcode symbology to be scanned, and the desired scan rate. For example, the LazerData 9000E, manufactured by PSC, Inc., has scan rates ranging from 500 scans per second to 2000 scans per second, and is adapted to scan a linear barcode. The dimensions of the LazerData 9000E are approximately 3.84" (D)×2.52" (L)×2.52" (W), or 97.5 mm (D)×64 mm (L)×64 mm (W). The MS-911 barcode reader has dimensions of approximately 3" (H)×2.13" (W)×1.63" (D), or 75 mm (H)×53.5 mm (W)×41 mm (D), and has a scan rate of up to 2000 scans per minute although other scan rates are possible.

In the illustrated embodiment shown in FIG. 1*e*, the controller 114 controls the operation of the barcode reader 128, but in alternate embodiments, a separate barcode controller (not shown) controls the operation of the barcode reader 128 and is coupled to the controller 114. The controller 114 also controls other operations of the document processing device 100.

Still referring to FIG. 1*e*, the media detector 112 optionally includes the barcode reader 128 and the mirror (not shown). The mirror is positioned proximate the barcode reader 128 to “lengthen” the effective distance between the barcode reader 128 and the document to be scanned, in applications where the barcode reader 128 is placed too close to the document. As is known, some barcode readers require that they be placed within a range of distance from the scanning surface. If the distance is outside the distance range specifications, the barcode reader cannot obtain reliable and accurate readings. In such applications, the mirror may be positioned to deflect the light beam from the barcode reader 128 onto the document passing along the transport path 106. In alternate embodiments in which the barcode reader 128 is positioned within distance range specifications, the mirror is not included.

Still referring to FIG. 1*e*, a currency bill 134 and a barcoded ticket 136 are shown on the transport mechanism 106. Although the below embodiment describes a barcoded ticket 136 it will be understood by one skilled in the art that numerous other indicia may be utilized. In one embodiment, the barcode or other indicia encodes characters, such as numbers, which are associated with certain information. For example, on a casino cashout ticket, the barcode number may be associated with any combination of the following: a payout amount; a ticket number; identification information associated with the slot machine that dispensed the casino cashout ticket, such as, for example, the slot machine number, the time of dispensation, and the amount of payout from the dispensing slot machine during a time period; identification information associated with the winner of the casino cashout ticket; and so forth. On a gift certificate, the barcode number may be associated with any combination of the following: a gift amount; a gift certificate number; information about a retailer dispensing the gift certificate; terms and conditions information; and so forth. In an alternate embodiment, the barcode encodes a number which is associated with a certain discount. For example, on a store coupon, the barcode number is typically associated with a promotional discount, such as fifty cents off, or buy one, get one free. The barcode numbers and their corresponding monetary and discount amounts are typically stored in a database. When the barcode number is scanned and identified, the corresponding amount or discount is queried from the database. The database may also include information indicative of whether a ticket has been redeemed. For example, to prevent fraudulent use of cashout tickets in the casino environment, the database may also keep track of whether a cashout ticket has been redeemed. In yet other embodiments, the barcode may encode any combination of numbers, letters, punctuation, or other characters. It is understood that a barcode in accordance with any embodiment shown or described herein may encode characters including any combination of numbers, letters, punctuation, or other characters.

Barcodes are well known in the art, and there are numerous barcode symbologies, such as, for example, Codabar, Code 3 of 9, Interleaved 2 of 5, UPC, EAN 8, EAN 13, Postnet, Planet Code, Aztec Code, Code 11, Code 16K, Code 49, Code 93, Code 128, Data Matrix, MaxiCode, 3D or bumpy barcode, to name just a few. These and other barcode symbologies encode characters such as numbers, letters, and/or punctuation. Barcodes can be linear, like the UPC code, 2-D like the MaxiCode, or 3-D like the bumpy barcode. Barcodes are typically black and white, but they may also be in color. In the illustrated embodiment of FIG. 1*b*, the barcode reader 128 is capable of scanning a linear barcode. A linear barcode typically comprises a series of parallel dark bars of varying widths with intervening light spaces, also of varying widths. It is expressly understood that the present invention is not limited to any particular barcode symbology or to any particular barcode reader. In alternate embodiments, multiple barcode readers may be disposed in the evaluation region 104 to identify different barcode symbologies. For example, a retailer may accept both store coupons and gift certificates, but the gift certificates may be encoded with a different barcode symbology than the store coupons. In such a case, the evaluation region 104 may include two barcode readers, one to identify barcodes disposed on the gift certificates, and one to identify barcodes disposed on the store coupons.

Still referring to FIG. 1*e*, the currency bill 134 and barcoded ticket 136 are transported along the transport mechanism 106 in the direction of arrow A. In the illustrated embodiment, the currency bill 134 and barcoded ticket 136 are first transported past the media detector 112 and then past the currency detector 110 and imager 111. However, in an alternate embodiment, a document may be transported past the currency detector 110, media detector 112, and imager 111 in any order. The imager 111 captures images of at least a portion of the currency bills, substitute currency media, or both. The imager 111 may be utilized to capture only images of the substitute currency media or capture only images of the currency bills. The imager 111 may also capture images of every document as it passes through the transport mechanism 106 or the imager 11 may capture images in specific cases, such as when the currency detector 110 and/or the media detector 112 are unable to identify or analyze a document. In this case, the currency detector 110 and/or the media detector 112 send an image check signal to the controller 114 which in turn instructs the imager 111 to capture an image of the document in question.

For example, if the barcode reader 128 does not identify a barcode on the currency bill 134, the barcode reader 128 provides the image check signal, in this instance a "no read" electrical signal, to the controller 114 indicating that no barcode was read or identified in that scan. As used herein, a substitute currency medium having an unreadable or non-existent barcode may be considered an "invalid" substitute currency medium. When a "no read" signal is provided to the controller 114, the controller 114 may activate the currency detector 110 and/or the imager 111 for subsequent scanning of the document. Alternatively, the currency detector 110 and imager 111 may always be active and therefore no activation by the controller 114 is necessary. If the barcode reader 128 successfully reads the barcode 138 on the barcoded ticket 136, the barcode reader 128 provides a "good read" electrical signal to the controller 114 indicating that the barcode reader 128 read or identified the barcode 138. As used herein, the term "valid substitute currency medium" refers to a document having a barcode identified by the barcode reader 128. When a "good read" signal is passed to the controller 114, the currency detector 110 and/or the imager 111 may be deactivated. In alternate embodiments, the controller 114 may not deactivate the currency detector 110 and/or imager 111.

The barcode reader 128 also provides an electrical signal representative of the barcode pattern 138 to the controller 114. The controller 114 decodes this electrical signal into characters, and stores these characters in memory which may optionally be integrated in the controller 114 or coupled to the controller 114. In some embodiments where the imager 111 captures images of substitute currency media in addition to the media detector 112 capturing information, the image file created from the captured image may be appended with the information received from the media detector 112.

In the illustrated embodiment of FIG. 1*e*, the transport mechanism 106 also transports the currency bill 134 in the direction of arrow A towards the currency detector 110. The currency detector 110 evaluates one or more distinguishing characteristics, such as those specified above, of the currency bill 134. An optional second currency detector 122*a* disposed on the opposite side of the transport mechanism 106 may also evaluate one or more distinguishing characteristics of the currency bill 134.

The controller 114 may include a memory (not shown). In one embodiment, the memory includes master authenticating information. The master authenticating information includes information about authenticating characteristics of a currency bill, such as size, thickness, color, magnetism, reflectivity, absorbability, transmissivity, electrical conductivity, serial number, and so forth. The memory may also include master denomination information. The master denomination information includes information about denomination characteristics of a currency bill. Examples of such characteristics are disclosed in commonly assigned U.S. Pat. No. 5,815,592, previously incorporated by reference. In another embodiment, the memory includes media information, which includes information about the substitute currency media. This information may include, in alternate embodiments, any combination of the following: an amount of money associated with a medium, a ticket number of a casino cashout ticket, the characters encoded on an indicia such as a barcode on a barcoded medium, self-checkout station identification information, casino gaming machine information, information about the identity of the person redeeming the redeemable document, or the time a medium was dispensed, for example. In this embodiment, the media information may be periodically updated in the memory via a computer network coupled to the document processing device 100, such as described in connection with FIG. 11, or the media information may be periodically updated in the memory via personnel, such as retailer or casino personnel. In the latter embodiment, an interface would be provided via the control unit 116 to the personnel to reprogram the memory. The memory may be random access memory, flash memory, EEPROM, or any other suitable rewriteable memory.

As explained above, the printer 120 may optionally be coupled to the device 100. When the device 100 is coupled to the printer 120, the printer 120 may print reports including information about the documents processed by the device 100, such as the reports described in connection with FIGS. 12–13 below. The printer 120 may dispense a redeemable document to an operator of the device 100. For example, as explained below, an operator may deposit a stack of documents containing a mixed combination of currency bills and substitute currency media into the device 100. The device 100 processes the stack of documents, and, according to one embodiment, dispenses a ticket including an indicia such as a barcode that is associated with the total value of documents processed. For example, an operator may deposit $134 of currency bills into the device 100 and $50 worth of redeemable documents. In this example, the device 100 would, dispense a ticket to the operator with an indicia associated with an amount of $184. In another embodiment, the printer 120 prints both reports and dispenses redeemable documents.

Figure 1F:
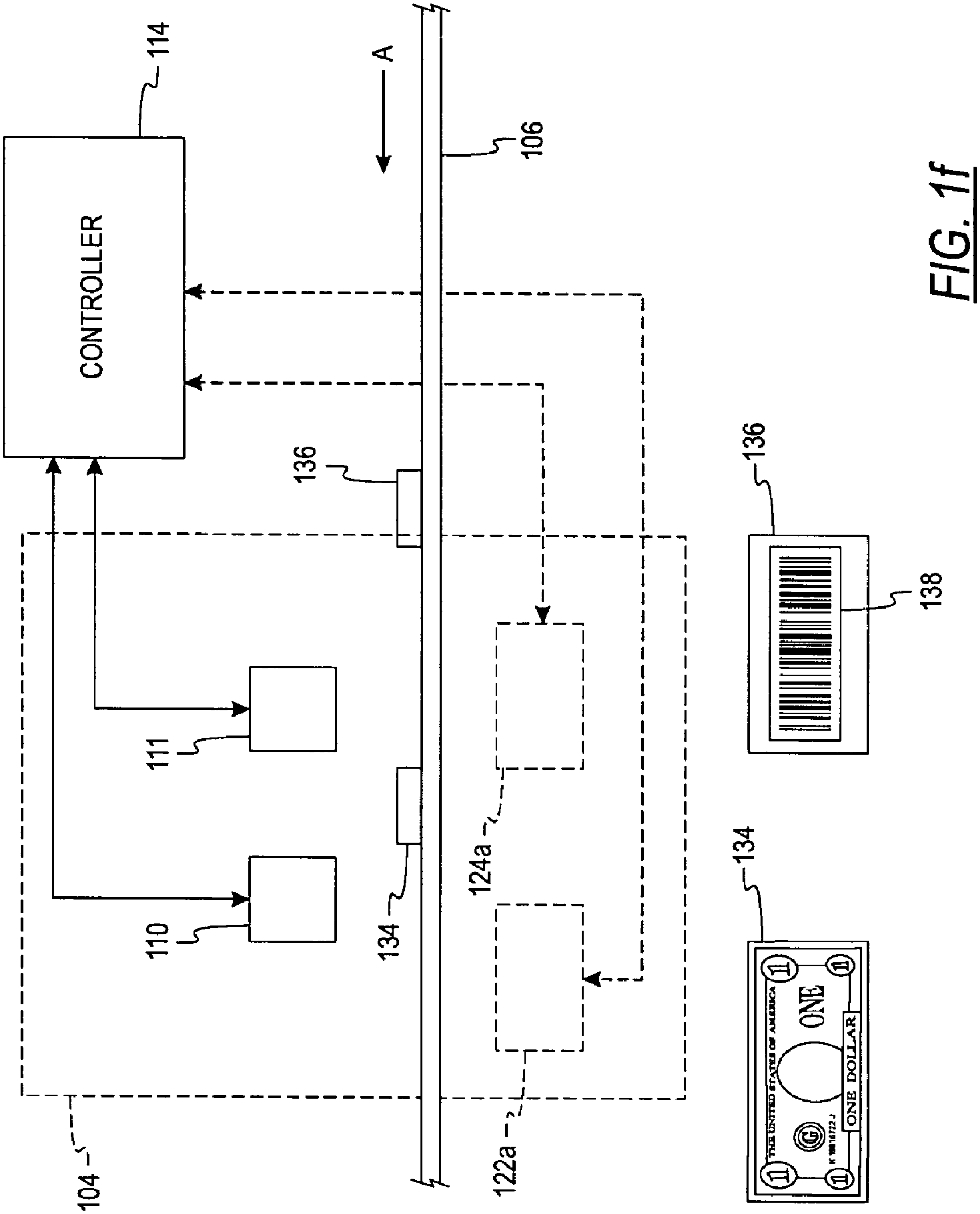

FIG. 1*f* shows a functional block diagram of a portion of an evaluation region 104 according to an alternate embodiment of the present invention. As mentioned above with reference to FIG. 1*b*, the imager 111 may replace the media detector 112. The imager 111, may capture an image of the entire top or bottom surface of substitute currency media and/or an image may be captured of the indicia region. In this way, the imager 111 may capture more than one indicia present on a document. Similarly, the imager 111, may capture an image of the entire top or bottom surface of a currency bill and/or an image may be captured of a predetermined characteristic such as a watermark or serial number. The imager 111 may capture images of currency bills before or after the currency bills are analyzed by the currency detector 110. In alternate embodiments, the imager 111 may not capture images of the currency bills or may only capture images if a discrepancy is detected by the currency detector 110. It will be noted by one skilled in the art that the arrangement of additional media detectors 124*a*, currency detectors 122*a*, and imagers 111*a* may be arranged in any order and an additional imager 111*a* may replace the additional currency detector 122*a*, additional media detector 124*a*, or both.

Figure 1G:
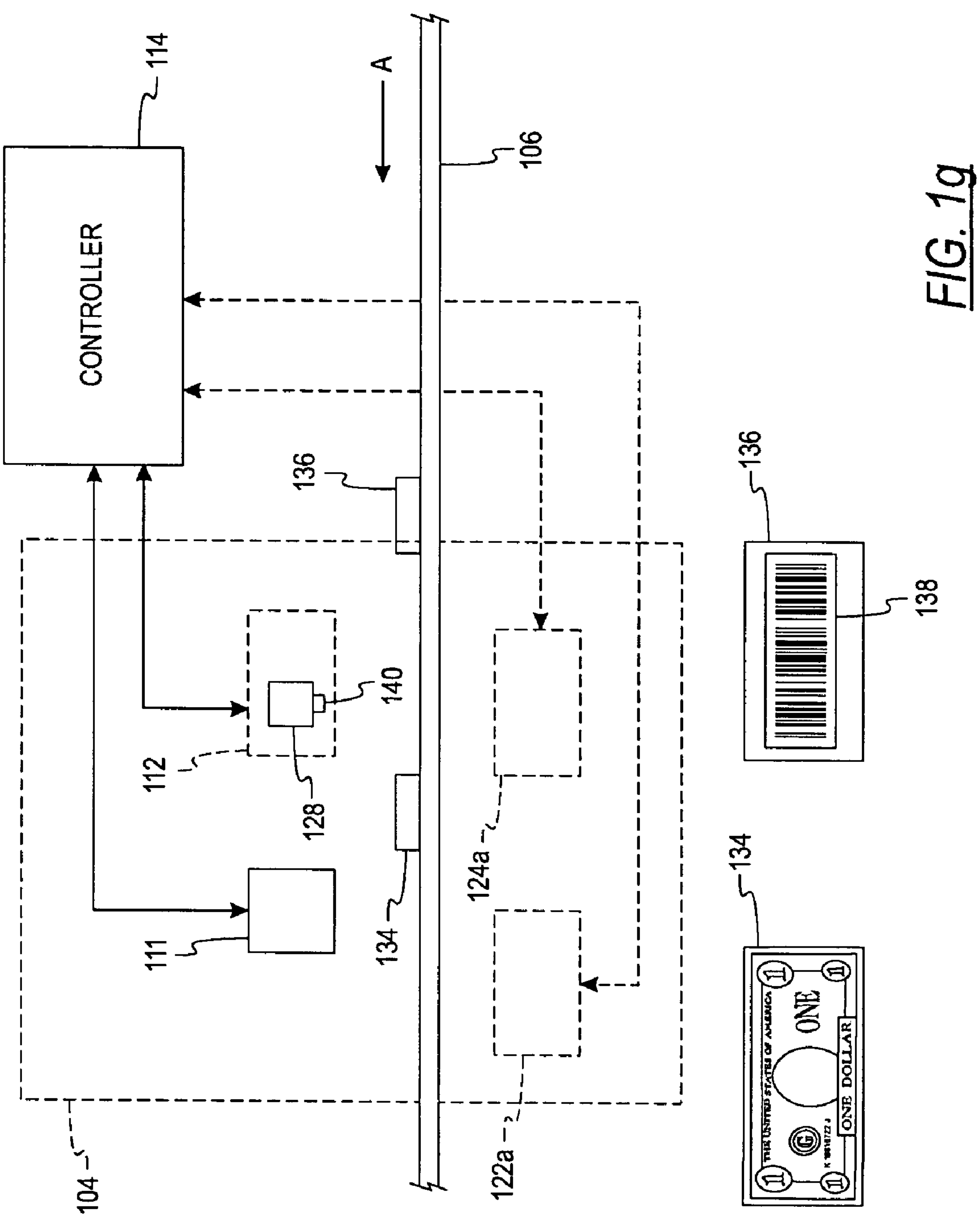

FIG. 1*g* shows a functional block diagram of a portion of an evaluation region 104 according to an alternate embodiment of the present invention. As set forth above in FIG. 1*c*, the imager may replace the currency detector 110. The imager 111 captures images of at least a portion of the currency bills and the media detector 112 functions in a manner similar to that noted in FIG. 1*a* and 1*e*. The media detector 112 may also work in conjunction with the imager 111 to analyze substitute currency media. In other embodiments, the imager 111 may not capture images of the substitute currency media, or may capture images of the substitute currency media in specific instances.

Figure 1H:
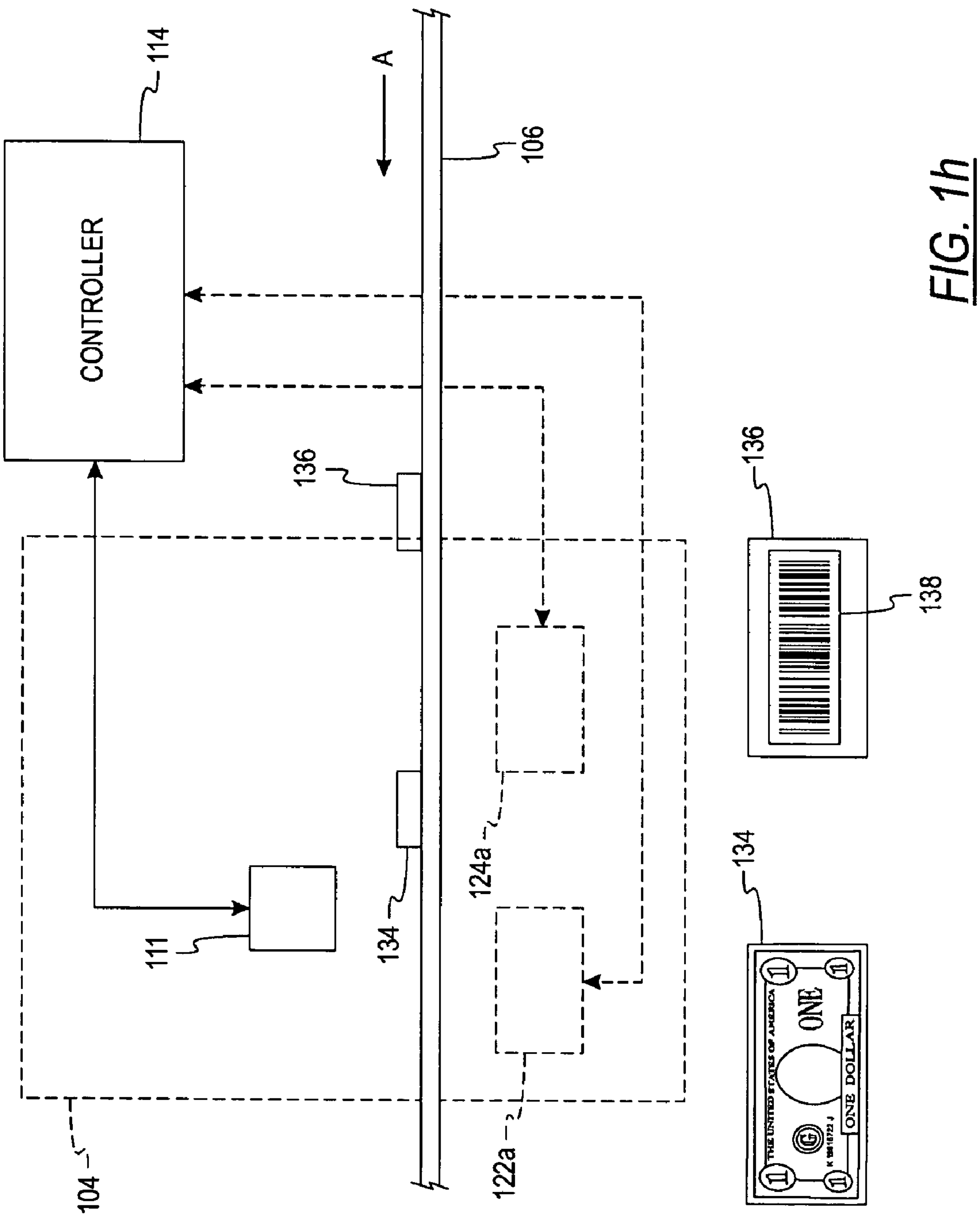

FIG. 1*h* shows a functional block diagram of a portion of an evaluation region 104 according to an alternate embodiment of the present invention. The imager 111 in this embodiment functions as both a media detector and a currency detector. As noted above, the imager 111 may capture images of an entire surface of a document or select portions of the document where an indicia may be printed.

Figure 1I:
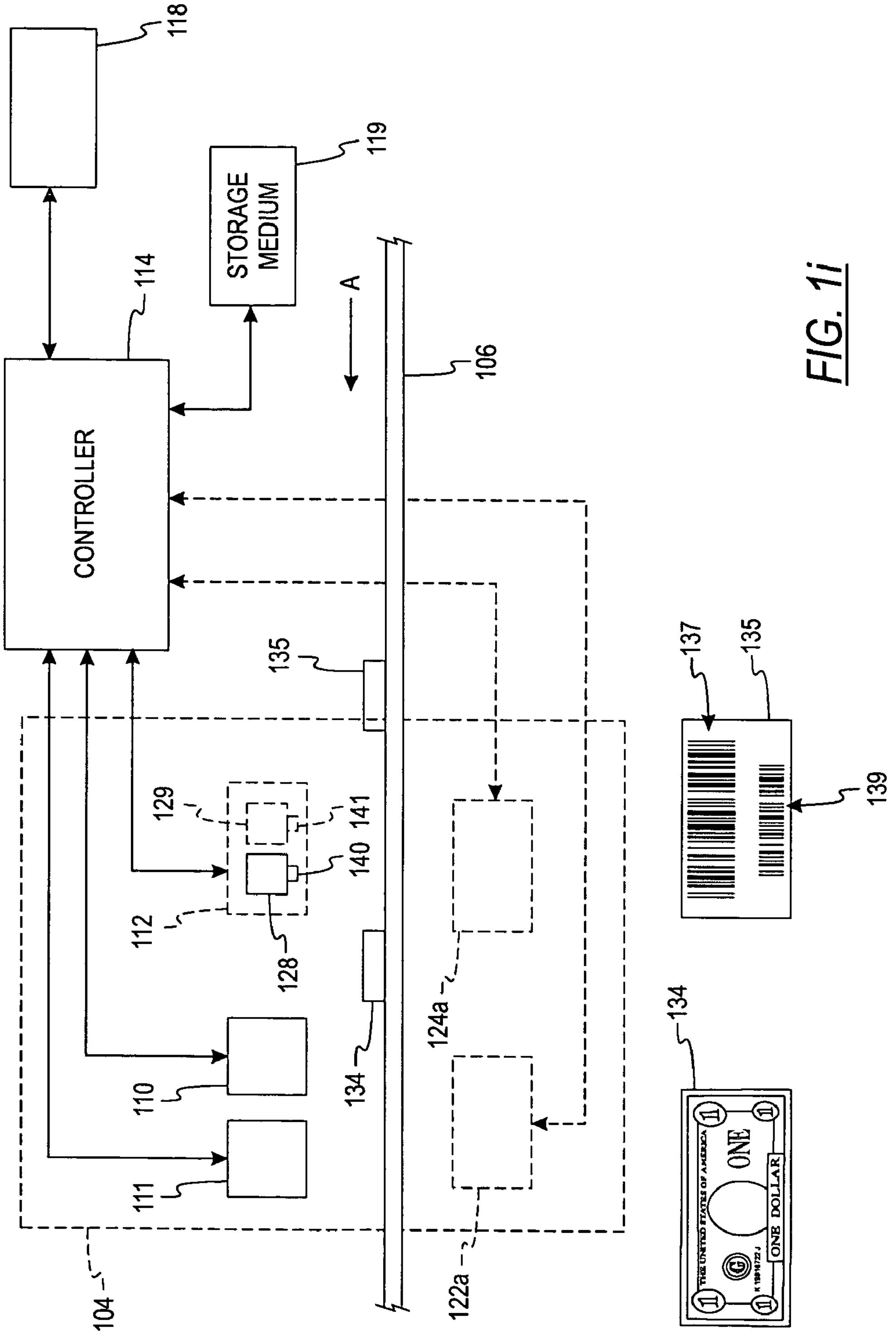
Figure 1I:
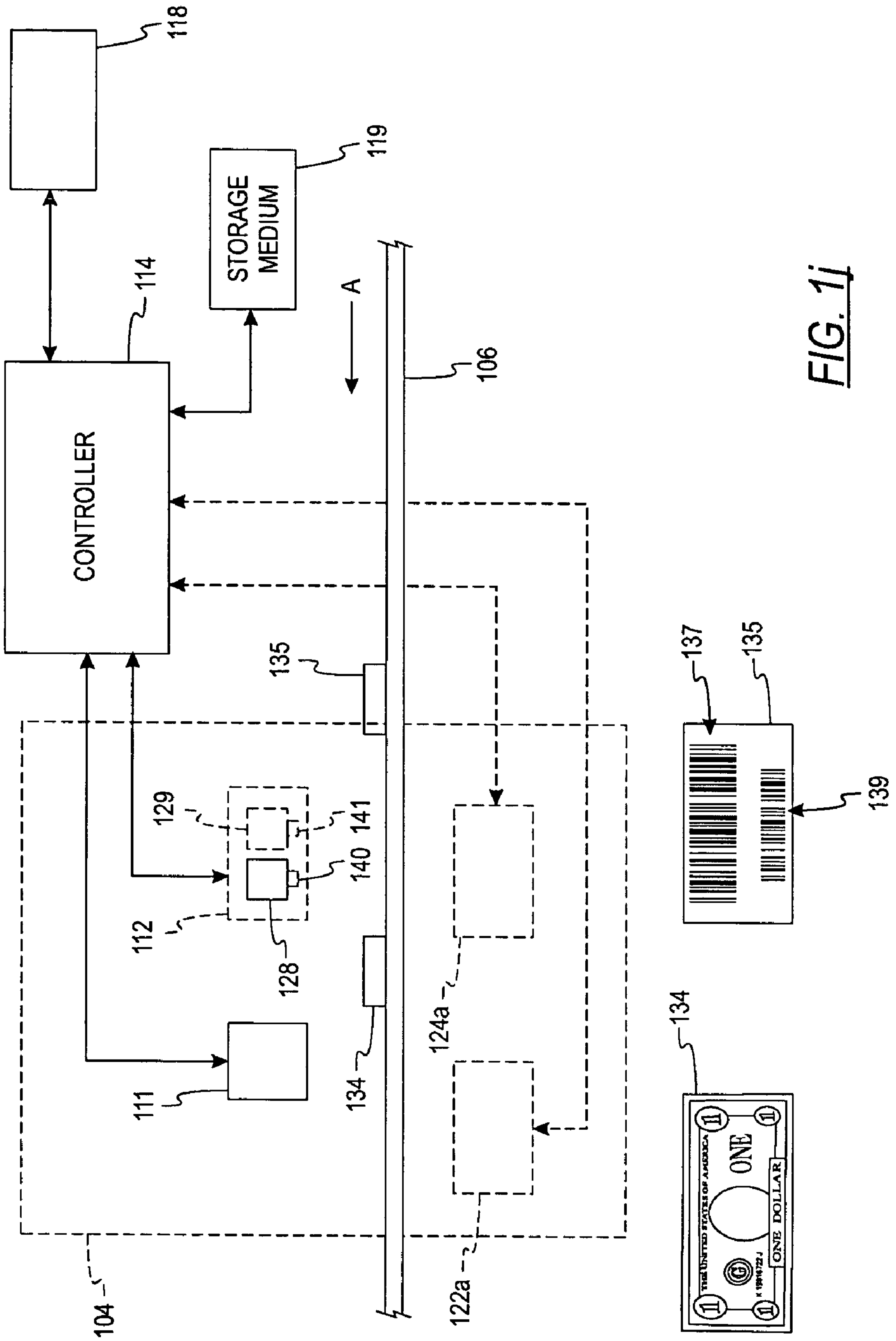

FIG. 1*i* shows an evaluation region 104 which is adapted to process currency bills and substitute currency media bearing more than one indicia. A ticket 135 includes a first indicia pattern 137 and a second indicia pattern 139 disposed on a surface of the ticket 135 in the same orientation. Note that the first indicia pattern 137 and the second indicia pattern 139 could be disposed on opposite surfaces of the ticket 135 or in different orientations. For example, one or both of the first and second indicia patterns 137, 139 could be disposed in a vertical orientation instead of a horizontal orientation as shown.

In a preferred embodiment, the first indicia pattern 137 and the second indicia pattern 139 are encoded according to the same symbology, though they may also be encoded according to different symbologies, including any combination of the symbologies mentioned above. Many commercially available readers are capable of discerning among several different symbologies, so the use of different symbologies on a ticket would not necessarily call for multiple readers. In previous embodiments, as illustrated in FIGS. 1*f*–1*h*, the imager 111 may be utilized to read the additional indicia and therefore additional readers are not necessary. However, if multiple readers are desired, additional readers may be disposed in the media detector 112. An optional second reader 129 is shown in the media detector 112 to scan for indicia patterns on passing documents. Like the barcode reader 128, the optional second reader 129 may include a light source 141 for illuminating the indicia pattern. Readers adapted to detect indicia such as a bumpy barcode include an additional or alternate detection structure as is known in the art.

As explained in connection with FIG. 1*e*, the optional second reader 129 may be disposed in the second media detector 124*a* on the opposite side of the transport mechanism 106. Such an arrangement would permit detection of an indicia pattern regardless of the facing orientation of the document or would permit detection of an indicia pattern disposed on both sides of a document. In other embodiments, two or more readers may be disposed on each side of the transport mechanism 106.

In embodiments having only one media detector disposed on one side of the transport mechanism 106, the substitute currency media would have to be faced such that the barcode(s) could be detected by the barcode reader 128. This facing may be accomplished manually by the operator before depositing the documents into the document processing device. Alternately, a document facing mechanism coupled to the transport mechanism 106 may be employed to rotate a document 180° so that the face position of the document is reversed. Further details of a document facing mechanism which may be utilized for this purpose are disclosed in commonly assigned U.S. Pat. No. 6,074,334, entitled "Document Facing Method and Apparatus," which issued on Jun. 13, 2000, incorporated herein by reference in its entirety. Those skilled in the art will appreciate that the document facing mechanism disclosed in U.S. Pat. No. 6,074,334 can be positioned downstream or upstream of the evaluation region 104. In the case where the document facing mechanism is positioned upstream of the evaluation region 104, a suitable detector, such as a barcode reader (not shown), may be disposed upstream of the document facing mechanism to detect the orientation of a substitute currency medium before it is evaluated by the evaluation region 104.

In the case where the document facing mechanism is positioned downstream of the evaluation region 104, the documents are transported past the evaluation region 104 and those documents which are not properly faced are then rotated by the document facing mechanism. Next, the properly faced document is fed back to the evaluation region 104 either along the same transport path or along a different transport path for processing. This embodiment avoids the scenario where an operator must reprocess wrong-way facing documents. In addition, to alleviate the need for a document facing mechanism, the media detector 112 may detect a first indicia oriented in one direction, while the imager 111 detects a second indicia oriented in the same or another direction.

FIG. 1*j* shows an evaluation region 104 which is adapted to process currency bills and substitute currency media bearing more than one indicia. As noted above, the currency detector 110 may be replaced with an imager 111. The imager 111 may also be utilized to detect a second indicia present on a ticket 135. If the imager 111 is utilized to detect a second indicia, then the second reader 129 is not necessary. The imager 111 may function in a similar manner to that described in FIG. 1*g* and 1*i*.

Figure 1K:
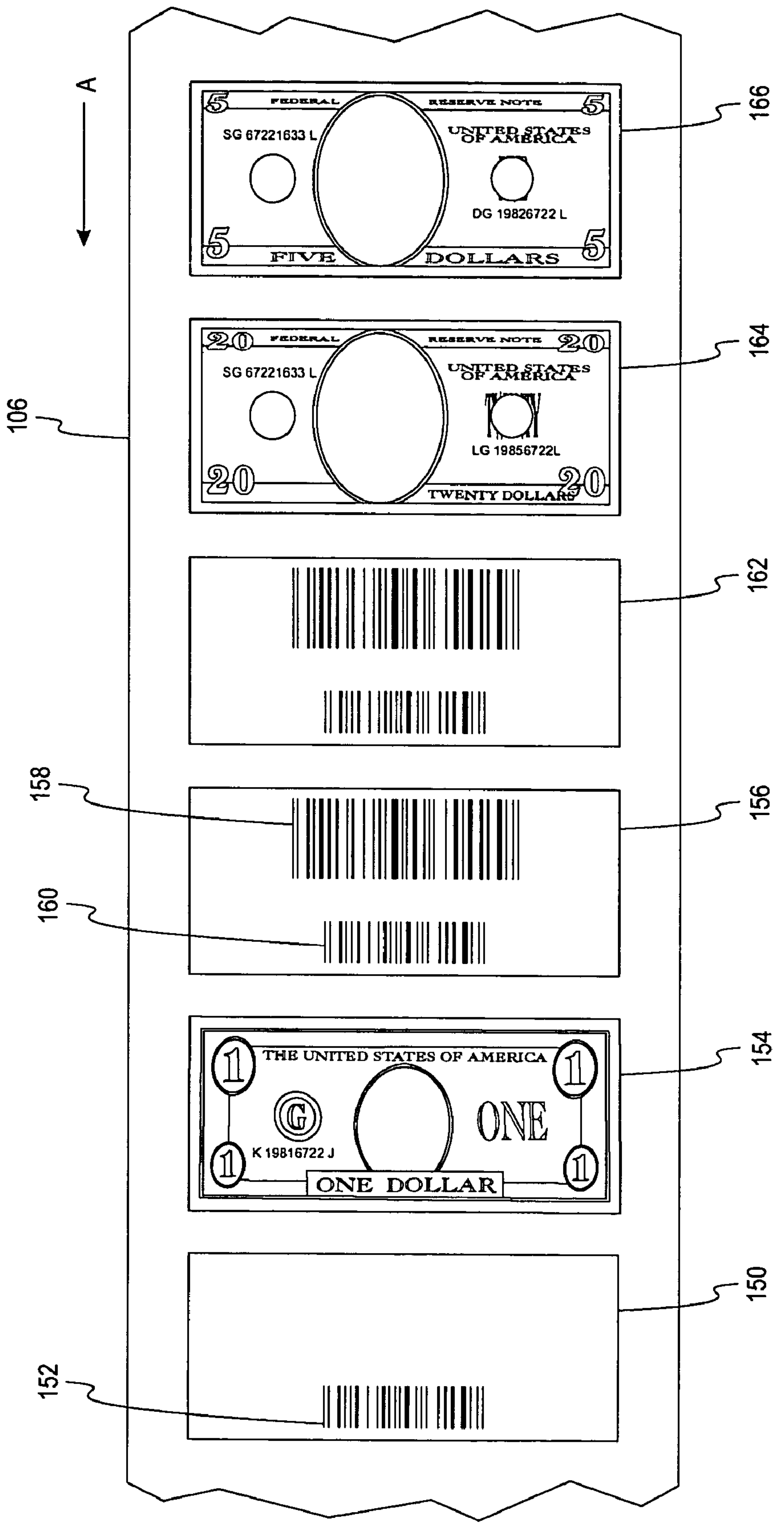
FIG. 1*k* is a top view of a transport path of a document processing device showing a sequence of exemplary documents to be processed.

FIG. 1*k* depicts an exemplary set of documents that might be presented on a portion of the transport mechanism 106. The documents are transported in the direction of arrow A, and, in one embodiment, the first document to be transported is a batch identification card 150 or header card bearing an indicia pattern 152. The indicia pattern 152 disposed on the batch identification card 150 encodes a set of characters that is associated with the machine from which the documents that follow originated. For example, in a casino environment, there might be numerous slot machines, video-poker machines, and redemption machines which need to be emptied periodically and reconciled with the casino's accounting system. To identify from which machine a given batch of documents originated, a batch identification card is placed in the bill validator box of the machine. A number is encoded in the form of an indicia pattern 152 and imprinted or embedded on the batch identification card 150. The card 150 is then placed in the bill validator box such that when the contents of the box is emptied and placed into an input receptacle of a document processing device, the card 150 will be the first document processed by the document processing device. For the sake of example, the indicia pattern 152 encodes the number 00123, which represents slot machine number 123.

The next documents to be processed are the currency bills and substitute currency media included in the bill validator boxes of the machine identified by the batch identification card 150. For illustrative purposes only, a few currency bills and substitute currency media are shown in FIG. 1*k*. In practice, the documents will not necessarily face the same direction or have the same orientation, nor will necessarily they be presented in the order shown. In the example illustrated, a one-dollar bill 154 is the next document to be transported along the transport mechanism 106. The one-dollar bill 154 is followed by a first ticket 156 that bears two indicia patterns 158, 160. The indicia pattern 158 represents a multidigit ticket number such as 12345 and the indicia pattern 160 represents a value such as $100. The indicia pattern 160 may include only numbers, such as 10000 to represent $100.00. Alternately, the indicia pattern 160 may be decoded into a symbol and a decimal number, such as $100.00 to represent one-hundred dollars or £50.50 to represent fifty pounds and fifty pence. The latter approach permits tickets to be dispensed in domestic and foreign currency amounts. The indicia pattern 158 may be decoded into a number having a fixed or variable number of digits or into alphanumeric characters and symbols.

The presence of the ticket 156 on the transport mechanism 106 means that a casino patron received the ticket 156, perhaps as part of a casino's promotion to entice the casino patron to play a game or perhaps because the patron won $100 at a gaming machine. Then, the casino patron exchanged the ticket 156 either for $100 cash or for game credits at a gaming machine. Thus, ticket 156 has been redeemed, and needs to be processed so that it can be reconciled with the casino's accounting system.

The next documents transported by the transport mechanism 106 are a second ticket 162, a twenty-dollar bill 164, and a five-dollar bill 166. Additional documents (not shown) will be transported by the transport mechanism 106 until there are no more documents in the input receptacle to be processed. If another batch identification card is detected, all subsequent documents (until another batch identification card is detected) will be associated with the batch identification card. In an alternate embodiment, batch identification cards are not used.

Although the documents shown in FIG. 1*k* have been discussed in connection with a casino environment, the same discussion applies equally to other environments where other types of documents are used, such as retailer stores where food coupons and gift certificates are used, amusement parks where promotional media are used, or financial institutions where various indicia, such as MICR, coded documents may be used.

The document processing device 100 shown and described in connection with FIGS. 1*a*–1*j* represent but a few of numerous embodiments into which the evaluation region 104 may be incorporated. It is expressly understood that the document processing device 100 shown and described in connection with FIGS. 1*a*–1*j* may be modified in accordance with numerous other embodiments described below.

Figure 2:
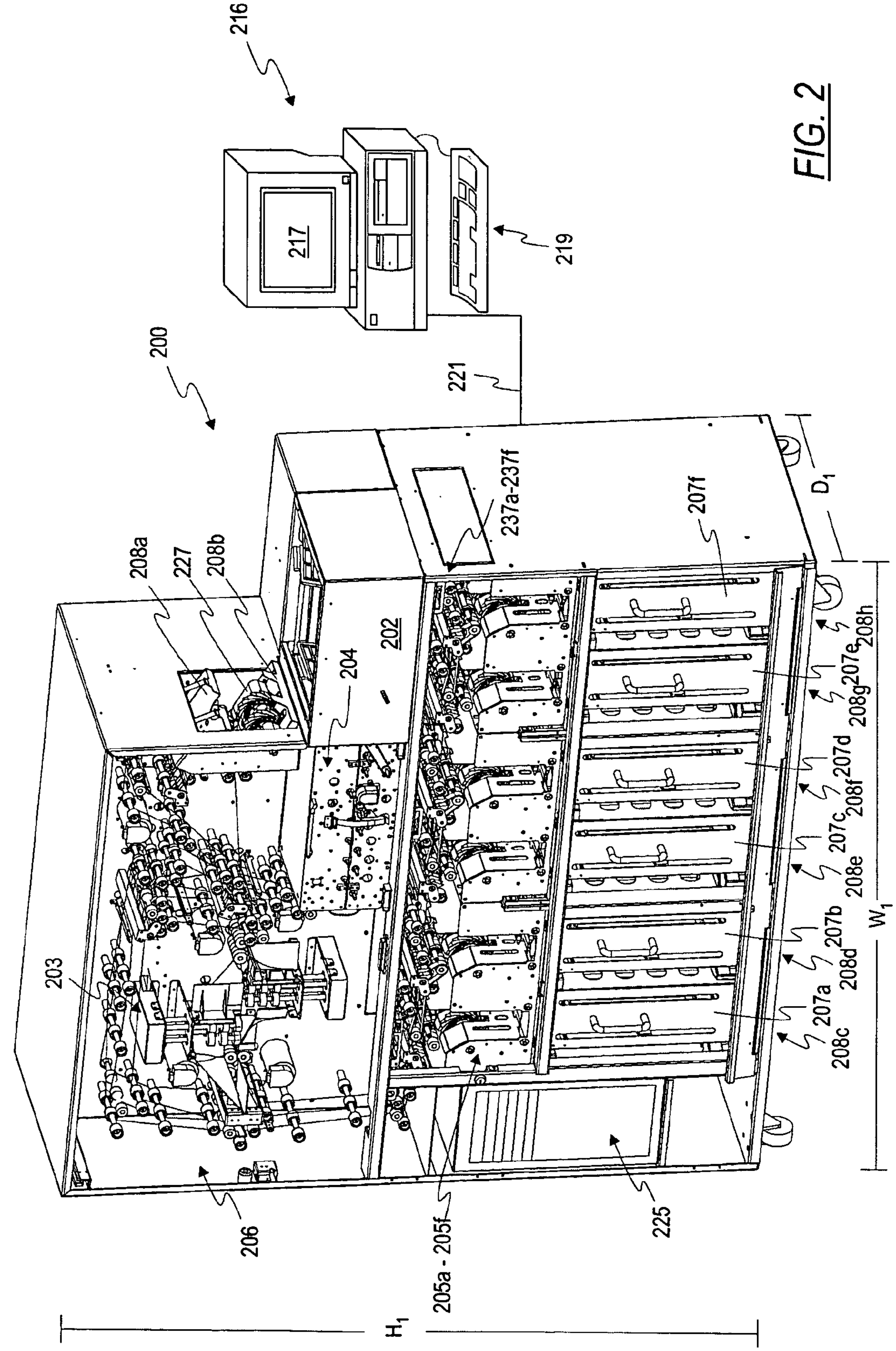
FIG. 2 is a perspective view of a document processing device according to one embodiment of the present invention.
Figure 3:
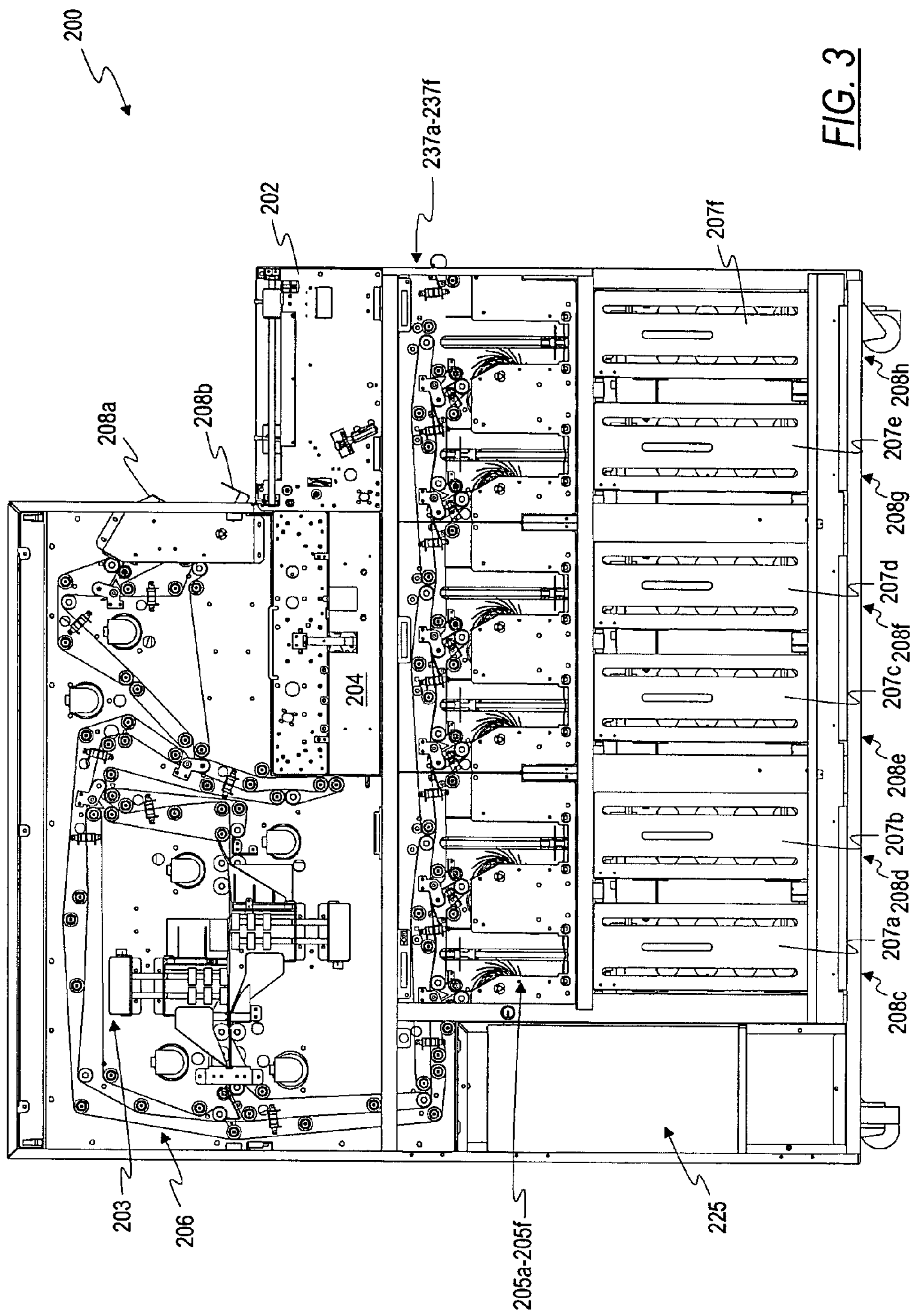
FIG. 3 is a front view of a document processing device according to one embodiment of the present invention.

According to some embodiments, the evaluation region 104 shown and described previously is incorporated into a document processing device having multiple output receptacles. In accordance with such embodiments, FIGS. 2 and 3 illustrate several views of a multi-pocket document processing device 200. A stack of currency bills and substitute currency media are provided to an input receptacle 202 in any order or in a predetermined order. The currency bills and substitute media may be facing one orientation or facing mixed orientations. The currency bills and substitute currency media are fed, one by one, into a transport mechanism 206. The transport mechanism 206 transports currency bills and substitute currency media to one of a plurality of output receptacles 208*a*–208*h*, which may include upper output receptacles 208*a*, 208*b*, as well as lower output receptacles 208*c*–208*h*. Before a document reaches an output receptacle 208, the transport mechanism 206 guides it through an evaluation region 204 where a document can be, for example, analyzed, authenticated, denominated, counted, validated, and/or otherwise processed. The evaluation region 204 may include a media detector 112, imager, 111, and/or currency detector 110 in accordance with any one of FIGS. 1*a–j*. In alternative embodiments of the device 200, the evaluation region 204 can determine document orientation, document size, or whether documents are stacked upon one another. The results of the above process or processes may be used to determine to which output receptacle 208 a document is directed. For example, in some embodiments, the device 200 may be utilized in casinos for receiving substitute media such as casino tickets and/or currency bills. In this case, the documents may be sorted according to denomination, media (e.g., currency or substitute), etc. In alternate embodiments, such as in a banking environment, the device 200 may be utilized for receiving currency bills, checks, deposit slips, etc. and the device 200 may sort these documents accordingly or as desired by a banking employee.

In the illustrated embodiment, interposed in the transport mechanism 206, intermediate the evaluation region 204 and the lower output receptacles 208*c*–208*h*, is a document facing mechanism designated generally by reference numeral 203. The document facing mechanism 203 is capable of rotating a document (i.e., a currency bill or substitute currency medium) 180° so that the face position of the document is reversed. That is, if a U.S. currency bill, for example, is initially presented with the surface bearing a portrait of a president facing down, it may be directed to the document facing mechanism 203, whereupon it will be rotated 180° so that the surface with the portrait faces up. The leading edge of the document remains constant while the document is being rotated 180° by the document facing mechanism 203. The decision may be taken to send a document to the document facing mechanism 203 when the selected mode of operation or other operator instructions call for maintaining a given face position of documents as they are processed by the device 200. For example, it may be desirable in certain circumstances for all of the currency bills ultimately delivered to the lower output receptacles 208*c*–208*h* to have the currency bill surface bearing the portrait of the president facing up. In such embodiments of the device 200, the evaluation region 204 is capable of determining the face position of a bill, such that a bill not having the desired face position can first be directed to the document facing mechanism 203 before being delivered to the appropriate output receptacle 208. Further details of a document facing mechanism which may be utilized for this purpose are disclosed in commonly assigned U.S. Pat. No. 6,074,334, entitled "Document Facing Method and Apparatus," which issued on Jun. 13, 2000, incorporated herein by reference in its entirety, and may be employed in conjunction with the present invention such as the device illustrated in FIGS. 2 and 3. Another document facing mechanism which may be employed in another embodiment is disclosed in commonly assigned, U.S. Pat. No. 6,371,303, entitled "Two Belt Bill Facing Mechanism," issued on Apr. 16, 2002, which is herein incorporated by reference in its entirety. Alternative embodiments of the device 200 do not include the document facing mechanism 203.

The document processing device 200 in FIG. 2 may be controlled from a separate control unit 216 which has a display/user-interface 217. In one embodiment of the present invention, the display/user-interface 217 incorporates a touch panel display which displays information including "functional" keys when appropriate. In addition, the display/user-interface 217 may be a full graphics display utilized for a variety of functions, including, but not limited to, displaying captured image files and/or information appended to the image files as described in further detail below. Alternatively, additional physical keys or buttons, such as a keyboard 219, may be employed. The control unit 216 may be a self-contained desktop or laptop computer which communicates with the device 200 via a cable 221. In one embodiment, the device 200 includes a suitable communications port (not shown) for this purpose. In another embodiment, the control unit 216 communicates with the device 200 wirelessly via a wireless modem (not shown). In embodiments in which the control unit 216 is a desktop computer wherein the display/user-interface 217 and the desktop computer are physically separable, the desktop computer may be stored within a compartment 225 of the device 200. In other alternative embodiments, the control unit 216 is integrated into the device 200 so that the control unit 216 is contained within the device 200. In this embodiment, the display/user-interface 217 may comprise a touch screen or touch panel display that is coupled to the device 200.

The operator can control the operation of the device 200 through the control unit 216. By selecting various user-defined modes through the control unit 216, such as via an input device such as a keyboard 219, or a switch, button, or touch screen (not shown), the operator can direct currency bills and substitute media into specific output receptacles, such as output receptacles 208*a*–208*h*. Note that fewer or more output receptacles may be employed in alternate embodiments. In still other embodiments, the user can select pre-programmed modes or create new user-defined modes based on the particular requirements of the application. For example, the operator may select a user-defined mode which instructs the device 200 to sort currency bills by denomination; accordingly, the evaluation region 204 would denominate the bills and direct one dollar bills into the first lower output receptacle 208*c*, five dollar bills into the second lower output receptacle 108*d*, ten dollar bills into the third lower output receptacle 208*e*, twenty dollar bills into the forth lower output receptacle 208*f*, fifty dollar bills into the fifth lower output receptacle 208*g*, and one-hundred dollar bills into the sixth lower output receptacle 208*h*. The operator may also instruct the device 200 to deliver those bills whose denomination was not determined, i.e., no call bills, to the first upper output receptacle 208*a*. In such an embodiment, the upper output receptacle 208*a* would function as a reject pocket. In an alternative embodiment, the operator may instruct the device 200 to also evaluate the authenticity of each currency bill. In such an embodiment, authentic bills would be directed to the appropriate lower output receptacles 208*c*–208*h*. Those bills that were determined not to be authentic, i.e., suspect bills, would be delivered to the second upper output receptacle 208*b*. A multitude of user defined modes are disclosed in commonly assigned U.S. Pat. No. 6,278,795, previously incorporated by reference, which may be employed in conjunction with the present invention such as the device illustrated in FIGS. 2 and 3. According to another embodiment, the device 200 is adapted to process documents according to a strapping mode of operation as shown and described in co-pending U.S. patent application Ser. No. 09/635,181, entitled "Method of Creating Identifiable Smaller Stacks of Currency Bills Within a Larger Stack of Currency Bills," which was filed on Aug. 8, 2000, and is incorporated herein by reference in its entirety. According to still another embodiment, the device 200 is adapted to process documents according to a disable-pockets mode of operation as shown and described in co-pending U.S. patent application Ser. No. 09/688,538, entitled "Currency Handling System Having Multiple Output Receptacles," which was filed on Oct. 16, 2000 and is incorporated herein by reference in its entirety.

The control unit 216 and user interface 217 may also be utilized to access the storage medium 119 in order to review or search image files captured by the imager 111. The control unit 116 may offer various searching fields or capabilities depending on the information appended to the image files as discussed above. For example, image files may be searched for a particular dollar amount, an indicia, a time of day, operator, etc. When an image file of interest is found, the image file may be displayed on the user interface 217 along with the appended information.

It should be noted that the control unit 216 also provides the operator with a broad range of flexibility in selecting which output receptacles receive which documents. For example, the operator may instruct the device 200 to sort the currency bills by denomination and to deliver authentic currency bills according to their denomination into selected ones of the output receptacles 208*c*–208*h*. The operator may further instruct the device 200 to deliver no call bills and suspect bills into output receptacle 208*a*, and to deliver substitute currency media into output receptacle 208*b*. In addition, the device 200 may be unable to evaluate a particular document because, for example, it is damaged or excessively worn. The operator may instruct the device 200 to deliver any substitute currency media that cannot be evaluated to the output receptacle 108*a*. Alternatively, additional output receptacles (not shown) may be employed to receive any combination of no call bills, suspect bills, valid substitute currency media, or invalid substitute currency media. The delivery of such documents may occur without suspension of operation of the device 200, or with suspension of the operation of the device 200, as explained next.

According to some embodiments, the device 200 is configured so that when the evaluation region 204 is unable to identify certain criteria regarding a currency bill or substitute currency medium, the unidentified document is flagged and "presented" in one of the output receptacles 208*a*–208*h*, that is, the transport mechanism 206 is suspended or halted so that the unidentified document is located at a predetermined position within one of the output receptacles 208*a*–208*h*, such as being the last document transported to one of the output receptacles. In the case of currency bills, such criteria can include denominating information, authenticating information, information indicative of the currency bill's series, or other information the evaluation region 204 is attempting to obtain pursuant to a mode of operation. In the case of substitute currency media, such criteria may include, in addition to or exclusive of the criteria mentioned above, whether information, such as a valid barcode, is detected on the substitute currency media.

The user may determine in which output receptacle 208*a*–208*h* the flagged document is presented according to a selected mode of operation. For example, where the unidentified document is the last document transported to an output receptacle 208*a*–208*h*, it may be positioned within a stacker wheel or positioned at the top of the documents already within the output receptacle 208*a*–208*h*. While unidentified documents may be transported to any output receptacles 208*a*–208*h*, it may be more convenient for the operator to have unidentified documents transported to one of the upper output receptacles 208*a*, 208*b*, which are positioned such that the operator is able to easily see and/or inspect the document which has not been identified by the evaluation region 204. The operator may then either visually inspect the flagged document while it is resting on the top of the stack, or the operator may decide to remove the document from the output receptacle 208 in order to examine the flagged document more closely. In an alternative embodiment of the device 200, the control unit 216 may communicate to the user via the display/user-interface 217 information identifying which one of the output receptacles 108*a*–108*h* a flagged document is presented.

The device 200 may be adapted to continue operation automatically when a flagged document is removed from the upper output receptacle 208*a*, 208*b* or, according to one embodiment of the present invention, the device 200 may be adapted to suspend or halt operation and require input from the operator via the control unit 216. Upon examination of a flagged document by the operator, it may be found that the flagged document is genuine or valid even though it was not identified as such by the evaluation region 204 or the evaluation region 204 may have been unable to denominate the flagged document. However, because the document was not identified, the total value and/or denomination counters will not reflect its value. According to one embodiment, such an unidentified document is removed from the output receptacles 208 and reprocessed or set aside. According to another embodiment, the flagged documents may accumulate in the upper output receptacles 208*a*, 208*b* until the batch of documents currently being processed is completed or the output receptacle 208*a*, 208*b* is full and then reprocessed or set aside. In yet another embodiment, the control unit 216 of the device 200 includes denomination keys, such as disclosed in commonly assigned U.S. Pat. No. 5,790,697, which is herein incorporated by reference in its entirety. Upon inspection of a flagged currency bill, such as a no call bill, the operator may manually key in the denomination of the bill via a denomination key, and resume operation. In the case of a substitute currency media, the operator may manually enter into the device 200 via the control unit 216 information about the substitute currency media. Such information may include indicia information, such as a barcode number when the substitute currency media is a barcoded ticket, the "denomination" of the substitute currency media, such as a $5 Disney Dollar, the value associated with the substitute currency media, such as $100, and other identifying information.

According to other embodiments, when a document is flagged, the transport mechanism may be stopped before the flagged document is transported to one of the output receptacles. Such an embodiment is particularly suited for situations in which the operator need not examine the document being flagged; for example, the device 200 is instructed to first process United States currency and then British currency pursuant to a selected mode of operation where the device 200 processes United States $1, $5, $10, $20, $50, and $100 currency bills into the lower output receptacles 208*c*–208*h*, respectively. Upon detection of the first British pound note, the device 200 may halt operation allowing the operator to empty the lower output receptacles 208*c*–208*h* and to make any spatial adjustments necessary to accommodate the British currency. A multitude of modes of operation which may be employed in conjunction with the present invention are described in conjunction with bill flagging, presenting, and/or transport halting in commonly assigned U.S. patent application Ser. No. 08/864,423 entitled "Method and Apparatus for Document Processing," which is herein incorporated by reference in its entirety.

In the illustrated embodiment, with regard to the upper output receptacles 208*a* and 208*b*, the second upper output receptacle 208*b* is provided with a stacker wheel 227 for accumulating a number of documents, while the first upper output receptacle 208*a* is not provided with such a stacker wheel. Thus, when, pursuant to a preprogrammed mode of operation or a user-selected mode or other operator instructions, a document is to be fed to the first upper output receptacle 208*a*, there may be a further instruction to momentarily suspend operation of the device 200 for the operator to inspect and remove the document. On the other hand, it may be possible to allow a number of documents to accumulate in the first upper output receptacle 208*a* before operation is suspended or halted. Similarly, the second upper output receptacle 208*b* may be utilized initially as an additional one of the lower output receptacles 208*c*–208*h*. However, in the illustrated embodiment shown in FIG. 2, there is no storage cassette associated with the second upper output receptacle 208*b*. Therefore, when the second upper output receptacle 208*b* is full, operation may be suspended to remove the documents at such time as yet further documents are directed to the second upper output receptacle 208*b* in accordance with the selected mode of operation or other operator instructions. According to an alternative embodiment of the device 200, both the first and the second upper output receptacles 208*a*, 208*b* are equipped with a stacker wheel. According to such an embodiment both the upper output receptacles 208*a*, 208*b* may also function as the lower output receptacle 208*c*–208*h*, thereby allowing a number of documents to be stacked therein. In yet another embodiment, the first upper output receptacle 208*a* and the second upper output receptacle 208*b* are not provided with a stacker wheel 227.

Figure 4A:
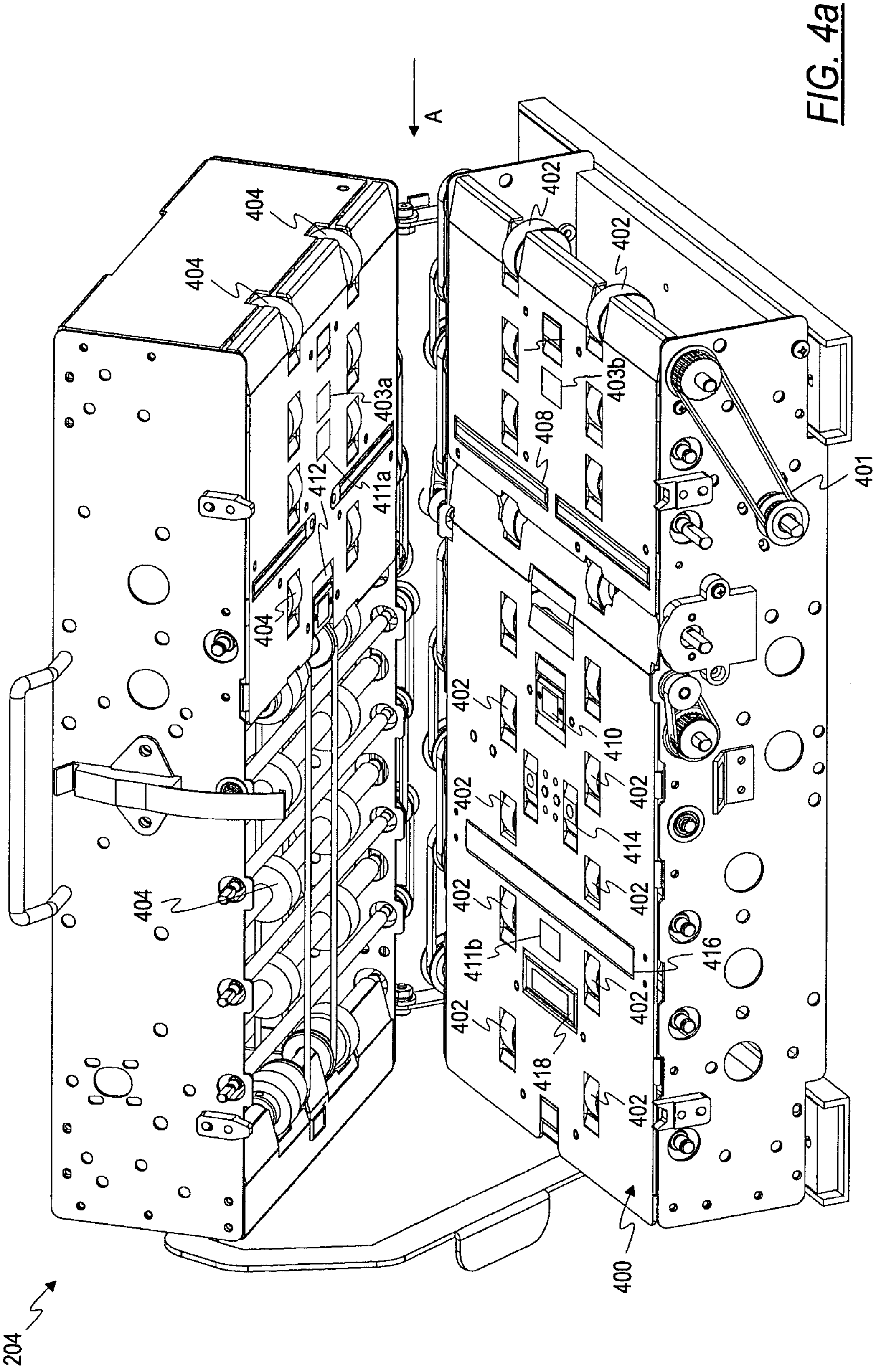
FIG. 4*a* is a perspective view of an evaluation region according to one embodiment of the document processing device of the present invention.
Figure 4B:
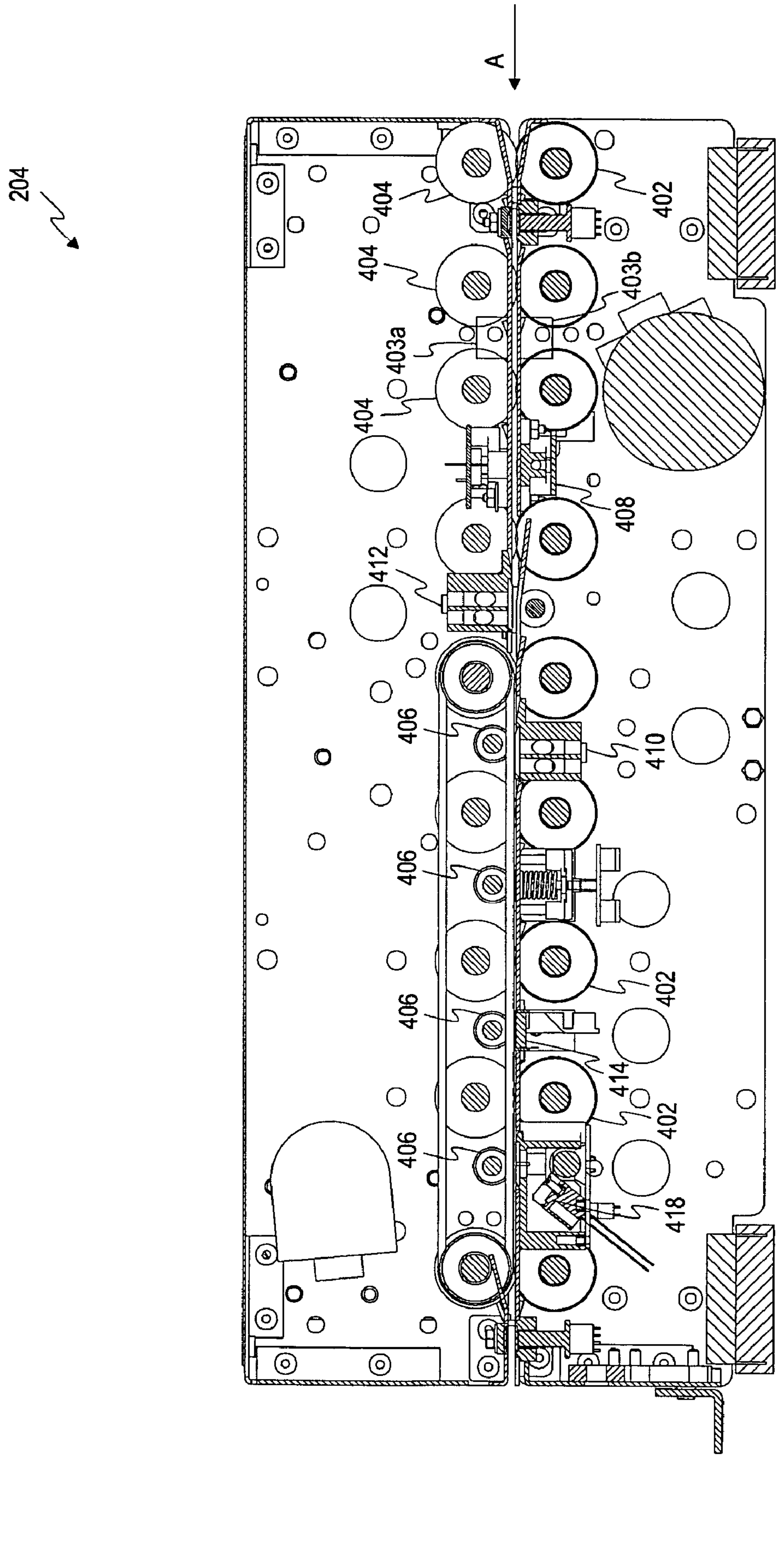
FIG. 4*b* is a side view of an evaluation region according to one embodiment of the document processing device of the present invention.

FIGS. 4*a* and 4*b* illustrate the evaluation region 204 according to one embodiment of the device 200. The evaluation region 204 can be opened for service, access to sensors, to clear document jams, etc., as shown in FIG. 4*a*. Additional details of the evaluation region 204 are provided with reference to the evaluation region 104 shown and described in FIGS. 1*e*–1*j*. As previously explained, the evaluation region 204 shown in FIG. 4*a* may employ any combination of the following detection means without limitation in one or more alternate embodiments: a size detection and density sensor 408, a lower optical scan head 410, an upper optical scan head 412, a single or multitude of magnetic sensors 414, a thread sensor 416, an infrared sensor (not shown), an ultraviolet/fluorescent light scan head 418, an upper media detector 403*a*, a lower media detector 403*b*, an upper imager 411*a*, and a lower imager 411*b*. As noted in connection with FIG. 1*e*–1*j*, these detection means may be disposed in any order and on either or both sides of the transport plate 400 without departing from the present invention. These detection means and a host of others are disclosed in commonly assigned U.S. Pat. No. 6,278,795, entitled "Multi-Pocket Currency Discriminator," previously incorporated by reference, and U.S. patent application Ser. No. 09/965,428, entitled "A Document Processing System Using Full Image Scanning," filed on Sep. 27, 2001, also previously incorporated by reference. As noted above, in the specific case of substitute currency media, the variables may also relate to what distinguishing characteristics of the substitute currency media are being examined, such as any combination of the following without limitation: a barcode, a MICR pattern, OCR-readable information, including information printed according to the OCR-A and OCR-B fonts, a magnetic pattern, an OVD pattern such as a hologram, a magnetic thread or an electrically conductive thread, conductive ink, or an electrically conductive polymer.

The direction of document travel through the evaluation region 204 is indicated by arrow A in FIG. 4*a*. The documents (i.e., currency bills and/or substitute currency media) are positively driven along a transport plate 400 through the evaluation region 204 by means of a transport roll arrangement comprising both driven rollers 402 and passive rollers 404. The rollers 402 are driven by a motor (not shown) via a belt 401. Passive rollers 404 are mounted in such a manner as to be freewheeling about their respective axis and biased into counter-rotating contact with the corresponding driven rollers 402. The driven and passive rollers 402, 404 are mounted so that they are substantially coplanar with the transport plate 400. The transport roll arrangement also includes compressible rollers 406 to aid in maintaining the documents flat against the transport plate 400. Maintaining the document flat against the transport plate 400 so that the document lies flat when transported past the sensors enhances the overall reliability of the evaluation processes. A similar transport arrangement is disclosed in commonly-owned U.S. Pat. No. 5,687,963, entitled "Method and Apparatus for Discriminating and Counting Documents," which is incorporated herein by reference in its entirety.

Additional details concerning the input receptacle 202, transport mechanism 206, and diverters 237 are disclosed in commonly assigned U.S. Pat. No. 6,398,000, entitled "Currency Handling System Having Multiple Output Receptacles," issued on Jun. 4, 2002, which is herein incorporated by reference in its entirety.

Referring back to FIG. 2, the illustrated embodiment of the device 200 includes a total of six lower output receptacles 208*c*–208*h*. More specifically, each of the lower output receptacles 208*c*–208*h* includes a first portion designated as an escrow compartment 205*a*–205*f* and a second portion designated as a storage cassette 207*a*–207*f*. Typically, documents are initially directed to the escrow compartments 205, and thereafter at specified times or upon the occurrence of specified events, which may be selected or programmed by an operator, documents are then fed to the storage cassettes 207. The storage cassettes 207 are removable and replaceable, such that stacks of documents totaling a predetermined number of documents or a predetermined monetary value may be accumulated in a given storage cassette 207, whereupon the cassette may be removed and replaced with an empty storage cassette. In the illustrated embodiment, there are six lower output receptacles 208*c*–208*h* which include escrow compartments 205 and storage cassettes 207*a*–207*f* In alternative embodiments, the device 200 may contain more or less than six lower output receptacles which include escrow compartments 205 and storage cassettes 207. In other alternative embodiments, modular lower output receptacles 208 may be implemented to add many more lower output receptacles to the device 200. Each modular unit may comprise two lower output receptacles. In other alternative embodiments, several modular units may be added at one time to the device 200.

A series of diverters 237*a*–237*f*, which are a part of the transport mechanism 206, direct the documents to one of the lower output receptacles 208*c*–208*h*. When the diverters 237 are in an upper position, the documents are directed to the adjacent lower output receptacle 208. When the diverters 237 are in a lower position, the documents proceed in the direction of the next diverter 237. Alternatively, the operator may instruct the device 200 to direct substitute currency media to one or more of the upper output receptacles 208*a*–208*b* such that only currency bills are presented to the diverters 237*a*–237*f*.

Additional details concerning the lower output receptacles 208*c*–208*h*, the escrow compartments 205, and the storage cassettes 207 are disclosed in commonly assigned U.S. patent application Ser. No. 09/502,666, entitled "Currency Handling System Having Multiple Output Receptacles," incorporated by reference above. It should be emphasized that the operator may also instruct the device 200 to direct substitute currency media to one or more of the lower output receptacles 208. In the illustrated embodiment, only currency bills are directed to the lower output receptacles 208, however, in alternative embodiments, substitute currency media could also be directed to one or more of the lower output receptacles 208.

In some embodiments, the device 200 is dimensioned to process a stack of different sized currencies at the same time. In other embodiments, the device 200 can also be dimensioned to process a stack of different sized currencies and substitute currency media at the same time. For example, one application may require the processing of United States dollars (2.5 inches×6 inches, 6.5 cm×15.5 cm) and French currency (as large as 7.17 inches×3.82 inches, 18.2 cm×9.7 cm). The application may simply require the segregation of the U.S. currency from the French currency wherein the device 200 delivers U.S. currency to the first lower output receptacle 208*c* and the French currency to the second output receptacle 208*d*. In still other embodiments, the device 200 processes a mixed stack of U.S. ten and twenty dollar bills and French one hundred and two hundred Franc notes wherein the currency documents are denominated, counted, and authenticated. In such embodiments, the U.S. ten and twenty dollar bills are delivered to the first 208*c* and second 208*d* lower output receptacles, respectively, and the French one hundred and two hundred Franc notes are delivered to the third 208*e* and fourth 208*f* lower output receptacle, respectively. In yet other embodiments, the device 200 denominates, counts, and authenticates six different types of currency wherein, for example, Canadian currency is delivered to the first lower output receptacle 208*c*, United States currency is delivered to the second output receptacle 208*d*, Japanese currency is delivered to the third lower output receptacle 208*e*, British currency is delivered to the fourth lower output receptacle 208*f*, French currency is delivered to the fifth lower output receptacle 208*g*, and German currency is delivered to the sixth lower output receptacle 208*h*. In still other embodiments, no call bills or other denominations of foreign currency, such as Mexican currency for example, may be directed to the second upper output receptacle 208*b*. In other embodiments, suspect bills are delivered to the first upper output receptacle 208*a*. In still other embodiments, U.S. currency and cashout tickets are delivered to different output receptacles. These embodiments represent just a few examples of the numerous combinations of U.S. currency bills, foreign currency bills, and substitute media that can be delivered to the output receptacles 208.

Additional details concerning the processing of foreign currency are disclosed in commonly assigned U.S. Pat. No. 5,875,259, entitled "Method and Apparatus for Discriminating and Counting Documents"; commonly assigned U.S. Pat. No. 5,960,103, entitled "Method and Apparatus for Authenticating and Discriminating Currency"; commonly assigned U.S. patent application Ser. No. 09/626,324, entitled "Currency Handling System Employing an Infrared Authenticating System," filed Jul. 26, 2000; and commonly assigned U.S. patent application Ser. No. 09/179,573, entitled "Customizable International Note Counter," filed Oct. 27, 1998, each of which is incorporated herein by reference in its entirety.

In other alternative embodiments of the device 200, the operator can vary the type of documents delivered to the output receptacles 208. For example, in one alternative embodiment the operator can direct, via the control unit 216 (shown in FIG. 2), that a stack of one, five, ten, twenty, fifty, and one-hundred United States dollar bills be denominated, counted, authenticated, and directed into lower output receptacles 208*c*–208*h*, respectively. In still another alternative embodiment, the device 200 is also instructed to deliver other currency bills, such as a United States two dollar bill or foreign currency bills that have been mixed into the stack of documents, to the second upper output receptacle 208*b*. In still another alternative embodiment, the device 200 is also instructed to count the number and aggregate value of all the currency bills processed and the number and aggregate value of each individual denomination of currency bills processed. These values may be communicated to the user via the display/user-interface 217 of the device 200. In addition, or alternatively, these values are communicated to a remote device via a communications port (not shown).

In still other alternative embodiments, no call bills and bills that are stacked upon one another are directed to the second upper output receptacle 208*b*. In yet other alternative embodiments, the operator can direct that all documents failing an authentication test be delivered to the first upper output receptacle 208*a*. In still further embodiments, the operator instructs the device 200 to deliver no call bills, suspect bills, stacked bills, etc. to one of the lower output receptacles 208*c*–208*h*. In yet other alternative embodiments, the currency bills are directed to one or more of the lower output receptacles 208*c*–208*h*, no call bills and suspect bills are directed to the upper output receptacle 208*a*, and substitute currency media are directed to the upper output receptacle 208*b*. In still other embodiments, U.S. currency bills are directed to selected ones of the lower output receptacles 208, foreign currency bills are directed to other lower output receptacles 208, no call bills, suspect bills, and invalid substitute currency media (i.e., media which cannot be identified) are directed to the first upper output receptacle 208*a*, and valid substitute currency media are directed to the second upper output receptacle 208*b*. Alternatively, a third upper output receptacle (not shown) may receive invalid substitute currency media so as to keep all substitute currency media separate from currency bills.

In still other alternate embodiments, genuine U.S. currency bills and foreign currency bills and identified substitute currency media are directed to selected ones of the lower output receptacles 208, unidentified substitute currency media are directed to the first upper output receptacle 208*a*, and no call currency bills and suspect currency bills are directed to the second upper output receptacle 208*b*. In short, the device 200 as illustrated having eight output receptacles 208*a*–208*h* provides a great deal of flexibility to the operator. And in other alternative embodiments of the currency handling device 200 with a fewer or greater number of output receptacles 208, numerous different combinations for processing documents are available. What output receptacle receives which type of document, whether a U.S. currency bill, a foreign currency bill, or a substitute currency medium, is entirely customizable by the operator.

In the illustrated embodiment shown in FIG. 2, the various operations of the device 200 are controlled by processors disposed on a number of printed circuit boards (PCBs) located throughout the device 200. Further details concerning the PCBs are disclosed in commonly assigned U.S. patent application Ser. No. 09/502,666, entitled "Currency Handling System Having Multiple Output Receptacles," previously incorporated by reference.

Figure 5:
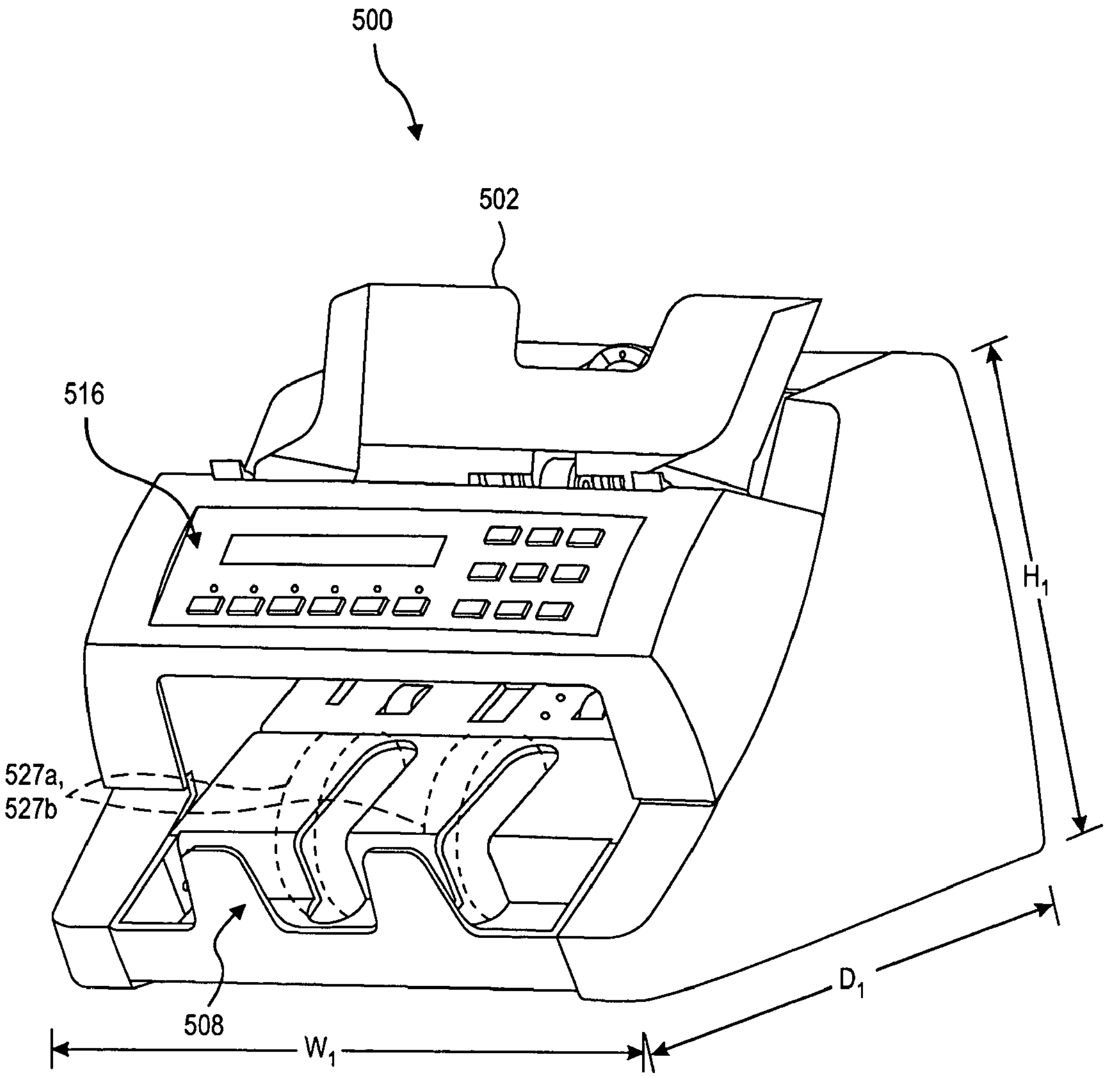
FIG. 5 is a perspective view of a compact document processing device having a single output receptacle according to one embodiment of the present invention.
Figure 6:
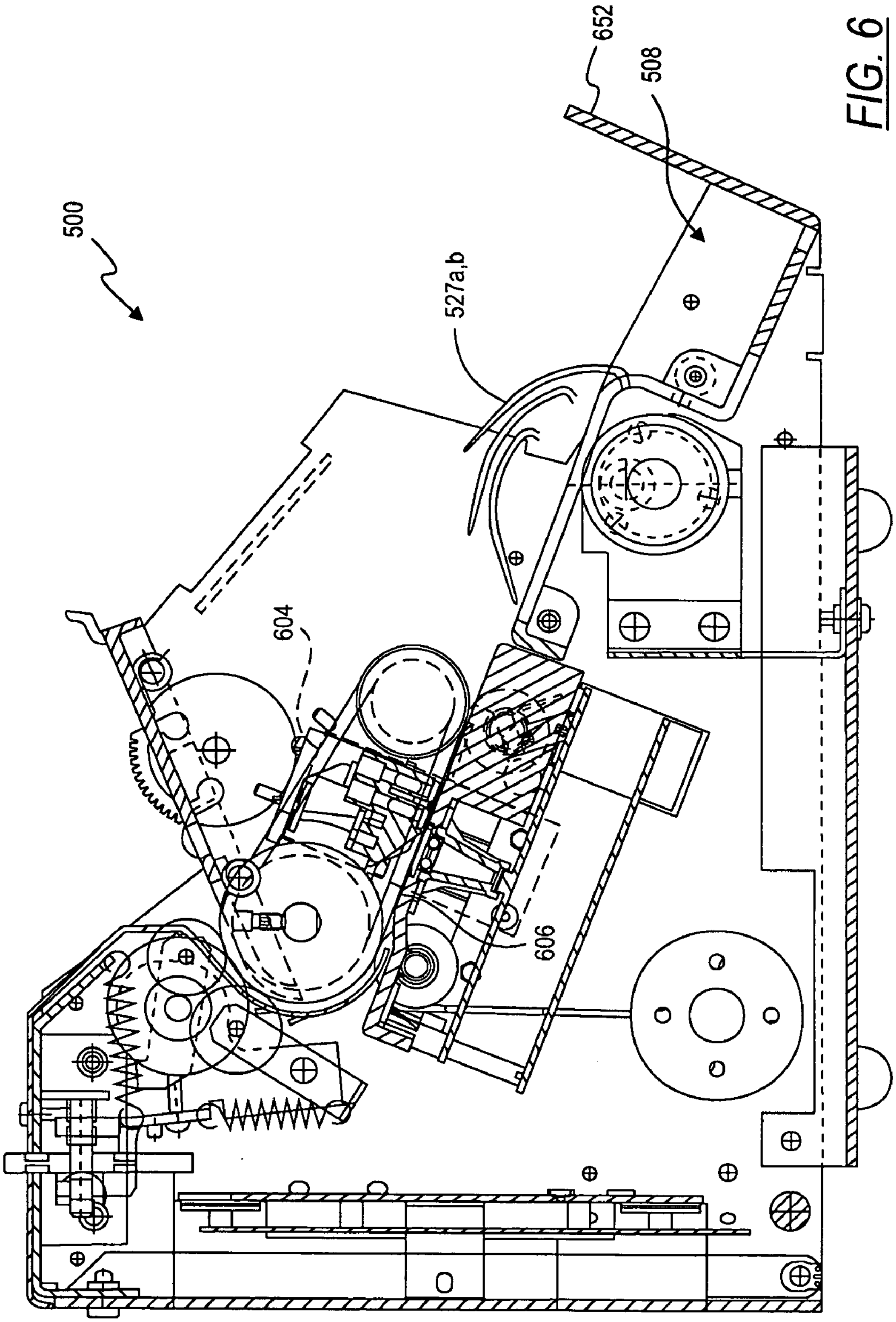
FIG. 6 is a side cross-sectional view of the device shown in FIG. 5.

The evaluation region 104 shown and described in connection with FIGS. 1*a*–1*j* can also be incorporated into a document processing device having a single output receptacle. FIGS. 5 and 6 illustrate a compact document processing device 500 according to one embodiment of the present invention. This device 500 is shown and described in more detail in commonly assigned U.S. Pat. No. 5,687,963 which is incorporated by reference in its entirety. The device 500 may be modified to include an evaluation region 104 as shown and described in connection with any one of FIGS. 1*a*–1*j*. Documents are fed, one by one, from a stack of documents placed in an input receptacle 502 onto a transport mechanism. The transport mechanism includes a transport plate or guide plate 606 for guiding a document to an output receptacle 608. Before reaching the output receptacle 508, the document can be, for example, evaluated, analyzed, counted and/or otherwise processed by an evaluation region 604.

The device 500 in FIG. 5 has a touch panel display 516 in one embodiment of the present invention which displays "functional" keys when appropriate. The touch panel display 516 simplifies the operation of the device 500. Alternative or additional physical keys, switches, or buttons may be employed, such as, for example, a keypad. In one embodiment, the touch panel display 516 includes denomination keys, such as disclosed in commonly assigned U.S. Pat. No. 5,790,697, previously incorporated by reference. The operator may also manually enter, via the touch panel display 516, information about the substitute currency media, such as the information described above in connection with FIGS. 2–3.

A pair of driven stacking wheels 527*a* and 527*b* are located in the output receptacle 508 and come into contact with the documents as the documents are transported into the output receptacle 508. The stacking wheels 527*a* and 527*b* are supported for rotational movement about respective shafts journalled on a rigid frame and driven by a motor (not shown). Flexible blades of the stacker wheels 527*a* and 527*b* deliver the documents onto a forward end of a stacker plate 652 shown in FIG. 6. In alternate embodiments, the device 500 includes a stacking wheel 527*a* only, a stacking wheel 527*b* only, or neither a stacking wheel 527*a* nor a stacking wheel 527*b*.

Like the device 200 shown and described in connection with FIGS. 2–4*b*, the device 500 shown and described in connection with FIGS. 5 and 6 is adapted to halt or suspend operation when a no call or a suspect bill or an invalid substitute currency medium is detected. An operator of the device 500 may specify via the touch panel display 516 the location of the unidentified document, such as the last document to be presented to the output receptacle 508 before operation is halted or suspended. The operator may further manually enter information about the invalid substitute currency medium, such as the information described above in connection with FIGS. 2–3. In an embodiment in which the device 500 includes denomination keys, the operator may select one of the denomination keys after inspection of a no call bill or a suspect bill, and resume operation as if the no call bill or suspect bill had not been flagged.

Figure 7A:
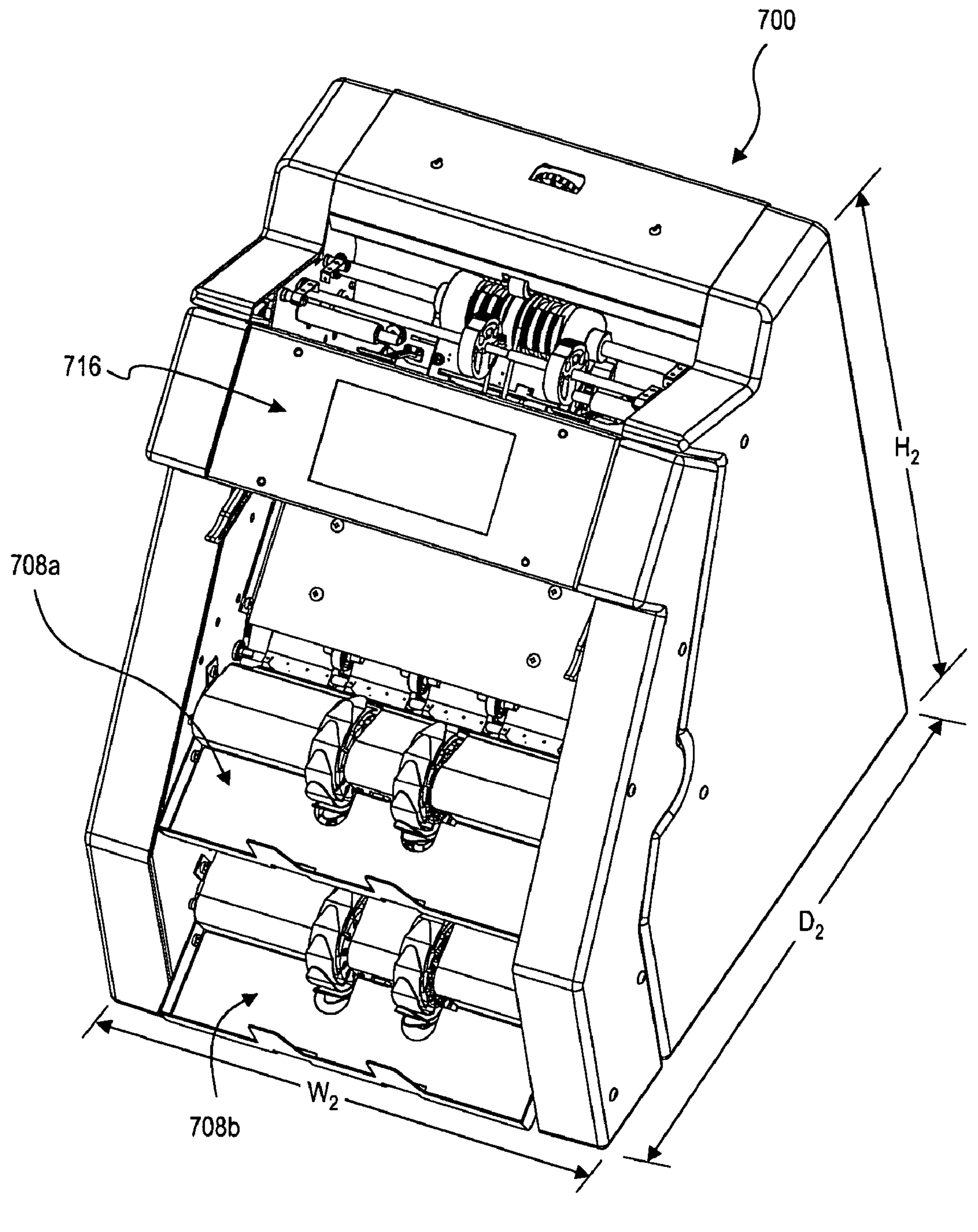
FIG. 7*a* is a perspective view of a compact document processing device having dual output receptacles according to one embodiment of the present invention.
Figure 7B:
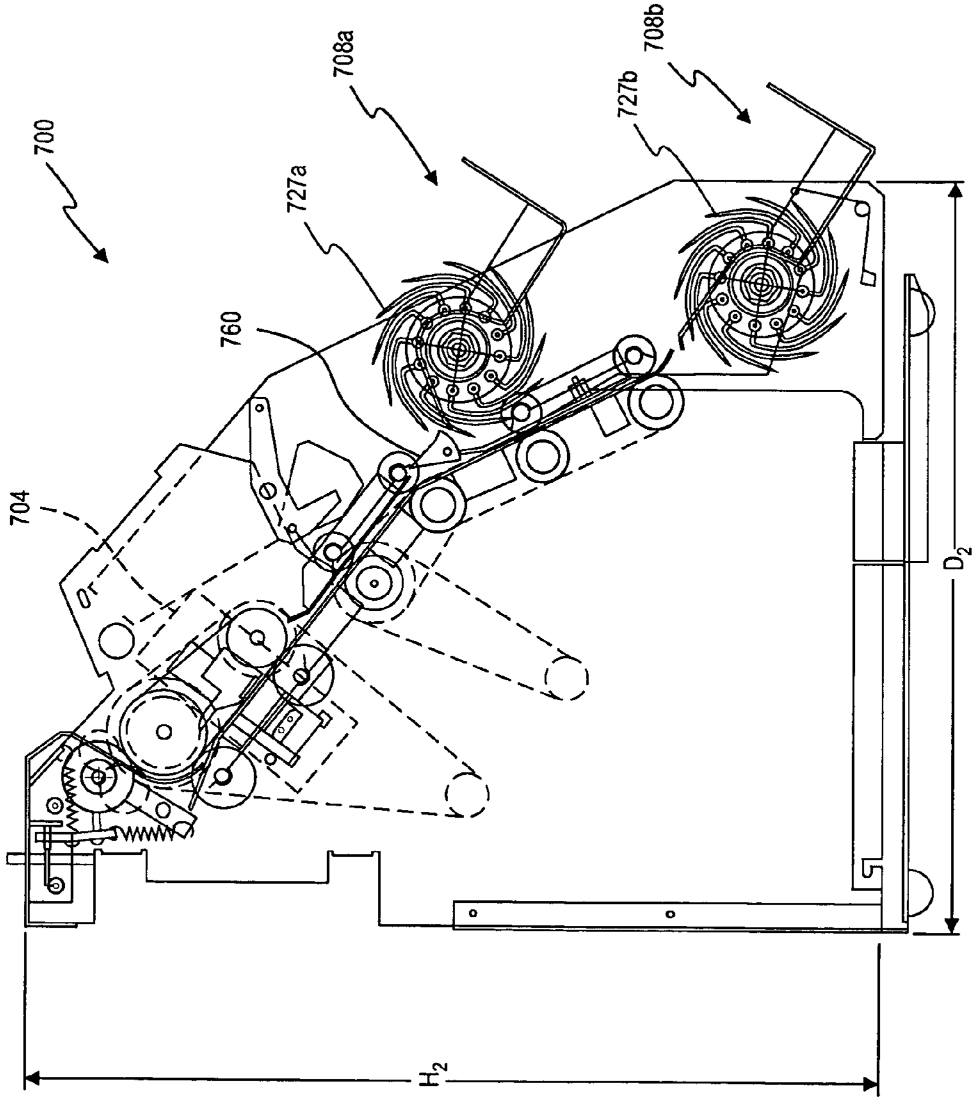
FIG. 7*b* is a side cross-sectional view of the device shown in FIG. 7*a;*

FIGS. 7*a* and 7*b* illustrate an exterior perspective view and a side cross-sectional view, respectively, of a compact, document processing device 700 having dual output receptacles. The process for carrying documents through the device 700 is the same as discussed above, except that the device 700 has first and second output receptacles, 708*a*, 708*b*, respectively. A diverter 760, shown in FIG. 7*b*, directs the documents to either the first or second output receptacle 708*a*, 708*b*. When the diverter 760 is in a lower position, documents are directed to the first output receptacle 708*a*. When the diverter 760 is in an upper position, documents proceed in the direction of the second output receptacle 708*b*. Details of devices with multiple output receptacles are described in WO 97/45810 which is incorporated by reference in its entirety.

FIG. 7*b* shows a pair of stacker wheels 727*a*, 727*b* for delivering documents to the first and second output receptacles 708*a*, 708*b*. However, in alternate embodiments, the device 700 includes the stacker wheel 727*a* only, the stacker wheel 727*b* only, or neither the stacker wheel 727*a* nor the stacker wheel 727*b*. The device 700 includes an evaluation region 704, such as the evaluation region 104 shown and described in connection with any one of FIGS. 1*a*–1*j*.

Like the embodiments described above in connection with a device having multiple output receptacles, the device 700 may be instructed by an operator via a control unit 716, which may include a touch panel display or other suitable interface, to direct certain documents to one or the other of the first and second output receptacles 708*a*, 708*b*. These modes may be pre-programmed or operator-defined. For example, according to one embodiment, genuine currency bills and valid substitute currency media are directed to the first output receptacle 708*a*, whereas non-genuine currency bills and invalid substitute currency media are directed to the second output receptacle 708*b*. According to another embodiment, genuine currency bills are directed to the first output receptacle 708*a*, valid substitute currency media are directed to the second output receptacle 708*b*, and the device 700 is programmed to halt or suspend operation when a non-genuine currency bill or invalid substitute currency medium is detected by the evaluation region of the device 700. In one embodiment, the control unit 716 may include denomination keys, such as explained above. The control unit 716 may also be adapted to permit the operator to manually enter information about a flagged substitute currency medium, such as the information described above in connection with FIGS. 2–3.

In other embodiments, the evaluation regions 104 shown and described in connection with FIGS. 1*a*–1*j* may be employed in a document processing device according to any of the embodiments just described which is coupled to a coin sorting device. In different embodiments, the coin sorting device is adapted to sort coins only or a combination of coins and tokens.

Figure 8:
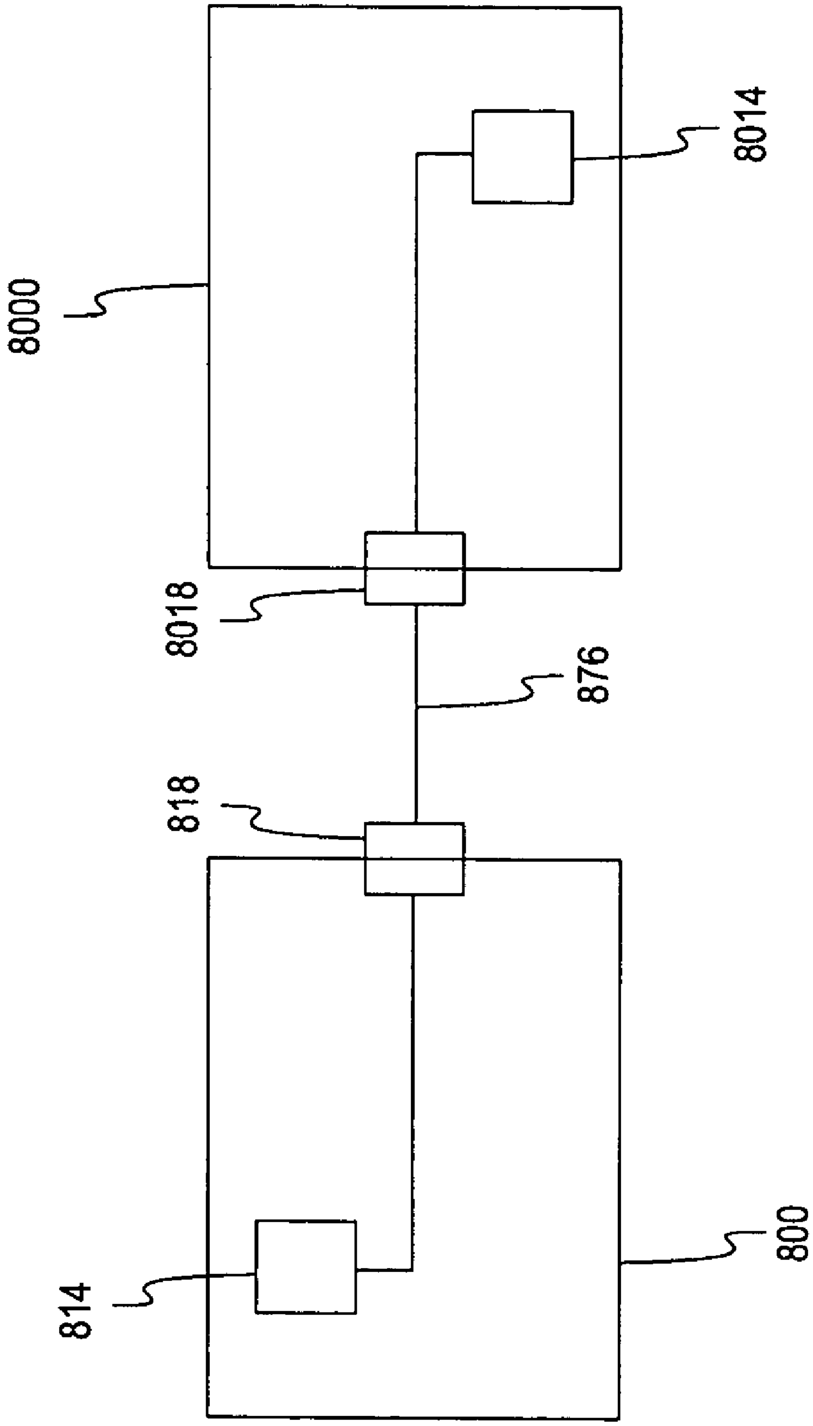
FIG. 8 is a functional block diagram of a document processing device coupled to a coin sorting device according to one embodiment of the present invention.

FIG. 8 illustrates a functional block diagram of a document processing device 800 coupled to a coin sorting device 8000 in accordance with one embodiment of the present invention. The document processing device 800 includes a communications port 818 and a controller 814, and is communicatively coupled to the coin sorting device 8000 via a cable 876. The coin sorting device 8000 includes a communications port 8018 and a controller 8014. The communications ports 818, 8018 may be any suitable communications port such as a serial or parallel port, USB port, and the like. In an alternate embodiment, the document processing device 800 and the coin sorting device 8000 communicate wirelessly, and the cable 876 is not included. In this alternate embodiment, the communications ports 818, 8018 are adapted to receive and transmit information wirelessly.

An operator places a stack of documents into the document processing device 800 for processing, and places a plurality of coins and/or tokens into the coin sorting device 8000 for sorting and counting. The document processing device 800 processes the stack of documents, and the controller 814 in the document processing device 800 stores information representative of the documents being processed, such as the denomination of the currency bills, the value of the substitute currency media, the number of non-genuine currency bills, the number of invalid substitute currency media, and so forth. The coin sorting device 8000 sorts and counts the coins or tokens, and the controller 8014 in the coin sorting device 8000 stores information representative of the coins or tokens being sorted and counted, such as the value and denomination of the coins (penny, dime, nickel, etc.), the number and kind of tokens, and so forth.

In some embodiments, the stored information in the coin sorting device 8000 is transmitted to the controller 814 of the document processing device 800. The document processing device 800 organizes and presents the combined information to the operator via a display, such as a monitor or touch screen. In other embodiments, the stored information in the document processing device 800 is transmitted to the controller 8014 of the coin sorting device 8000, which organizes and presents the information combined from both devices to the operator via a display, such as a monitor or touch screen.

Figure 9:
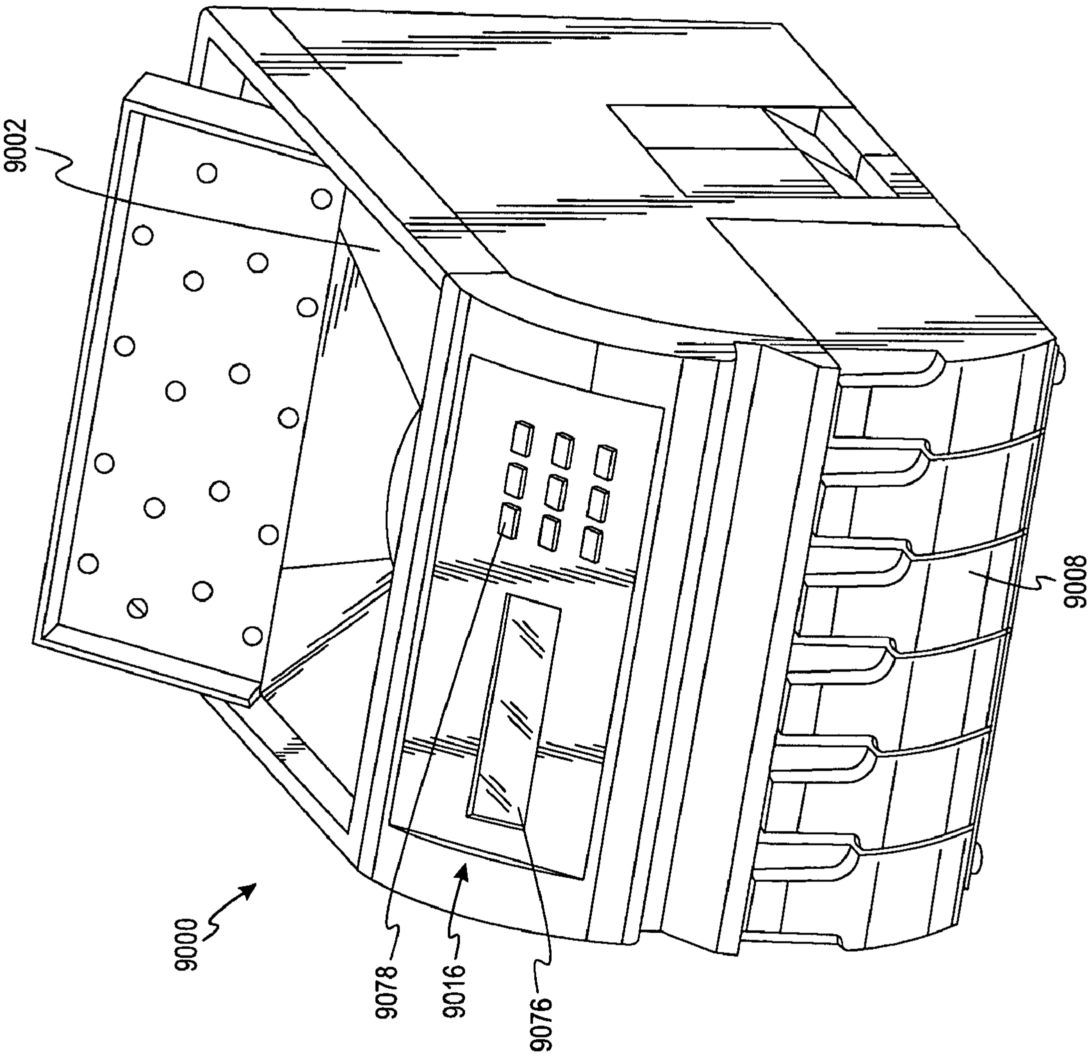
FIG. 9 is a perspective view of a compact coin sorting device according to one embodiment of the present invention.

Referring now to FIG. 9, there is shown a coin sorter system 9000. The coin sorter system 9000 includes a coin tray 9002 which receives coins of mixed denominations. The coins are sorted, counted, and are captured in a plurality of coin bins 9008 positioned on the exterior of the coin sorter system 9000. In alternate embodiments, the coins are captured in a plurality of coin bags.

The coin sorter system 9000 includes a control panel 9016. In the illustrated embodiment, the control panel 9016 includes a display 9076 for displaying information about the coin sorter system 9000 and a plurality of keys 9078 for allowing the operator to enter information to the coin sorter system 9000. In some alternate embodiments, the control panel 9016 includes a touch screen.

Additional details concerning the coin sorter system 9000 are disclosed in commonly assigned U.S. Pat. No. 6,139,418, entitled "High Speed Coin Sorter Having a Reduced Size," and U.S. Pat. No. 5,997,395, entitled "High Speed Coin Sorter Having a Reduced Size," each of which is herein incorporated by reference in its entirety. In one embodiment, the coin sorter system 9000 shown in FIG. 9 is modified to include a communications port such as the communications port 8018 described in connection with FIG. 8. The coin sorter system 9000 may be further modified to perform the coin sorting and authenticating functions disclosed in U.S. Pat. Nos. 5,299,977, 5,453,047, 5,507,379, 5,542,880, 5,865,673 and 5,997,395, each of which is herein incorporated by reference in its entirety.

In some embodiments, the evaluation region 104 of any one of FIGS. 1*a*–1*j* may be incorporated into a funds processing machine capable of processing both documents and coins.

Figure 10A:
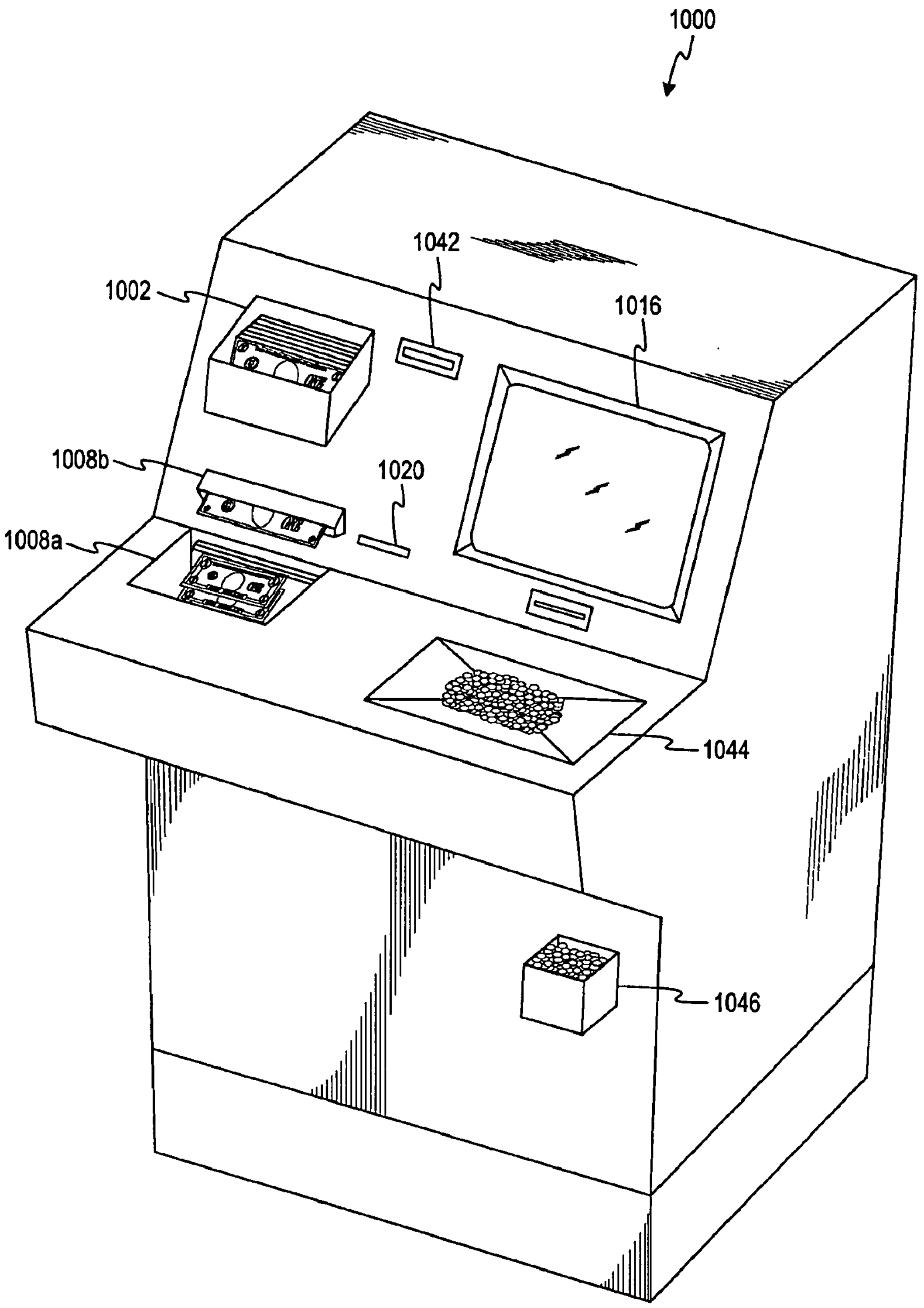
FIG. 10*a* is a perspective view of a funds processing machine according to one embodiment of the present invention.

Referring now to FIG. 10*a*, a finds processing machine 1000 includes a touch screen 1016 to provide inputs from a user and to display outputs to be viewed by the user. While the touch screen 1016 is the preferred mode to enter data from the user, the finds processing machine 1000 may also include a mechanical keyboard, in addition to or in lieu of the touch screen 1016, to receive such inputs.

The finds processing machine 1000 includes a coin receptacle 1044 which receives coins of a single denomination or of mixed denominations from a user. Additionally, an input receptacle 1002 is included within the funds processing machine 1000. The input receptacle 1002 is illustrated in its open position in FIG. 10*a* and may be retracted by the funds processing machine 1000 once the bulk currency has been placed therein by the user. These input devices 1044 and 1002 allow the user of the funds processing machine 1000 to input his or her funds which will ultimately be converted to some other sort of fund source that is available to the user. In addition to banknotes, the input receptacle 1002 of the funds processing machine 1000 can also accommodate casino script, paper tokens, or tickets including an indicia such as a barcode or MICR.

The funds processing machine 1000 includes a dispenser 1008*a* and a dispensed coin receptacle 1046 for dispensing to the user the desired amount of funds in both bank notes and coins. A return slot 1008*b* may also be included within the funds processing machine 1000 to return currency bills or substitute currency media to the user which cannot be authenticated or otherwise processed. Coins which cannot be authenticated may be returned to the user via the dispensed coin receptacle 1046. The funds processing machine 1000 further includes a document dispenser 1020 for providing a user with a receipt of the transaction that he or she has performed.

In its simplest form, the funds processing machine 1000 receives funds (currency, coins, substitute currency media) via the coin input receptacle 1044 and the input receptacle 1002, and after these deposited funds have been authenticated and counted, the funds processing machine 1000 returns to the user an amount equal to the deposited funds but in a different variation of bank notes and coins. For example, the user of the funds processing machine 1000 may input $102.99 in various small bank notes and pennies and in turn receive a $100 bank note, two $1 bank notes, three quarters, two dimes, and four pennies. Alternatively, the funds processing machine 1000 may simply return a receipt of the transaction or a ticket with an indicia through the document dispenser 1020 which the user can redeem for funds by an attendant of the funds processing machine 1000. Alternatively, the funds processing machine 1000 can credit a user's account.

The funds processing machine 1000 may also include a media reader slot 1042 into which the user inserts his or her identification card so that the funds processing machine 1000 can identify the user. The touch screen 1016 typically provides the user with a menu of options which prompts the user to carry out a series of actions for identifying the user by displaying certain commands and requesting that the user depress touch keys on the touch screen 1016 (e.g., a user PIN). The finds processing machine 1000 includes a card media reader device which is capable of reading from or writing to one or more types of card media. This media may include various types of memory storage technology such as magnetic storage, solid state memory devices, and optical devices.

Figure 10B:
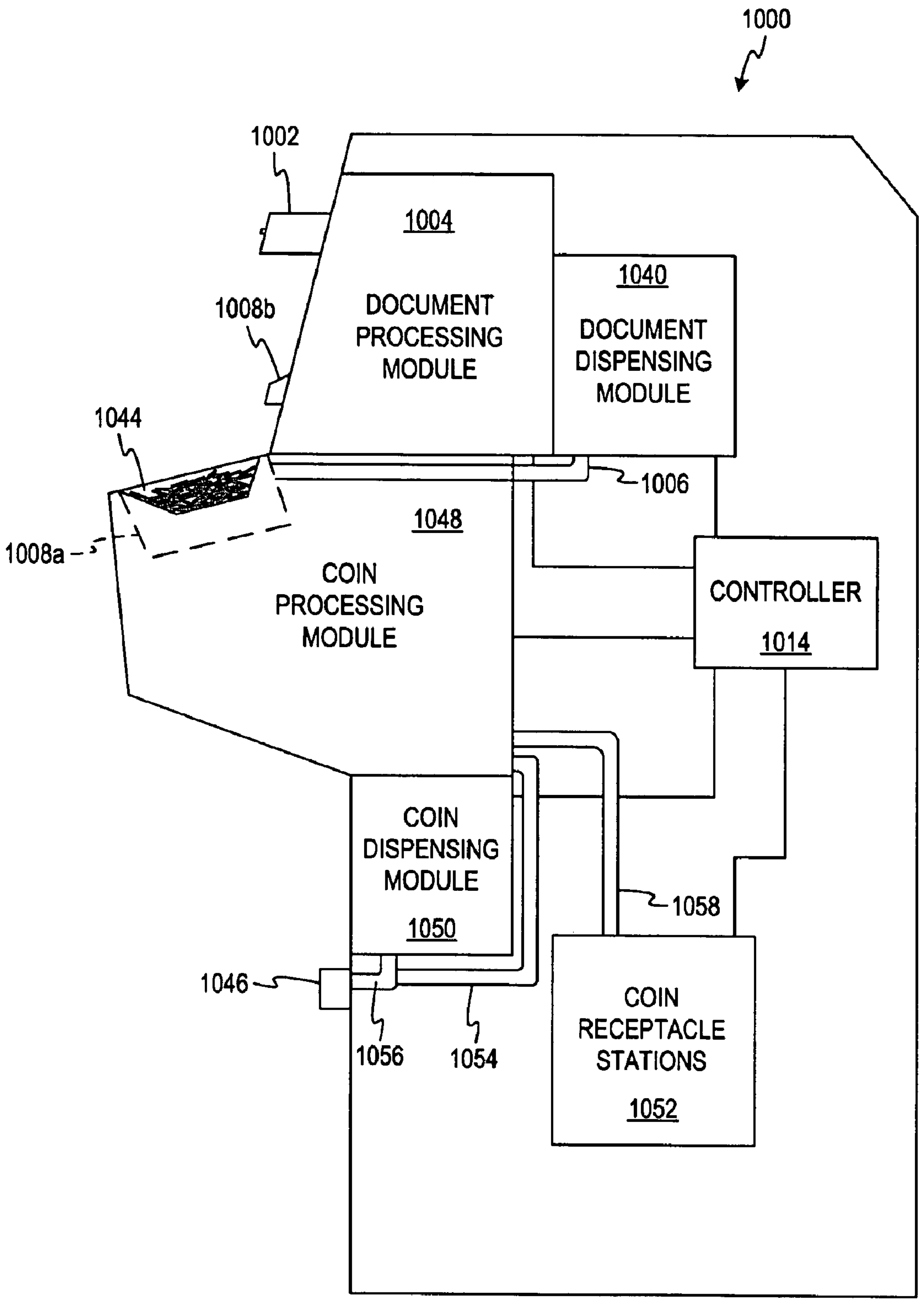
FIG. 10*b* is a side view of the funds processing machine of FIG. 10*a* which schematically illustrates the various modules present in the funds processing machine.

FIG. 10*b* illustrates the funds processing machine 1000 in a side view illustrating the various modules. The document processing module 1004 receives documents from the input receptacle 1002 for processing. The inward movement of the input receptacle 1002 positions a stack of documents at the feed station of the document scanning and counting device which automatically feeds, counts, scans, authenticates, and sorts the documents, one at a time at a high rate of speed (e.g., at least 350 documents per minute). In place of or in addition to the input receptacle 1002, the finds processing machine 1000 may include a single document receptacle which receives and processes one document at a time. The documents that are recognized by the document processing module 1004 are delivered to a storage area such as a currency canister (not shown). When a document cannot be recognized by the document processing module 1004, it is returned to the customer through the return slot 1008*b*. Exemplary machines which scan, sort, count, and authenticate currency bills as required by the bank note processing module are described in U.S. Pat. Nos. 5,295,196, 5,870,487 and 5,875,259, each of which is incorporated by reference herein in its entirety.

In place of or in addition to the input receptacle 1002, the finds processing machine 1000 may include an input receptacle slot which receives and processes one document at a time. Such an input receptacle slot would be placed at the front of the funds processing machine 1000.

Additional details of the finds processing machine 1000 are disclosed in commonly assigned, co-pending U.S. patent application Ser. No. 09/562,231, entitled "Currency Processing Machine with Multiple Internal Coin Receptacles," which is herein incorporated by reference in its entirety.

In accordance with the present invention, the document processing module 1004 of the funds processing machine 1000 shown in FIG. 10*b* and described in U.S. patent application Ser. No. 09/562,231 is modified to incorporate the evaluation region 104 shown and described in connection with any one of FIGS. 1*a–j*. The user deposits currency bills and substitute currency media into the input receptacle 1002. As described in more detail below, the funds processing machine 1000 may be communicatively coupled to a casino gaming network. In such an embodiment, a casino customer may deposit a stack of casino cashout tickets and currency bills into the input receptacle 1002, and the machine 1000 queries the casino gaming network for the payout amounts associated with the casino cashout tickets. This payout amount may be added to the customer's total such that the customer is dispensed (via the dispenser 1008*a* for example) the total amount of currency deposited plus the value of any payout associated with valid cashout tickets.

The funds processing machine 1000 also includes a coin processing module 1048. The coin processing module 1048 sorts, counts and authenticates the mixed coins which are deposited in the coin input receptacle 1044 which leads directly into the coin processing module 1048. The coins are sorted in the coin processing module 1048 in a variety of ways but the preferred method is a sorting based on the diameter of the coins. When a non-authenticated coin is determined by the coin processing module 1048, it is directed through a coin reject tube 1054 towards the dispensed coin receptacle 1046. Thus, the user who has entered such a non-authenticated coin can retrieve the coin by accessing the dispensed coin receptacle 1046. Coin sorting and authenticating devices which can perform the function of the coin processing module 1048 are disclosed in U.S. Pat. Nos. 5,299,977, 5,453,047, 5,507,379, 5,542,880, 5,865,673 and 5,997,395, previously incorporated by reference. Alternatively, other coins sorters such as a rail sorter can be used to perform the function of the coin processing module 1048.

The funds processing machine 1000 further includes a document dispensing module 1040 which is connected via transport mechanism 1006 to the dispenser 1008*a* that is accessible by the user. The document dispensing module 1040 typically dispenses loose bills in response to a request of the user for such bank notes. Also, the document dispensing module 1040 may be configured to dispense strapped notes into the dispenser 1008*a* if that is desired. In one embodiment of the present invention, the user may select the denomination of the loose or strapped bills dispensed to the user. As noted above, the document dispensing module 1040 is modified in one embodiment to dispense both currency bills and substitute currency media. For example, in one embodiment, the document dispensing module 1040 may return to the user invalid substitute currency media. In addition, as mentioned above, the document dispensing module 1040 may dispense a ticket with an indicia which the customer may redeem for funds.

The funds processing machine 1000 also includes a coin dispensing module 1050 which dispenses loose coins to the user via the dispensed coin receptacle 1046. The coin dispensing module 1050 is connected to the dispensed coin receptacle 1046 via a coin tube 1056. Thus, the user of the funds processing machine 1000 has the ability to select the desired coin denominations that he or she will receive in response to a transaction.

The coins which have been sorted into their denomination by the coin processing module 1048 are sent to coin tubes 1058 which correspond to each specific denomination. The coin tubes 1058 lead to a coin receptacle station 1052 for each of the denominations that are to be sorted and authenticated by the coin processing module 1048.

The funds processing machine 1000 includes a controller 1014 which is coupled to each module 1004, 1040, 1048, 1050 and 1052 within the funds processing machine 1000 and controls the interaction between each module. For example, the controller 1014 may review the input totals from the funds processing modules 1004 and 1048 and direct an appropriate funds output via the funds dispensing modules 1040 and 1050. The controller 1014 also directs the operation of the coin receptacle stations 1052 as described below. While not shown, the controller 1014 may also be coupled to a media reader associated with the media reader slot 1042 and also to a printer at the document dispenser 1020, if these devices are present in the funds processing machine 1000. The printer, for example, may print a ticket with an indicia representative of the amount of funds deposited by the customer, or the printer may print a receipt of the transaction.

Figure 11:
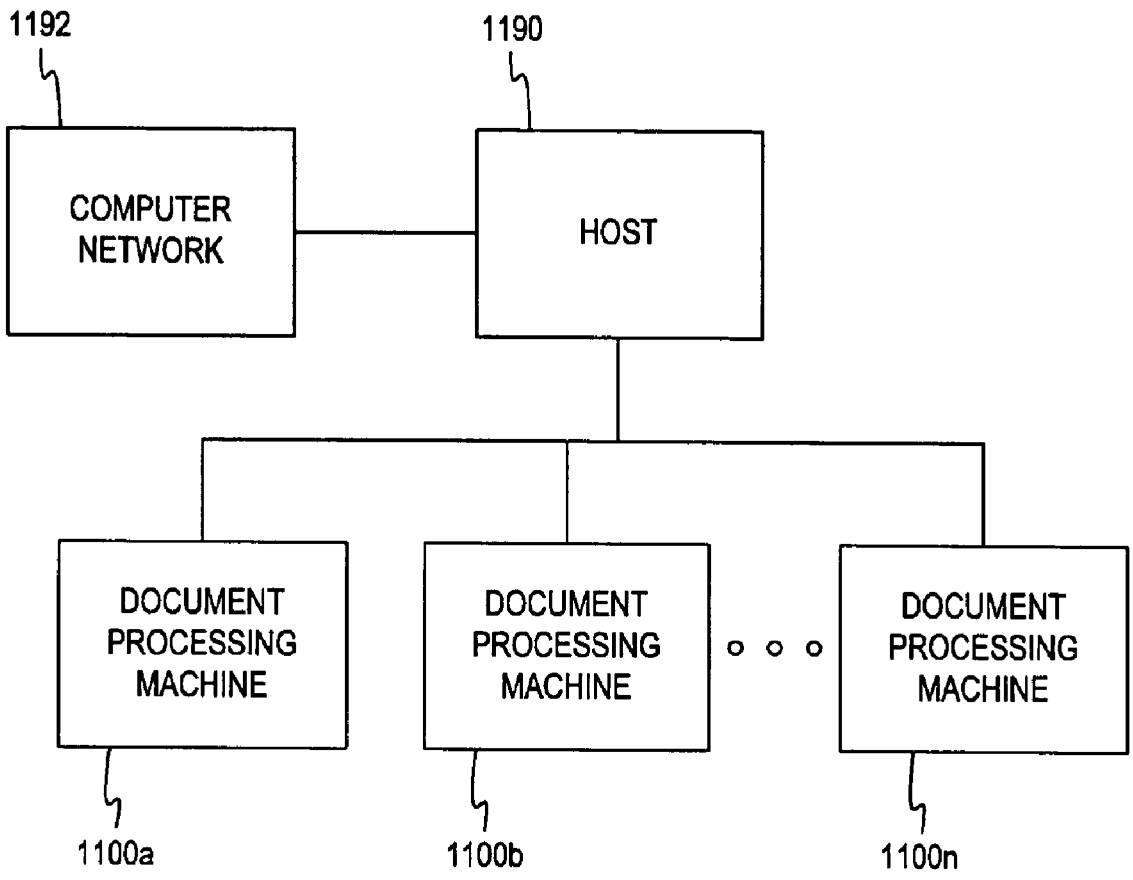
FIG. 11 is a functional block diagram of a network of document processing devices in communication with a computer network.

According to some embodiments of the present invention, any of the foregoing systems may be communicatively coupled to a computer network, such as a casino gaming machine network or a retailer network. FIG. 11 illustrates a host system 1190 coupled to a plurality of document processing devices 1100*a*, 1100*b*, . . . 1100*n*. The document processing devices 1100*a*, 1100*b*, . . . 1100*n* may be any device shown or described in connection with FIGS. 2–10*b*. The host system 1190 is further coupled to a computer network 1192. The computer network 1192 provides the host system 1190 with real time information, such as information relating to the demands for particular types of coin receptacles and information about the substitute currency media detected by the document processing devices 1100*a–n*. In alternate embodiments, the computer network 1192 may be a casino gaming machine network or a retailer network. Each of these embodiments is discussed next.

In one embodiment, the computer network 1192 is a casino gaming machine network and includes a database for storing information about tickets with an indicia that have been dispensed by the casino's gaming machines. When a ticket is dispensed, the ticket number is stored in a database along with the payout amount. An indicia, such as barcode 138 shown in FIG. 1*e*, encodes the ticket number and the payout amount. When the ticket is deposited into the document processing device 1110, the evaluation unit 104 of the document processing device 1100 reads the indicia on the ticket. If a valid indicia is read, the document processing device 1100 transmits the indicia number to the host 1190. The host 1190 queries the computer network 1192 for the payout amount associated with the indicia number, and transmits the payout amount back to the document processing device 1100. The document processing device 1100 adds the payout amount to the running total of currency deposited by the operator into the machine 1100.

Alternatively, the indicia numbers associated with tickets identified by the document processing device 1100 are stored in the document processing device 1100. These numbers are periodically provided to the casino gaming machine network 1192. The casino machine gaming network 1192 may include a casino accounting system. The numbers are matched up with the payout amounts stored in a database associated with the casino machine gaming network 1192, and the payout amounts may then be reconciled in the casino accounting system.

In another embodiment, the casino gaming machine network 1192 is a retailer network that includes a retailer database for storing information about promotional media. For example, a retailer customer may deposit both currency bills and substitute currency media such as store coupons or gift certificates into a self-checkout station at the point of sale. The documents deposited at the self-checkout stations are deposited into a document processing device 1100. Documents from cash register tills may also be deposited into a document processing device 1100. The document processing device 1100 rapidly processes the documents, and identifies the indicia numbers from the media. These indicia numbers are then transmitted to the retailer network which determines the values associated with the indicia numbers (such as fifty cents off, or a $50 gift certificate) by querying the retailer database. These values are then reconciled in the retailer's accounting system. Optionally, these values may be transmitted back to the document processing device 1100 for display to the customer.

Alternatively, the computer network 1192 may be a financial or banking institution network 1192 coupled to a host system 1190 that may reside, for example, at a branch location of a bank. The host system 1190 then receives information from document processing machines 1100*a*–1100*n* regarding transactions such as deposits, withdrawals, etc. The host system 1190 may be queried or utilized to reconcile accounts and/or process documents that are unrecognizable by the document processing machines 1100*a*–1100*n*.

Figure 12:
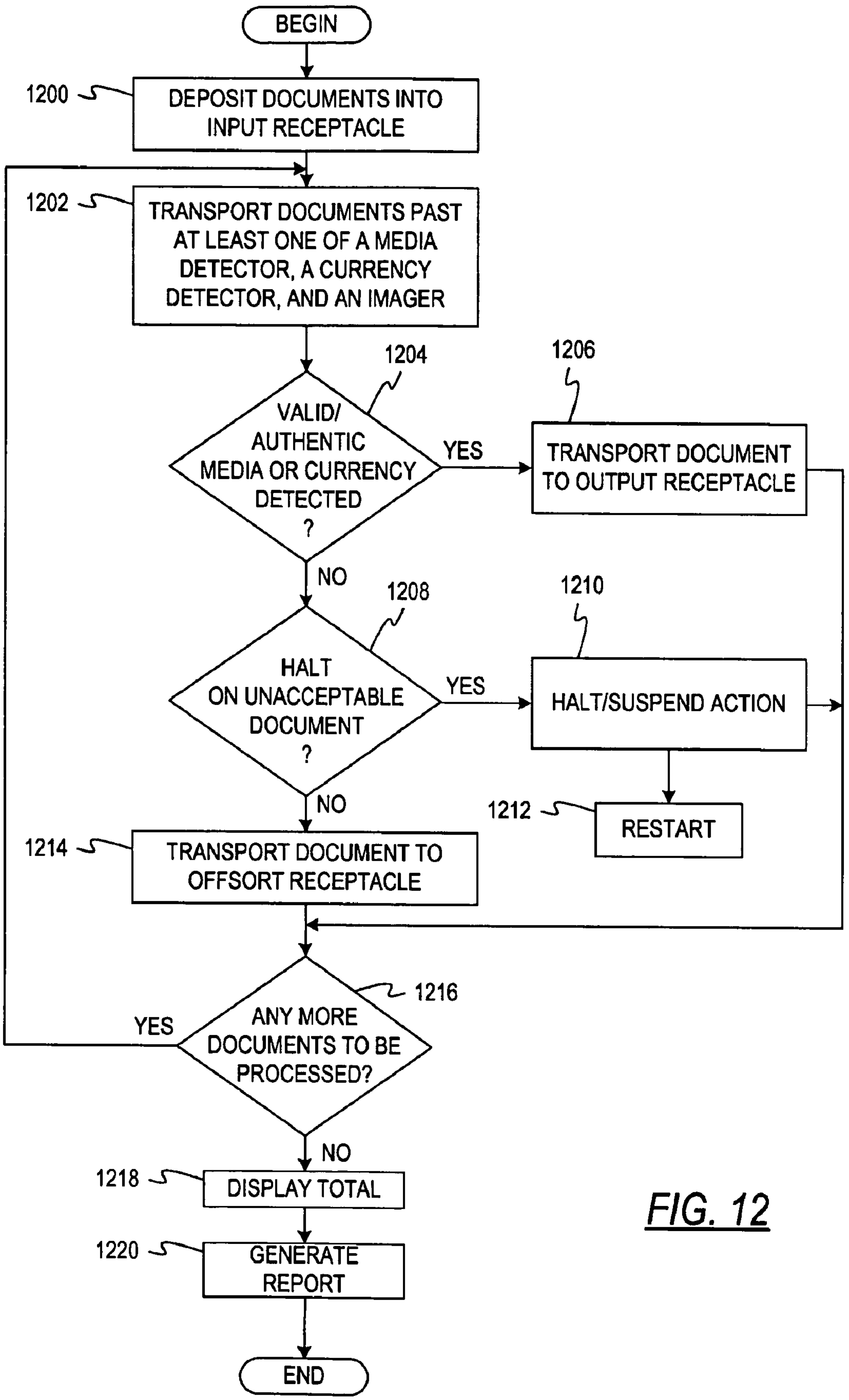
FIG. 12 is a flowchart describing the operation of a document processing device according to one embodiment of the present invention.

Turning now to FIG. 12, there is shown a flowchart describing the operation of a document processing device according to one embodiment of the present invention. Operation begins when an operator deposits documents into an input receptacle of a document processing device (step 1200). Operation may commence automatically, such as when a sensor detects the presence of documents in the input receptacle, or manually, such as when the operator actuates a switch, key, or button on the document processing device. The documents may include a combination of mixed currency bills and substitute currency media, or the documents may include currency bills only or substitute currency media only.

In some embodiments, the input receptacle is adapted to receive a stack of documents. In other embodiments, the input receptacle is adapted to receive one document at a time. The deposited documents are transported, one at a time, along a transport mechanism in the document processing device. In step 1202, a first document is transported past at least one of a media detector, a currency detector, and an imager. As noted above with respect to FIGS. 1*a*–1*j*, more than one media detector, currency detector, and imager may be used and the detectors and imager may be oriented on one or more sides of the transport mechanism. In step 1204, at least one of a media detector, currency detector, and imager provides a signal representative of whether a valid substitute currency medium or currency bill was detected. For example, if a reader provides a "good read" signal in response to scanning the first document, the first document is a valid medium. However, if the reader provides a "no read" signal, the first document is not a valid medium. If the first document is a valid document, the first document is transported to an output receptacle (step 1206). Which output receptacle receives the first document depends on which output receptacle has been specified according to a preprogrammed or operator-defined mode. If there is only one output receptacle on the document processing device, then the first document is transported to that output receptacle. The document processing device can also determine the denomination of the currency bill, and transport the first document to the appropriate output receptacle according to operator-specified instructions or preprogrammed instructions.

Note that between steps 1204 and 1206, in some embodiments, the first document may be first transported to a bill facing mechanism before being transported to an output receptacle. According to some of such embodiments, the document processing device is adapted to determine which orientation the first document is facing, and if the first document is facing the wrong orientation, it can be transported to a bill facing mechanism. Alternatively, the desired face orientation can be predetermined either by the manufacturer or the operator. In other embodiments, the first document is not transported to a bill facing mechanism. In some embodiments, a genuine currency bill may optionally be transported to a document facing mechanism, such as the document facing mechanism 203 shown in FIGS. 2 and 3, for proper orientation before being transported to an output receptacle if the currency detector determines that the currency bill is not properly oriented.

At step 1208, the document processing device determines whether it is instructed to halt on detecting an unacceptable document, i.e., a document that is neither valid substitute currency media nor authentic currency bills, such as a blank piece of paper. These instructions may be operator-specified or preprogrammed. In some embodiments, the document processing device is adapted to determine whether an unacceptable document is an invalid medium or a non-genuine currency bill, and can receive separate instructions on handling each. If the device is instructed to halt on detecting an unacceptable document, the operation of the device is halted or suspended at step 1210 to permit inspection and/or removal of the unacceptable document. At step 1212, operation of the device is restarted once the unacceptable document has been inspected and/or removed from the document processing device, and operation continues at either steps 1200 or 1216 depending on pre-programmed or operator-specified instructions. In some embodiments, the operator may, upon inspection, determine a bill's denomination. In such embodiments, the operator may manually enter the denomination of a currency bill, such a via a denomination key, deposit the bill into an output receptacle, and resume operation. In another embodiment, the operator may, upon inspection, determine information about the unacceptable substitute currency medium, such as the information described above.

Returning to step 1208, if the document processing device is instructed to offsort unacceptable documents, the unacceptable document is transported to the offsort receptacle at step 1214. The particular offsort receptacle which is to receive unacceptable documents may be operator-specified or preprogrammed. In embodiments in which the device is adapted to discriminate between invalid media and non-genuine currency bills, the unacceptable document may be routed to one of two offsort receptacles depending on what kind of unacceptable document was detected. This routing decision may be made under the control of operator-specified or preprogrammed instructions.

If there are no further documents to be processed at step 1216, the device may optionally display information associated with the processed documents at step 1218. This information may include any combination of the following according to one or more different embodiments: the total amount of authentic currency bills processed (e.g., $15,567); a breakdown of the denominations of currency bills processed (e.g., 140 $1 bills, 147 $5 bills, 268 $10 bills, and so on); the total number of valid media detected (e.g., 156 pieces of valid media processed); indicia information detected from substitute currency media (e.g., barcode number 12345678); the total number of flagged currency bills processed (e.g., 5 flagged bills, where 3 bills are no call bills, 1 bill is a suspect bill, and 1 bill is both suspect and no call); the total number of invalid substitute currency media detected (e.g., 16 pieces of invalid media processed); the total amount of media detected (e.g., $10,000 in media processed); the total number of unidentified documents—i.e., documents which were neither determined to be a currency bill nor a valid substitute currency medium, such as a blank piece of paper for example—detected (e.g., 27 pieces of unidentified documents processed); why a particular currency bill was not authenticated (e.g., 4 bills failed magnetic strip test, 2 bills failed ultraviolet test); the total number of documents processed (e.g., 11,253 documents processed); the number of batch identification cards processed (e.g., 4 batch identification cards processed); identification information of the gaming machine from which a batch of currency bills and substitute currency media originated based on information encoded on a batch identification card (e.g., batch identification card number 12345 which identifies gaming machine number 42); and other suitable information.

At step 1220, the device may optionally generate a report based on some or all of the information displayed at step 1218. This report may be formatted and displayed to the operator, and/or it may be printed, and/or it may be transmitted to a network computer for storage or further manipulation.

Note that in the embodiments described in connection with FIG. 12, the device may further include a coin sorting device in which coins are also processed. The information associated with the processed coins may be combined with the information associated with the processed documents. A single report or separate reports may be generated based on the processed coins and processed documents.

Figure 13:
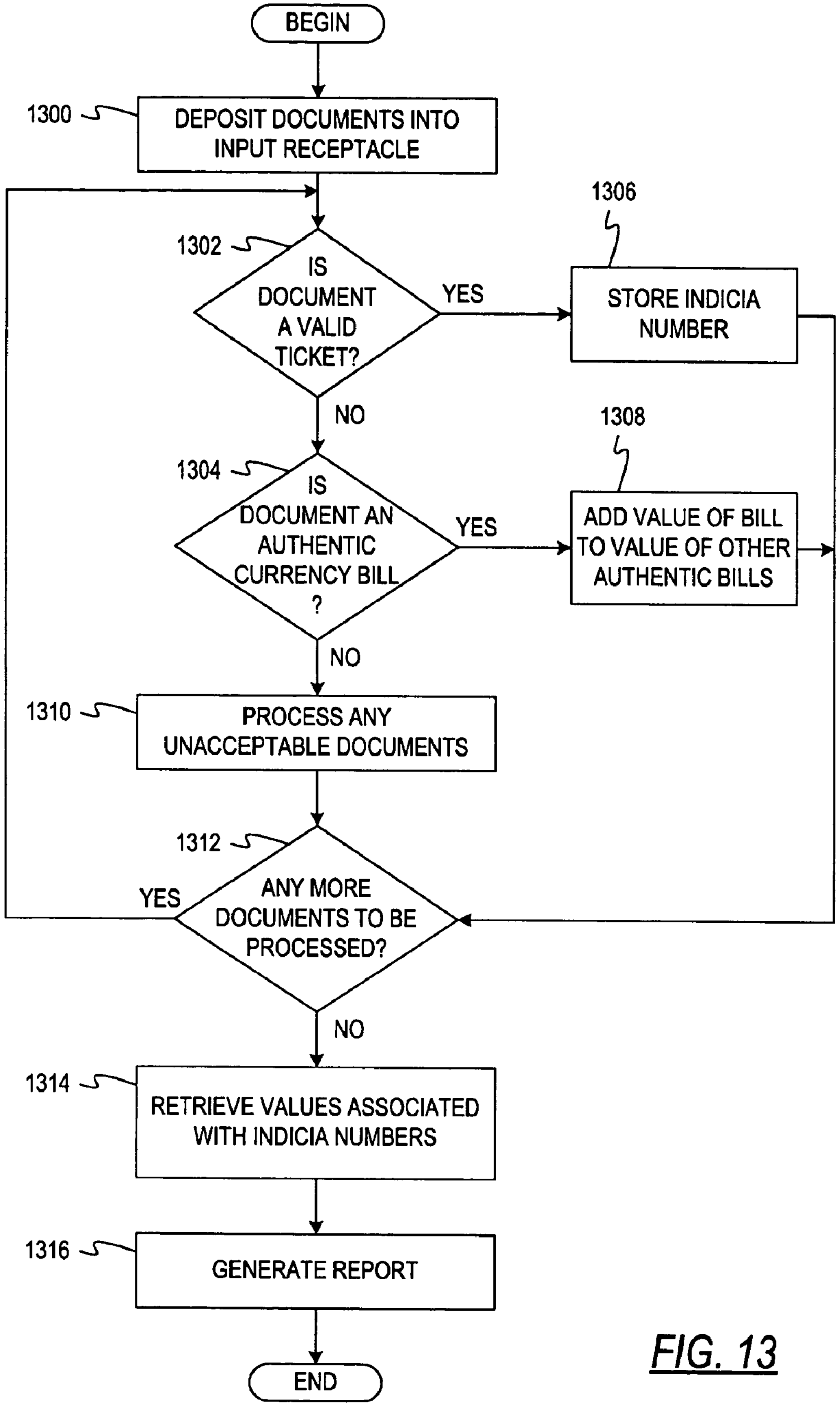
FIG. 13 is a flowchart further describing the operation of a document processing device according to any embodiment described in connection with FIG. 12.

Turning now to FIG. 13, there is shown a flowchart further describing the operation of a document processing device according to any embodiment described in connection with FIG. 12. At step 1300, documents are deposited into an input receptacle of a document processing device. The documents may include a combination of mixed currency bills and substitute currency media, or they may include currency bills only or substitute currency media only. At steps 1302 and 1304, the device determines whether a first document is a valid ticket or whether a first document is an authentic currency bill. Note that steps 1302 and 1304 can be performed in any order. If a document is determined to be a valid ticket, the indicia number associated with the ticket is stored in a memory location at step 1306. At step 1308, if a document is determined to be an authentic currency bill, the value of the currency bill is added to the value of all authentic currency bills scanned since step 1300. This value may be initialized to zero or may be initialized to some other number, such as a number representing the total amount of another batch of currency bills which was processed by the document processing device. If the first document is determined to be neither a valid ticket nor an authentic currency bill, it may be processed at step 1310 in accordance with steps 1214, 1216, 1218, and 1220 described in connection with FIG. 12 hereinabove.

At step 1312, the device determines whether any more documents remain to be processed. If there are, operation continues at step 1302 until there are no further documents to be processed. If no further documents are to be processed, the device retrieves the values associated with the stored indicia numbers from a storage medium that may be within the device, remote from the device, or from a computer network at step 1314. Alternatively, after each instance in which the device detects an indicia number, the device may retrieve the value associated with the indicia number from the computer network. The computer network may be a casino gaming machine network or a retailer network, for example. In a casino gaming environment, the indicia numbers may be associated with cashout tickets. In the retailer environment, the indicia numbers may be associated with store coupons, gift certificates, or other promotional media. In the casino gaming environment, one or more databases may be linked to provide information about the player who redeemed the ticket, when the ticket was dispensed, when the ticket was redeemed, and so forth, based on the indicia number from a cashout ticket. In the retailer environment, one or more databases may be linked to provide information about the product associated with the promotion, manufacturer data, and customer information based on data associated with customer loyalty cards, for example. This information and the other information described in connection with FIG. 12 may be included in a report generated by the device at step 1316. All or a portion of this generated report may be displayed and/or printed and/or stored or transmitted for later retrieval or further manipulation.

Additional details concerning the operation of a document processing device according to the present invention may be found in connection with the description of FIGS. 1*a*–11 above.

Figure 13A:
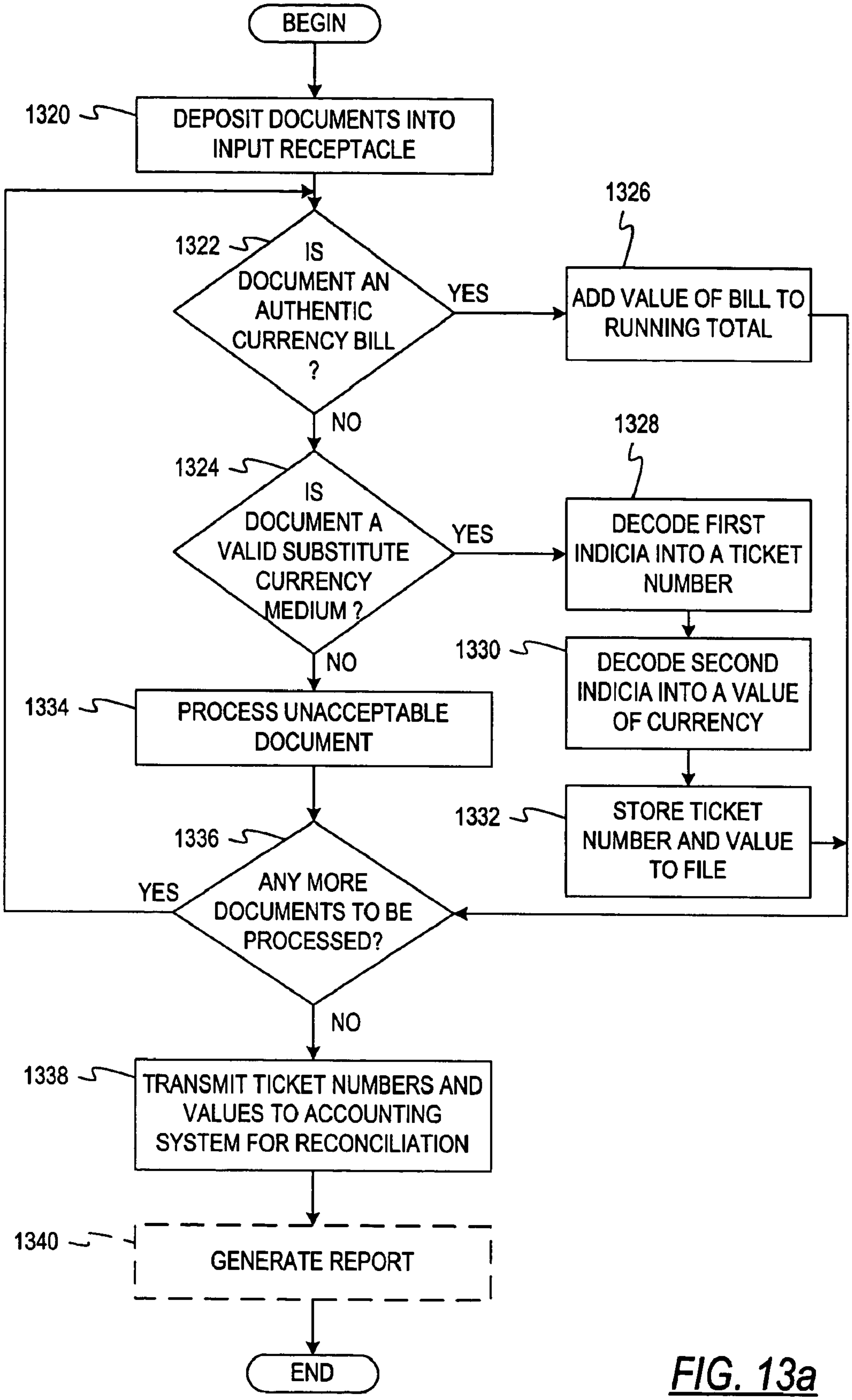
FIG. 13*a* is a flowchart of a method for operating a document processing device according to any embodiment of the present invention in which the document processing device is adapted to process documents bearing more than one indicia.

FIG. 13*a* illustrates a method of processing documents including currency bills and substitute currency media bearing more than one indicia pattern in a document processing device according to any embodiment described in connection with FIG. 12. A plurality of documents are deposited into an input receptacle of a document processing device at step 1320. The document processing device determines whether the document under consideration is an authentic currency bill at step 1322. If the document is an authentic currency bill, the bill's denomination is determined and, at step 1326, the value of the bill is added to a running total of the value of currency bills processed. If the document is determined not to be an authentic currency bill, the document processing device checks whether the document is a valid substitute currency medium at step 1324. Note that the sequence of steps shown in FIG. 13*a* are not necessarily presented in the order in which they are performed. For example, step 1324 could be performed before or concurrently with step 1322.

In the specific case where the substitute currency media are tickets, a valid substitute currency medium is detected when a media detector successfully decodes the indicia patterns imprinted on the ticket into sets of meaningful characters. In a specific embodiment, one set of meaningful characters is a ticket number, and another set of meaningful characters is a value or amount of currency. Thus, a value of $12BB, for example, would not be a meaningful set of characters and the document would be flagged as an invalid substitute currency medium and processed as such at step 1334. Similarly, the ticket numbers may have to conform to a set of predetermined rules, such as being a six-digit number followed by an alphabet letter. Thus, a ticket number of 1234567 would not be a meaningful set of characters, and a document bearing that ticket number would be flagged and processed as an invalid substitute currency medium.

At step 1334, operation of the document processing device may be halted or suspended, or the invalid substitute currency medium may be directed to a reject output pocket, for example. If a valid substitute currency medium is detected, the first indicia pattern is decoded into a ticket number at step 1328. The second indicia pattern is decoded into a value at step 1330, and the ticket number and the value are stored to a file at step 1332. As mentioned above with respect to FIGS. 1*a*–1*j*, information such as the ticket number and value may be appended to an image file captured by an imager.

At step 1336, the document processing device determines whether there are any more documents to be processed. If so, processing continues at step 1322. If there are no further documents to be processed, the document processing device transmits the ticket numbers and values generated at either or both of steps 1326 and 1332 to an accounting system for reconciliation at step 1338. Alternately, the document processing device can copy the file to a portable storage medium. The machine operator may then present the portable storage medium to the accounting system for reconciliation. At step 1340, an optional report may be generated containing a summary of the processed documents.

Figure 13B:
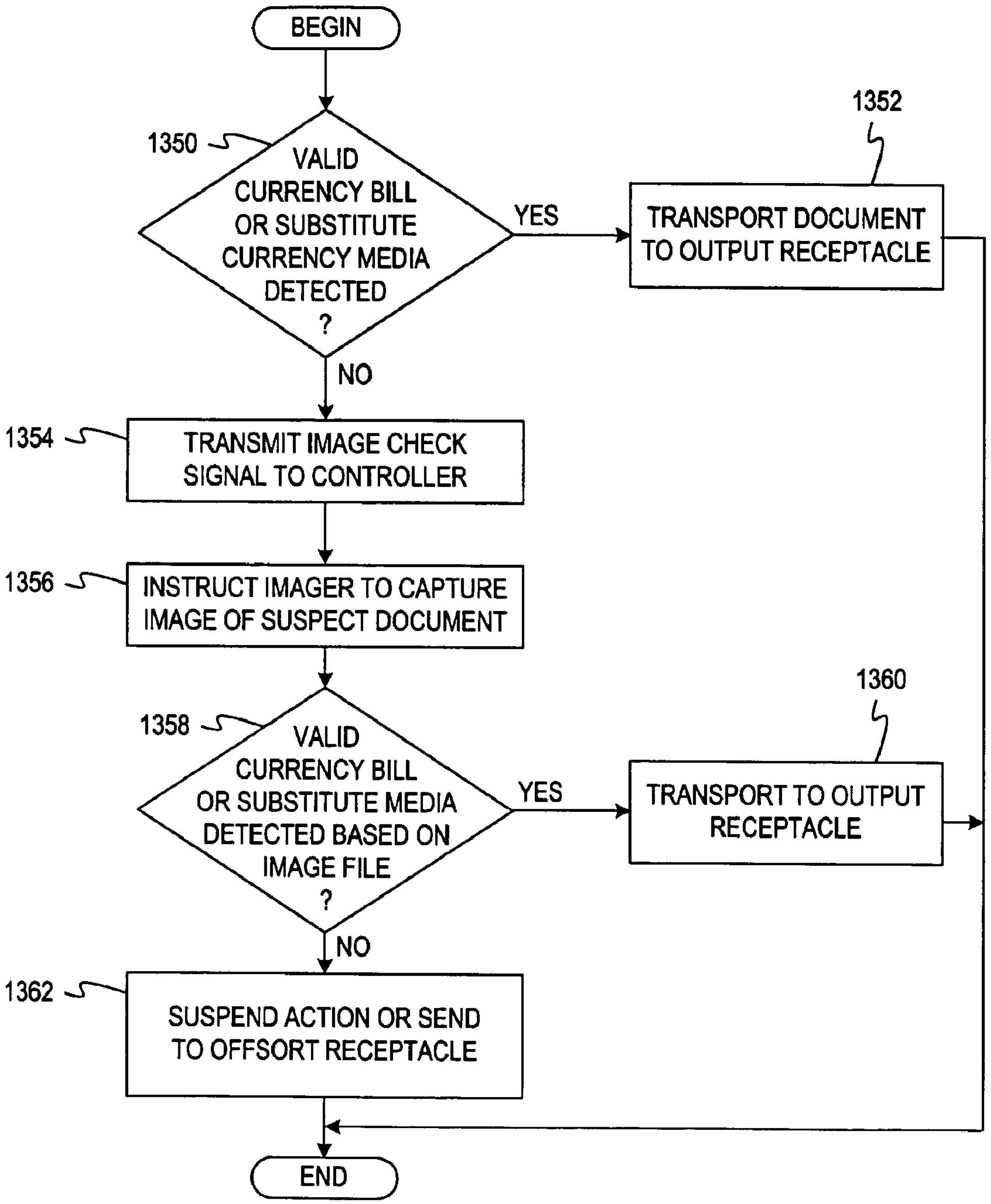
FIG. 13*b* is a flowchart describing the operation of a document processing device according to one embodiment of the present invention.

FIG. 13*b* a flowchart describing the operation of a document processing device according to an alternate embodiment of the present invention. As set forth above, the imager may be utilized in conjunction with both the media detector and the currency detector, or the imager may replace the media detector, the currency detector, or both. Beginning with step 1350, either a media detector or a currency detector determines if a valid document is detected. If the document is valid, then, at step 1352, the document is transported to the output receptacle. If the media detector or the currency detector does not indicate a valid document, then an image check signal is transmitted to the controller at step 1354. At step 1356, the controller instructs the imager to capture at least one image of the suspect document. At step 1358, at least a portion of the image file is compared to stored information regarding indicia and/or currency authentication information. If a valid document is detected at step 1358, then the document is transported to an output receptacle at step 1360. If a valid document is not detected, then at step 1362 action may be suspended or the suspect document may be sent to an offsort receptacle. In addition to the above scenario, step 1350 may be performed by an imager and step 1358 may be performed by an additional imager or the document may be rescanned by the same imager utilized in step 1350. In addition, the imager may capture an image of every document whether the document has been previously validated or not.

Figure 14:
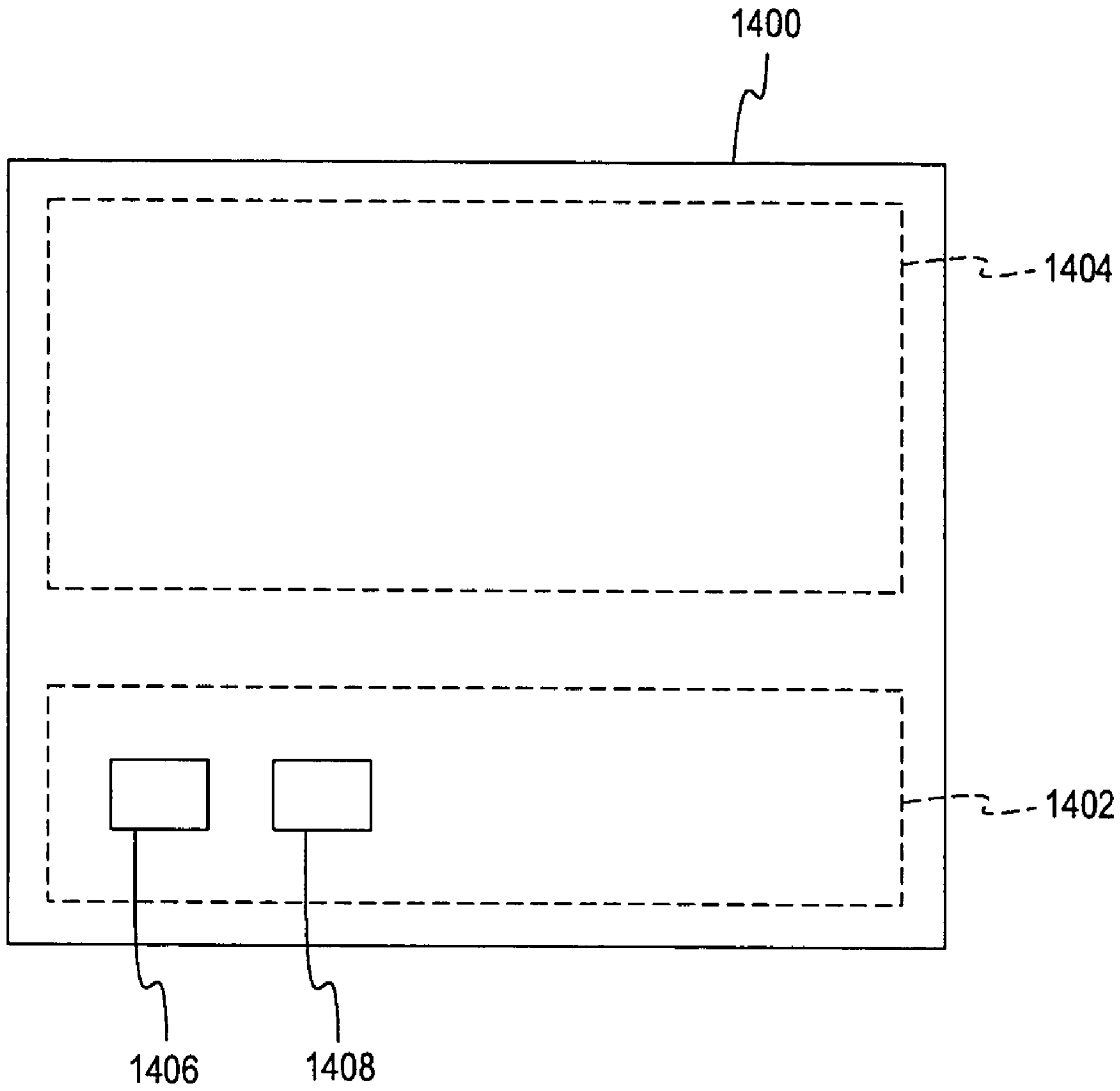
FIG. 14 illustrates a functional block diagram of a touch/video display according to one embodiment of the present invention.

FIG. 14 illustrates a functional block diagram of a control unit comprising a display 1400 according to one embodiment of the present invention. The display 1400 is a display that comprises a touch portion 1402 and a visual portion 1404. The touch portion 1402 of the display 1400 operates as a touch screen, accepting input from the operator through actuation of specific areas 1406, 1408 on the touch portion 1402. The touch portion 1402 may also display information to the operator. The visual portion 1404 of the display operates as either a video display or a still image display. For example, an operator of a document processing device in accordance with any embodiment shown or described herein may need assistance in operating the device. In a training mode, for example, the display 1400 would receive input from the operator indicating a desired area of training (such as clearing document jams, for example) via the touch portion 1402 of the display 1400, and would display a video presentation or a series of still images, for example, of the desired area of training on the visual portion 1404. The video presentation of still images could direct the operator to perform various tasks as part of the training mode, pausing to permit the operator to complete a task, and then resuming when the operator so indicates by touching a specific area on the touch portion 1402 of the display 1400, such as specific area 1406. In alternate embodiments, the display 1400 may be employed to provide interactive help or instructional presentations regarding various operations of the document processing device, or to communicate messages such as advertisements or other information to an operator. In addition, the visual portion 1404 may be utilized to display images captured by the imager 111. The operator may, for example, check for correctness of the captured image or enter information related to the captured image that may then be appended to the image file.

As described above, an operator may select via the control unit 116 any one of a multitude of preprogrammed or user-defined modes, such as those disclosed in U.S. Pat. No. 6,278,795, entitled "Multi-Pocket Currency Discriminator," and in co-pending U.S. patent application Ser. No. 09/635,181, entitled "Method of Creating Identifiable Smaller Stacks of Currency Bills Within a Larger Stack of Currency Bills," and U.S. patent application Ser. No. 09/688,538, entitled "Currency Handling System Having Multiple Output Receptacles," which was filed on Oct. 16, 2000, previously incorporated by reference. The operator may select these and other modes via an interface such as the control unit 116 shown in FIG. 1*a* and described above.

Figure 15:
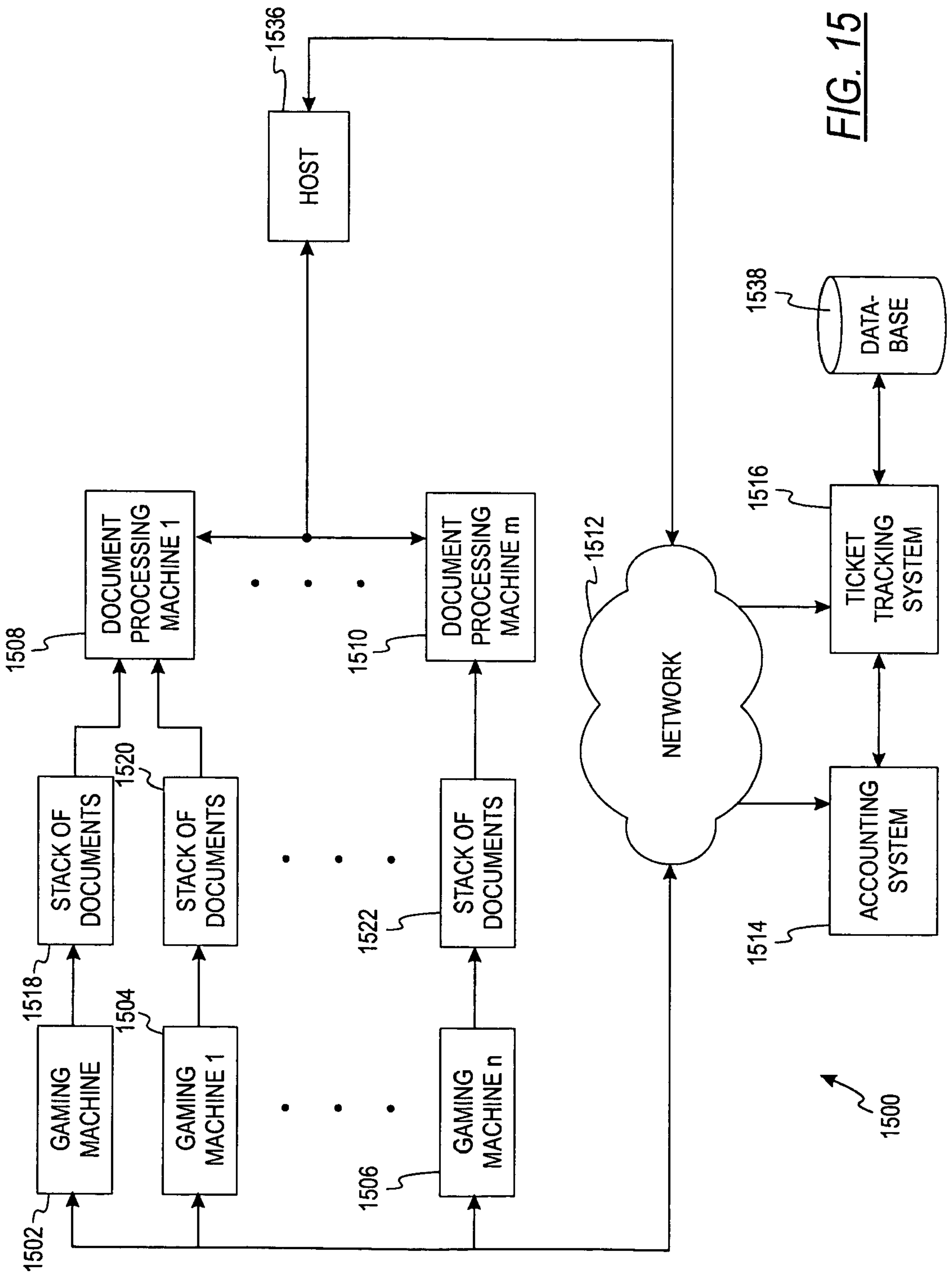
FIG. 15 is a flowchart of a method for processing documents according to one embodiment of the present invention.

FIG. 15 is a diagram of a system 1500 for processing currency bills and substitute currency media which generally includes gaming machines 1502, 1504, 1506, document processing devices 1508, 1510, and a network 1512. While FIG. 15 describes embodiments in a casino environment, other environments such as a retailer, an amusement park, or a financial institution for example, are contemplated. In a retailer environment, the gaming machines 1502, 1504, 1506 are replaced with document accepting devices, such as self-checkout stations. In an amusement park environment, the gaming machines 1502, 1504, 1506 may be replaced with vending machines or other document accepting devices suitable for use in amusement park environments. In a financial institution environment, the gaming machines 1502, 1504, 1506 may be replaced with ATM type machines for receiving and outputting currency bills, deposit slips, etc. In short, the gaming machines 1502, 1504, 1506 may be any document accepting device suitable for use in a particular environment. A document accepting device includes a document acceptor for accepting a document, such as a currency bill or a substitute currency medium.

A casino environment includes a first gaming machine 1502, a second gaming machine 1504, and an nth gaming machine 1506 arranged about a casino floor. Casino patrons play games of chance on the gaming machines 1502, 1504, 1506 during which currency bills and substitute currency media are received and dispensed. At certain predetermined times, such as daily, hourly, every six hours, and so forth, or upon the occurrence of certain events, such as a full condition reported by a bill validator box, a casino operator empties the bill validator boxes which contain stacks of documents 1518, 1520, 1522 from the gaming machines 1502, 1504, 1506, respectively. The stacks of documents 1518, 1520, 1522 are brought into a soft-count room in a secure area of the casino for processing. One or more of the stacks of documents retrieved from the gaming machines are deposited into an input receptacle of a document processing device within the soft-count room. In FIG. 15, the stacks of documents 1518, 1520 retrieved from the first gaming machine 1502 and the second gaming machine 1504 are deposited into the input receptacle of a first document processing device 1508. The stack of documents 1522 retrieved from the nth gaming machine 1506 is deposited into the input receptacle of a mth document processing device 1510.

The document processing devices 1508, 1510 may be any document processing device shown and described above such as those described in connection with FIGS. 1*a*–11. They are communicatively linked via a host 1536 to the network 1512 such as described in connection with FIG. 11. The first document processing device 1508 processes the stack of documents deposited in its input receptacle and identifies authentic currency bills and their denominations, no call bills, suspect bills, valid substitute currency media, or invalid substitute currency media. Depending on the number of output receptacles present in the document processing device 1508, authentic, no call, and suspect bills and valid and invalid substitute currency media will be directed to one or more of the output receptacles of the machine 1508. Likewise, the mth document processing device 1510 processes authentic currency bills whose denominations can be determined, valid substitute currency media, no call and suspect bills, and invalid substitute currency media.

In some embodiments where the substitute currency media include an indicia pattern encoding a ticket number, the ticket numbers of the valid substitute currency media processed in the document processing devices 1508, 1510 are stored in a file in a storage medium such as the storage medium 119 shown in FIG. 1*c*. The file containing the ticket numbers is presented to a ticket tracking system 1516 which, according to one embodiment, is coupled to the network 1512. In other embodiments, the ticket numbers are stored in a portable storage medium which is presented to the ticket tracking system 1516. The ticket tracking system 1516 compares the ticket numbers in the file with the ticket numbers stored in a ticket database 1538 and retrieves the values associated with each ticket number from the ticket database 1538. The ticket numbers and values are presented to an accounting system 1514 for reconciliation.

The gaming machines 1502, 1504, 1506 are communicatively coupled to the network 1512. In one embodiment, the information encoded on the batch identification cards placed in the gaming machines is maintained in the accounting system 1514, which information includes the identity of the gaming machine in which the batch identification card is placed. The batch identification cards may be generated by a portable device carried by casino operators who empty the bill validator boxes from the gaming machines. When a bill validator box is emptied, the portable device dispenses a batch identification card bearing an indicia pattern representative of the name or number of the gaming machine into which the card is placed. After the bill validator box fills up with currency bills and substitute currency media, the batch identification card, the currency bills, and the substitute currency media are placed into a document processing device for processing. The indicia on the batch identification card is decoded and stored in a file along with information about the currency bills and substitute currency media processed by the document processing device.

Figure 16:
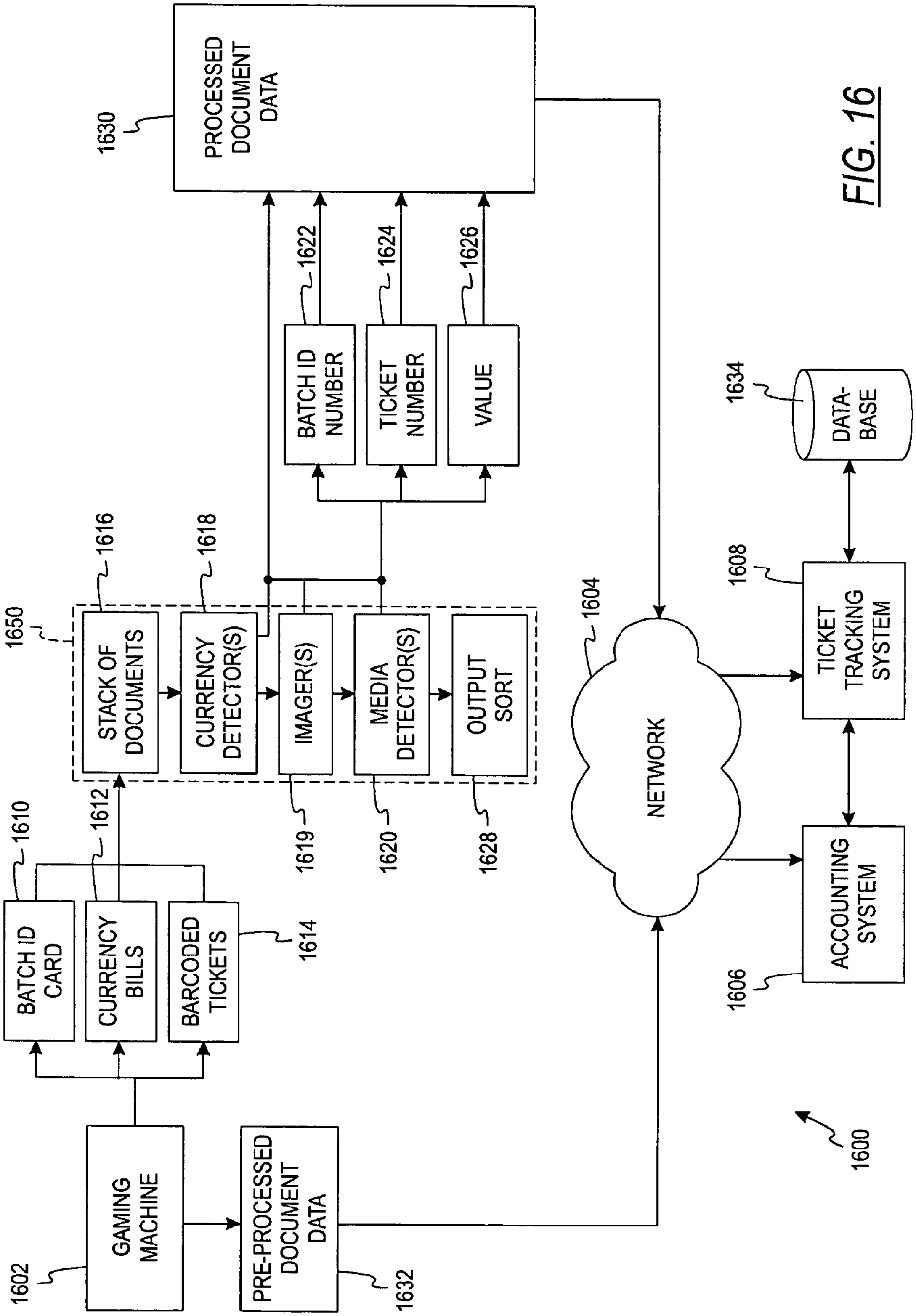
FIG. 16 is a flowchart of a method for processing documents according to another embodiment of the present invention.

FIG. 16 is a diagram of a system 1600 for processing currency bills and substitute currency media which generally includes a gaming machine 1602 coupled to a network 1604. The network 1604 is coupled to an accounting system 1606 and a ticket-tracking system 1608. The casino operator optionally places a batch identification card at the bottom of the bill validator box in the gaming machine 1602. The batch identification card includes an indicia pattern that encodes the identity of the gaming machine and/or is otherwise associated with the gaming machine such as by the accounting system associating the indicia information on the card with the particular gaming machine. During operation, casino patrons will insert currency bills and substitute currency media into the bill acceptor slot of the gaming machine 1602. At predetermined intervals (hourly, daily, etc.) or upon the occurrence of a certain condition (e.g., the bill validator box is full), the casino operator will remove the bill validator box and bring it into the casino's soft-count room. The bill validator box contains a stack of documents 1616 that includes a batch identification card 1610, a plurality of currency bills 1612, and a plurality of tickets 1614.

The casino operator removes the stack of documents 1616 and places them into the input receptacle of a document processing device 1650. The document processing device 1650 may be any document processing device shown and described in connection with FIGS. 1*a*–1*j*. In the illustrated embodiment, the documents are transported, one at a time, past a currency detector 1618, a media detector 1620, and an imager 1619, though not necessarily in that order. In addition, more than one currency detector 1618, imager 1619, and media detector 1620 may be utilized in one device 1650. The currency detector 1618 and imager 1619 are adapted to detect characteristic information associated with the authenticity and denomination of currency bills, and communicate information indicative of the denomination of an authentic currency bill to a controller in the document processing device. The denomination information is stored as processed document data 1630. In addition, the imager 1619 is adapted to form an image file of a captured image. The image file may also be stored as processed document data and appended with other processed document data as noted above.

If the document under consideration includes one or more indicia, the indicia on the ticket are scanned by the media detector 1620 or the imager 1619 and decoded into characters. For example, the indicia pattern on a batch identification card would be decoded into a batch identification number 1622, which is a number associated with the gaming machine 1602. A first indicia pattern of a ticket including multiple indicia would be decoded into a ticket number 1624. A second indicia pattern would be decoded into a value 1626 representing the currency amount for which the ticket was redeemed. The values of the authentic currency bills processed, the batch identification number 1622, the ticket numbers 1624, and the values 1626 form the processed document data 1630. The processed document data 1630 is stored in a file on a floppy disk, a hard drive, a network drive, or any other suitable storage medium.

After the documents are processed, they are directed to one or more output receptacles at step 1628. The processed document data 1630 is provided to the network 1604. In an alternate embodiment, the processed document data 1630 may be provided to the accounting system 1606 or the ticket tracking system 1608. When the processed document data 1630 includes ticket numbers and values, the processed document data 1630 can be provided either via the network 1604 or directly to the accounting system 1606 for reconciliation.

The gaming machine 1602 is also coupled to the network 1604. The gaming machine 1602 produces preprocessed document data 1632 during operation. The preprocessed document data 1632 includes information about the currency bills inserted into the bill validator or acceptor in the gaming machine 1602 and information about the tickets redeemed at the gaming machine 1602. The preprocessed document data 1632 is provided via the network 1604 to the accounting system 1606 or the ticket tracking system 1608. After the processed document data 1630 is received in the accounting system 1606, the two sets of data are compared for discrepancies.

The ticket tracking system 1608 keeps track of the tickets dispensed and the tickets redeemed, and prevents redemption of the same ticket number more than once. For example, when a casino patron redeems a ticket at the gaming machine 1602, the ticket number may be flagged by the ticket tracking system 1608 as redeemed. Thus, for example, if the casino patron attempted to redeem a photocopy of a previously redeemed ticket, the ticket tracking system 1608 would inform the gaming machine 1602 not to award any credits or dispense any currency bills for that ticket.

In some embodiments, the bill validator in the gaming machine 1602 is adapted to detect only the ticket number from a ticket, even if the value is also encoded on the ticket. In such embodiments, when the ticket is redeemed in the bill validator of the gaming machine 1602, the gaming machine 1602 transmits the ticket number to the ticket tracking system 1608. The ticket tracking system 1608 looks up the ticket number in a database 1634, and the database 1634 returns the value associated with that ticket number. The ticket tracking system 1608 then credits the gaming machine 1602 with the value retrieved from the ticket database unless the ticket database 1608 indicates that the ticket has already been redeemed.

In other embodiments, the casino patron redeems a ticket at a redemption machine (not shown) by inserting the ticket into the device which validates the ticket and dispenses currency bills and/or coins commensurate with the value of the ticket. In such embodiments, the redemption machine is coupled to the ticket tracking system which keeps track of the tickets in the same manner as described above.

As explained in connection with FIG. 15, the system described in FIG. 16 is not limited to the casino environment, but other environments such as a retailer, financial institutions, and amusement park environments, for example, are contemplated. In addition, in some embodiments, the ticket tracking system 1516 of FIG. 15 may be incorporated into or a part of the accounting system 1514, or vice versa. In other embodiments, the ticket tracking system 1608 of FIG. 16 may be incorporated into or a part of the accounting system 1606, or vice versa.

It is thus believed that the operation and construction of the present invention will be apparent from the foregoing description. While the method and apparatus shown or described have been characterized as being preferred it will be obvious that various changes and modifications may be made therein without departing from the spirit and scope of the invention.

What is claimed:

1. An evaluation system for evaluating documents, comprising:

at least one media detector for determining whether substitute currency media are valid based on at least one barcoded indicia of the substitute currency media;

at least one currency detector for determining whether currency bills are valid based on at least one characteristic of the currency bills;

at least one imager for capturing an image of at least a portion of the substitute currency media and the currency bills, wherein the imager creates an image file from the captured image; and a controller for controlling the at least one media detector, currency detector and imager, wherein the controller further receives the image file and processes the image file for storage.

2. The evaluation system of claim 1, wherein the controller processes image files via a compression technique.

3. The evaluation system of claim 1, further comprising: a storage medium for storing the processed image file.

4. The evaluation system of claim 1, wherein the controller appends additional information to the image file.

5. The evaluation system of claim 4, wherein the additional information is at least one of transaction data, location data, time stamp data, employee ID data, currency bill serial numbers, amount written for a check, and amount written on a deposit slip.

6. The evaluation system of claim 1, wherein the substitute currency media includes a second indicia, wherein the second indicia is at least one of a barcode, a magnetic ink character recognition (MICR) pattern, characters readable by optical character recognition (OCR), a magnetic pattern, an optical variable device (OVD) pattern, a hologram, a magnetic thread, an electrically conductive thread, conductive ink, magnetic ink, an electrically conductive polymer, perforations, a coded watermark, and encoded information.

7. The evaluation system of claim 1, wherein the controller accesses stored information relating to the barcoded indicia and compares the stored information with the captured image to determine if the substitute currency media is valid.

8. The evaluation system of claim 1, further comprising an additional currency detector, an additional media detector, and an additional imager located on an opposite side of a transport path from the at least one media detector, the at least one currency detector, and the at least one imager.

9. The evaluation system of claim 1, wherein the at least one imager is positioned after the media detector in a transport path.

10. The evaluation system of claim 1, wherein the at least one imager is positioned after the currency detector in a transport path.

11. The evaluation system of claim 1, wherein the at least one media detector generates an image check signal to activate the at least one imager.

12. The evaluation system of claim 1, wherein the at least one currency detector generates an image check signal to activate the at least one imager.

13. The evaluation system of claim 1, wherein the evaluation region is incorporated into a document processing device.

14. An evaluation system for evaluating documents, comprising:

at least one media detector for determining whether substitute currency media are valid based on at least one barcoded indicia of the substitute currency media;

at least one imager for determining whether currency bills are valid and for capturing an image of at least a portion of the currency bills, wherein the imager creates an image file from the captured image; and a controller for controlling the at least one media detector and the at least one imager, wherein the controller further receives the image file and processes the image file for storage.

15. The evaluation system of claim 14, wherein the at least one imager further captures an image of at least a portion of the substitute currency media.

16. The evaluation system of claim 14, wherein the controller processes image files via a compression technique.

17. The evaluation system of claim 14, further comprising:

a storage medium for storing the processed image file.

18. The evaluation system of claim 14, wherein the controller appends additional information to the image file.

19. The evaluation system of claim 14, wherein the controller accesses stored information relating to the currency bills and compares the stored information with the captured image to determine if the currency bills are valid.

20. The evaluation system of claim 14, further comprising an additional media detector and an additional imager located on an opposite side of a transport path from the at least one media detector and the at least one imager.

21. The evaluation system of claim 14, wherein the at least one imager is positioned after the media detector in a transport path.

22. The evaluation system of claim 14, wherein the at least one media detector generates an image check signal to activate the at least one imager.

23. The evaluation system of claim 14, wherein the evaluation region is incorporated into a document processing device.

24. An evaluation system for evaluating documents, comprising:

at least one currency detector for determining whether currency bills are valid based on at least one characteristic of the currency bills;

at least one imager for determining whether substitute currency media are valid based on at least one barcoded indicia of the substitute currency media, wherein the imager captures an image of at least a portion of the substitute currency media and creates an image file from the captured image; and a controller for controlling the at least one currency detector and the at least one imager, wherein the controller further receives the image file and processes the image file for storage.

25. The evaluation system of claim 24, where the at least one imager further captures an image of at least a portion of the currency bills.

26. The evaluation system of claim 24, wherein the controller processes image files via a compression technique.

27. The evaluation system of claim 24, further comprising:

a storage medium for storing the processed image file.

28. The evaluation system of claim 24, wherein the controller appends additional information to the image file.

29. The evaluation system of claim 24, wherein the controller accesses stored information relating to the substitute currency media and compares the stored information with the captured image to determine if the substitute currency media are valid.

30. The evaluation system of claim 24, further comprising an additional currency detector and an additional imager located on an opposite side of a transport path from the at least one currency detector and the at least one imager.

31. The evaluation system of claim 24, wherein the at least one imager is positioned after the currency detector in a transport path.

32. The evaluation system of claim 24, wherein the at least one currency detector generates an image check signal to activate the at least one imager.

33. The evaluation system of claim 24, wherein the evaluation region is incorporated into a document processing device.

34. An evaluation system for evaluating documents, comprising:

at least one imager for determining whether substitute currency media and currency bills are valid based on at least one barcoded indicia of the substitute currency media and based on at least one characteristic of the currency bills, wherein the imager captures an image of at least a portion of the substitute currency media and creates an image file from the captured image; and a controller for controlling the at least one imager, wherein the controller further receives the image file and processes the image file for storage.

35. The evaluation system of claim 34, wherein the controller processes image files via a compression technique.

36. The evaluation system of claim 34, further comprising:

a storage medium for storing the processed image file.

37. The evaluation system of claim 34, wherein the controller appends additional information to the image file.

38. The evaluation system of claim 34, wherein the controller accesses stored information relating to the substitute currency media and compares the stored information with the captured image to determine if the substitute currency media are valid.

39. The evaluation system of claim 34, wherein the controller accesses stored information relating to the currency bills and compares the stored information with the captured image to determine if the currency bills are valid.

40. The evaluation system of claim 34, further comprising an additional imager located on an opposite side of a transport path from the at least one imager.

41. The evaluation system of claim 34, wherein the evaluation region is incorporated into a document processing device.

42. A method for processing documents, comprising:

transporting substitute currency media and currency bills past an evaluation region in order to determine if the substitute currency media and currency bills are valid;

capturing an image of at least a portion of the substitute currency media and the currency bills as they pass through the evaluation region;

determining whether a valid currency bill is detected based on at least one characteristic of the currency bills; and determining whether a valid substitute currency medium is detected based on a barcoded indicia of the substitute currency medium.

43. The method of claim 42, further comprising:

scanning, by a currency detector, to determine whether the currency bill is valid.

44. The method of claim 42, further comprising:

scanning, by a media detector, to determine whether the substitute currency medium is valid.

45. The method of claim 42, wherein the step of instructing comprises capturing an image of at least one of an indicia, a serial number, a watermark, and a magnetic ink character recognition pattern of the currency bill or the substitute currency medium.

46. The method of claim 42, wherein the step of instructing comprises capturing an image of an entire surface of the currency bill or the substitute currency medium.

47. The method of claim 42, further comprising:

suspending action if the currency bill is determined not to be valid.

48. The method of claim 42, further comprising:

suspending action if the substitute currency medium is determined not to be valid.

49. The method of claim 42, further comprising:

sending invalid currency bills and invalid substitute currency media to an offsort receptacle.

50. The method of claim 42, further comprising:

appending additional information to the image file.

51. The method of claim 50, further comprising storing the image file and the appended additional information at a storage medium.

52. The method of claim 51, further comprising searching the storage medium for particular information via a user interface.

* * * * *

UNITED STATES PATENT AND TRADEMARK OFFICE

CERTIFICATE OF CORRECTION

PATENT NO. : 7,201,320 B2
APPLICATION NO. : 10/953635
DATED : April 10, 2007
INVENTOR(S) : Frank M. Csulits et al.

It is certified that error appears in the above-identified patent and that said Letters Patent is hereby corrected as shown below:

Column 43, Lines 13-14, change “instructing” to “capturing”;

Column 43, Lines 18-19, change “instructing” to “capturing”.

Signed and Sealed this

Seventeenth Day of March, 2009

JOHN DOLL
*Acting Director of the United States Patent and Trademark Office*